US006531568B1

(12) United States Patent
Shibuya et al.

(10) Patent No.: US 6,531,568 B1
(45) Date of Patent: Mar. 11, 2003

(54) POLYIMIDE CONTAINING CROSSLINKABLE GROUP AND PROCESS FOR PRODUCING THE SAME

(75) Inventors: Atsushi Shibuya, Kanagawa (JP);
Tomomi Okumura, Kanagawa (JP);
Hideaki Oikawa, Fukuoka (JP);
Yoshihiro Sakata, Kanagawa (JP);
Takashi Kuroki, Kanagawa (JP);
Yuichi Okawa, Kanagawa (JP); Shoji Tamai, Kanagawa (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/762,260

(22) PCT Filed: Aug. 6, 1999

(86) PCT No.: PCT/JP99/04273

§ 371 (c)(1),
(2), (4) Date: Apr. 9, 2001

(87) PCT Pub. No.: WO00/08090

PCT Pub. Date: Feb. 17, 2000

(30) Foreign Application Priority Data

| Aug. 6, 1998 | (JP) | ............................................. 10-223362 |
| Sep. 30, 1998 | (JP) | ............................................. 10-278807 |
| Sep. 30, 1998 | (JP) | ............................................. 10-278808 |
| Mar. 31, 1999 | (JP) | ............................................. 11-090454 |
| Mar. 31, 1999 | (JP) | ............................................. 11-090455 |

(51) Int. Cl.$^7$ ........................ C08G 73/10; C08G 69/26; C08G 69/28

(52) U.S. Cl. ........................ 528/170; 528/125; 528/126; 528/128; 528/171; 528/172; 528/173; 528/174; 528/176; 528/183; 528/185; 528/188; 528/220; 528/223; 528/226; 528/229; 528/350; 528/351; 528/352; 528/353; 524/600; 524/602

(58) Field of Search ................................. 528/125, 126, 528/128, 172, 171, 173, 174, 183, 176, 185, 188, 220, 229, 350, 353, 351, 170, 352, 223, 226; 524/600, 602

(56) References Cited

U.S. PATENT DOCUMENTS

| 5,138,028 A | * | 8/1992 | Paul et al. .................. 528/353 |
| 5,290,908 A | * | 3/1994 | D'Alelio ..................... 528/353 |
| 5,306,784 A | * | 4/1994 | Pater .......................... 525/421 |
| 5,492,979 A | * | 2/1996 | Pater .......................... 525/421 |
| 5,708,128 A | * | 1/1998 | Oikawa et al. ............. 528/353 |
| 5,760,168 A | * | 6/1998 | Hergenrother et al. ...... 528/353 |

FOREIGN PATENT DOCUMENTS

| JP | 57-158229 | 9/1982 |
| JP | 5-5033 | 1/1993 |
| JP | 5-255501 | 10/1993 |
| JP | 7-304949 | 11/1995 |
| JP | 9-71651 | 3/1997 |

* cited by examiner

Primary Examiner—P. Hampton-Hightower
(74) Attorney, Agent, or Firm—Burns, Doane, Swecker & Mathis, LLP

(57) ABSTRACT

This invention provides crosslinkable-group-containing polyimides of various known thermoplastic polyimide backbone structures, which are provided with far better heat resistance, chemical resistance and mechanical properties than known polyimides of the structures without impairing excellent moldability or formability, superb sliding property, low water absorption property, outstanding electrical properties, high thermal oxidation stability and high radiation resistance, all of which are inherent to the structures.

35 Claims, No Drawings

POLYIMIDE CONTAINING CROSSLINKABLE GROUP AND PROCESS FOR PRODUCING THE SAME

TECHNICAL FIELD

This invention relates to crosslinkable-group-containing polyamic acids, melt-moldable or formable, crosslinkable-group-containing polyimides, production processes thereof, and crosslinked thermoplastic polyimides obtained by heat-treating them. Specifically, the present invention is concerned with crosslinked thermoplastic polyimides having various excellent properties inherent to polyimides, namely, high heat resistance, excellent mechanical properties, superb sliding property, low water absorption property, outstanding electrical properties, high thermal oxidation resistance, high chemical resistance and high radiation resistance, especially those improved more markedly in heat resistance, chemical resistance and mechanical properties, crosslinkable-group-containing polyimides which are thermoplastic and melt-moldable or formable, crosslinkable-group-containing polyamic acids as precursors of the crosslinkable-group-containing polyimides, production processes thereof, and their solutions or suspensions.

BACKGROUND ART

Polyimides have been used widely for many years as molding or otherwise forming materials, composite materials, or electrical or electronic materials in various fields, because in addition to their superb heat resistance, they are also excellent in mechanical properties and electrical properties.

For example, a polyimide ("Kapton", "Vespel", trade names; products of E.I. DuPont de Nemours & Co., Inc.) of the formula (A) is known as a representative polyimide:

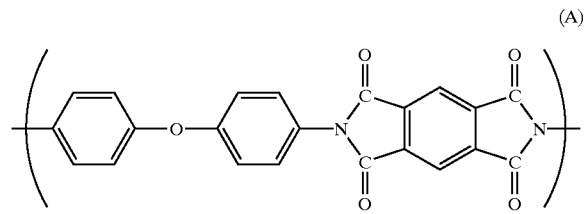

(A)

This polyimide is non-thermoplastic and is insoluble and infusible, and hence has a drawback in moldability or formability. It is therefore accompanied by a problem that no mass production is practically feasible. As a specific processing method, a block is obtained using a special molding process called powder sintering molding, and then, mechanical working such as cutting, grinding and polishing is applied to the block to obtain a formed product.

As an amorphous thermoplastic polyimide with improved moldability or formability, a polyetherimide represented by the formula (B) ("Ultem", trade name; product of General Electric Company) is known:

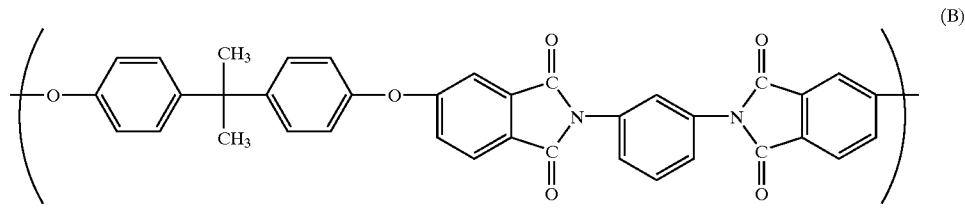

(B)

However, this polyimide is soluble in amide-type aprotonic polar solvents and halogenated hydrocarbon solvents and is inferior in chemical resistance. In addition, its glass transition temperature is 215° C., and a further improvement in heat resistance is desired depending on the application.

Further, a polyimide which is imparted with moldability or formability and is represented by the formula (C):

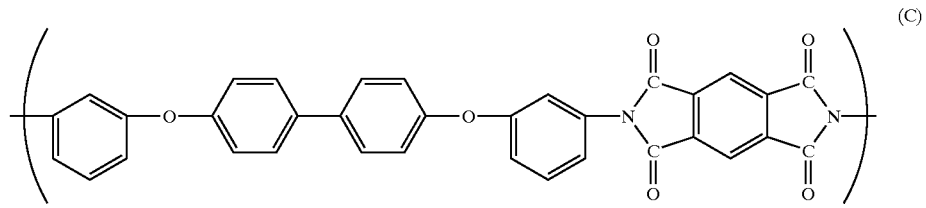

(C)

shows melt fluidity at its melting point and higher and permits melt molding or forming while retaining the inherent properties of polyimides because it has a melting point at 385° C. (U.S. Pat. No. 5,043,419). Although the glass transition temperature of this polyimide is relatively high, i.e., 250° C., marked reductions in properties, which are accompanied by deformation, softening or the like, take place when used at the glass transition temperature or higher. Further improvements are therefore desired depending on its application. Further, this polyimide is inferior in chemical resistance especially under stress, and an improvement is strongly desired in this respect.

Since the properties of a thermoplastic polyimide depend on the backbone structure of the polyimide, a variety of polyimides are selected in view of their inherent performance such as heat resistance, moldability or formability, mechanical properties and chemical resistance. Nonetheless, one or more of these individual properties may be found to be insufficient depending on the application, leading to an outstanding desire for the improvement of the above-described various properties.

On the other hand, a variety of thermosetting polyimides are available on the market. As a representative example of these polyimides, a polyimide available from monomers represented by the formula (D):

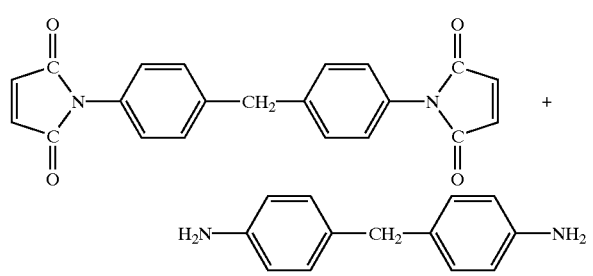

(D)

is known ["Kerimid-601", trade name; product of Rhone-Poulenc SA; F. D. Darmory, "National SAMPLE Symposium", 19, 693 (1974)]. As this polyimide is thermosetting, it is less susceptible to deformation or softening than thermoplastic polyimides and therefore, can be used under high temperature condition. However, this polyimide is not high in mechanical properties, especially in toughness and is weak against external force such as an impact. Due to its thermosetting property, no melt molding or forming is feasible. It is therefore necessary to carry out shaping at the stage of a prepolymer before its hardening and then to conduct heat treatment.

For the purpose of making improvements in the detrimental mechanical properties of these thermosetting polyimides, it is known to use a linear polyimide as a backbone and then to introduce crosslinking members into its ends and/or substituent groups. Reference may be had, for example, to U. S. Pat. No. 5,138,028, U.S. Pat. No. 5,478,915, U.S. Pat. No. 5,493,002, U.S. Pat. No. 5,567,800, U.S. Pat. No. 5,644,022, U.S. Pat. No. 5,412,066, and U.S. Pat. No. 5,606,014.

As technical details, U.S. Pat. No. 5,567,800, for example, discloses thermosetting polyimides available from heat treatment of imide oligomers having carbon-carbon triple bonds at their molecule ends, which can in turn be obtained from monomers represented by the formula (E):

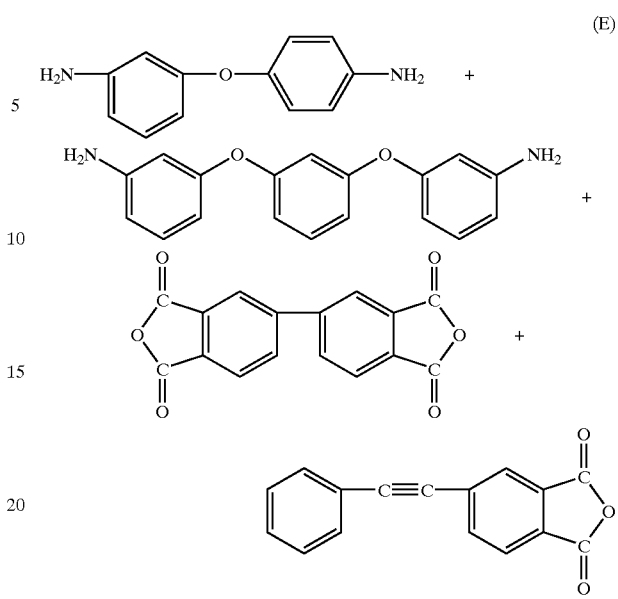

(E)

and an end blocking agent, respectively. Although the polyimides disclosed in this patent have various excellent properties, they still do not permit melt molding or forming, and therefore, their molding or forming is limited to processing which makes use of solutions of polyamic acids as precursors. In general, subsequent to the shaping of a solution of a polyamic acid, removal of the solvent and a dehydrating imidation reaction are conducted by heating. As this processing involves the removal of the solvent, it is generally impossible to obtain a molded or formed product having a large thickness. This processing is therefore limited in shape to films or sheets, and further, involves problems such as foaming due to remaining solvent and a need for recovery of a great deal of solvent.

DISCLOSURE OF THE INVENTION

An object of the present invention is to provide crosslinkable-group-containing polyimides of various known thermoplastic polyimide backbone structures, which are provided with far better heat resistance, chemical resistance and mechanical properties than known polyimides of the structures without impairing advantages inherent to the structure, such as excellent moldability or formability, superb sliding property, low water absorption property, outstanding electrical properties, high thermal oxidation stability and high radiation resistance.

Specifically described, the terms "heat resistance", "chemical resistance" and "mechanical properties" the improvements of which constitute one of themes sought for attainment by the present invention mean, for example, physical property values and test results such as those to be described below.

① Concerning heat resistance, representative examples can include glass transition temperature; softening temperature, deflection temperature under load, and mechanical properties at high temperatures in thermal mechanical analyses; retentions of mechanical properties in thermal cycle tests; solder reflow heat resistance test; heat resistance test; and hot air aging test. Among these, the themes the attainment of which are sought for in the present invention can include especially deflection temperature under load, mechanical properties at high temperatures, retentions of mechanical properties in thermal cycle tests, and the like.

② As to chemical resistance, representative examples can include solvent dissolution resistance test, solvent immersion test, under-stress solvent immersion resistance resistance test, and retentions of various physical properties after immersion in solvent under stress. Among these, the themes the attainment of which are sought for in the present invention can include especially under stress solvent immersion resistance test, retentions of various physical properties after immersion in solvent under stress, and the like.

③ In respect to mechanical properties, representative examples can include tensile test, compression test, bending test, Izod impact test, and fatigue test. Among these, the themes the attainment of which is sought for in the present invention can include especially yield strength, tensile modulus, flexural modulus, Izod impact value, and the like.

Describing in other words from another viewpoint, the themes the attainment of which is sought for by the present invention are to provide a crosslinkable-group-containing polyimide imparted with thermoplasticity by additionally providing it with high moldability or formability, which has not been brought about by conventional polyimides of the end-curing type, while retaining excellent physical properties inherent to thermosetting polyimides of the end-curing type, that is, superb sliding property, low water absorption property, outstanding electrical properties, high thermal oxidation stability, high chemical resistance and excellent mechanical properties.

Accordingly, an object of the present invention is to provide a crosslinkable-group-containing polyimide, which is thermoplastic and permits melt moldability or formability, or a crosslinkable-group-containing polyamic acid which is a precursor of the polyimide. Another object of the present invention is to provide its production process.

It is an important feature of the present invention that the crosslinkable-group-containing polyimide according to the present invention permits melt molding or forming despite its inclusion of crosslinkable groups, which allow a crosslinking reaction, and the crosslinkable-group-containing thermoplastic polyimide shows thermoplasticity. It is here that the crosslinkable-group-containing polyimide according to the present invention is totally different from the conventional thermosetting resins which are crosslinkable. The present invention is based on a novel concept never in existence to date, and has made it possible to achieve mutually contradictory matters of intermolecular crosslinking and melt fluidity.

To achieve the above-described objects, the present inventors have proceeded with an extensive investigation. As a result, it has found that a crosslinkable-group-containing polyimide molecule ends of which are blocked with 1 to 80 mole % of a crosslinkable-group-containing dicarboxylic acid anhydride and 99 to 20 mole % of a crosslinkable-group-free dicarboxylic acid anhydride can achieve the above-described objects and permits melt molding or forming despite it has been more significantly improved and is outstanding especially in heat resistance, chemical resistance and mechanical properties, leading to the completion of the present invention.

Described specifically, the present invention provides the following polyimides or processes (1)–(35):

(1) A crosslinkable-group-containing polyimide comprising crosslinkable groups at 1 to 80 mole % of molecule ends thereof.

(2) A crosslinkable-group-containing polyimide as described in claim 1, wherein a backbone structure which forms the polyimide is substantially provided with thermoplasticity.

(3) A crosslinkable-group-containing polyimide as described above under (1) or (2), said polyimide permitting melt molding or forming, wherein 1 to 80 mole % of the molecule ends are crosslinkable-group-containing molecule ends represented by the chemical formula (2a) and 99 to 20 mole % of the molecule ends are crosslinking-group-free molecule ends represented by the chemical formula (2b):

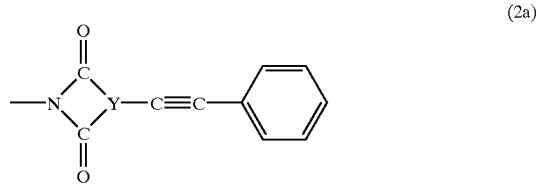

(2a)

wherein Y represents a trivalent aromatic group selected from the group consisting:

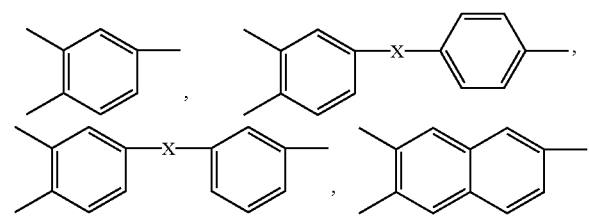

wherein X represents a divalent linking group selected from the group consisting of a direct bond, a carbonyl group, a sulfone group, a sulfide group, an ether group, an isopropylidene group and a hexafluoroisopropylidene group; and

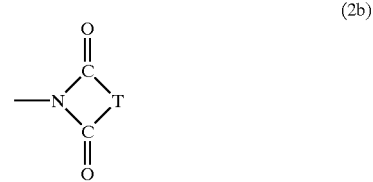

(2b)

wherein T represents a divalent aromatic group consisting of:

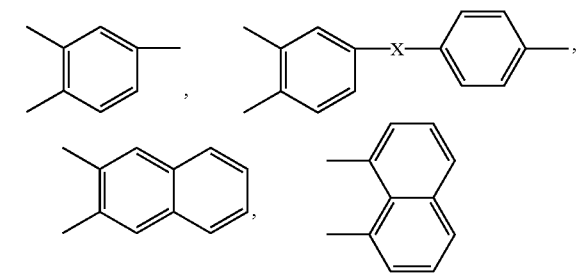

wherein X represents a divalent linking group selected from the group consisting of a direct bond, a carbonyl group, a sulfone group, a sulfide group, an ether group, an isopropylidene group and a hexafluoroisopropylidene group.

(4) A crosslinkable-group-containing polyimide as described above under any one of (1)–(3), wherein the polyimide comprises polyimide molecules of a structure represented by the chemical formula (2c):

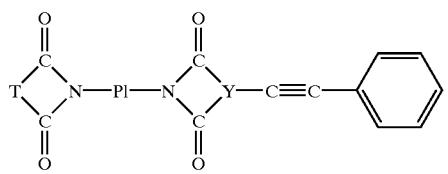
(2c)

wherein T, PI and Y are groups to be indicated next, respectively, that is,

T represents a divalent aromatic group selected from the group consisting of:

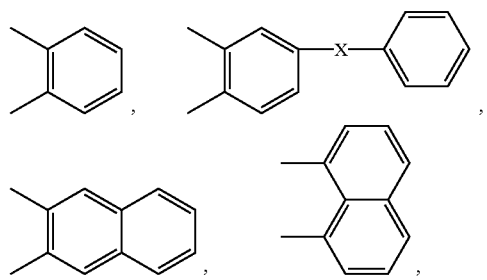

wherein X represents a divalent linking group selected from the group consisting of a direct bond, a carbonyl group, a sulfone group, a sulfide group, an ether group, an isopropylidene group and a hexafluoroisopropylidene group;

PI represents a polyimide backbone; and

Y represents a trivalent aromatic group selected from the group consisting of:

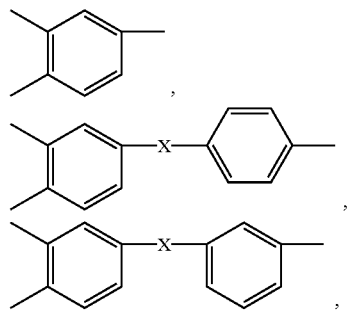

-continued

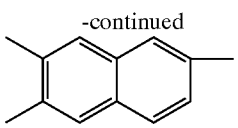

wherein X represents a divalent linking group selected from the group consisting of a direct bond, a carbonyl group, a sulfone group, a sulfide group, an ether group, an isopropylidene group and a hexafluoroisopropylidene group.

(5) A crosslinkable-group-containing polyimide as described above under (3) or (4), wherein in the chemical formula (2b) or (2c), T is the following chemical formula (2d):

(2d)

(6) A crosslinkable-group-containing polyimide as described above under any one (3)–(5), wherein in the chemical formula (2a) or (2c), Y is the following chemical formula (2e):

(2e)

(7) A crosslinkable-group-containing polyimide as described above under any one of (1)–(6), wherein a backbone of the polyimide has recurring structural units represented by the chemical formula (1):

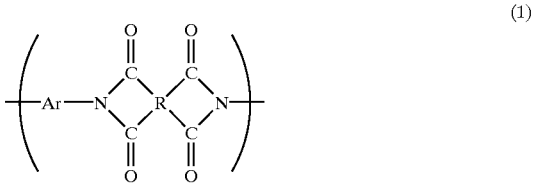
(1)

wherein Ar and R are groups to be described next, that is,
Ar represents a divalent aromatic group selected from the group consisting of:

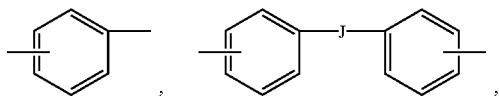

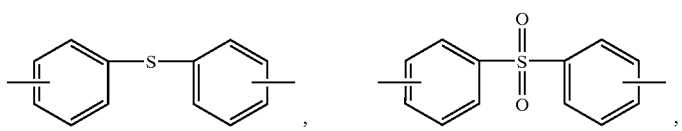

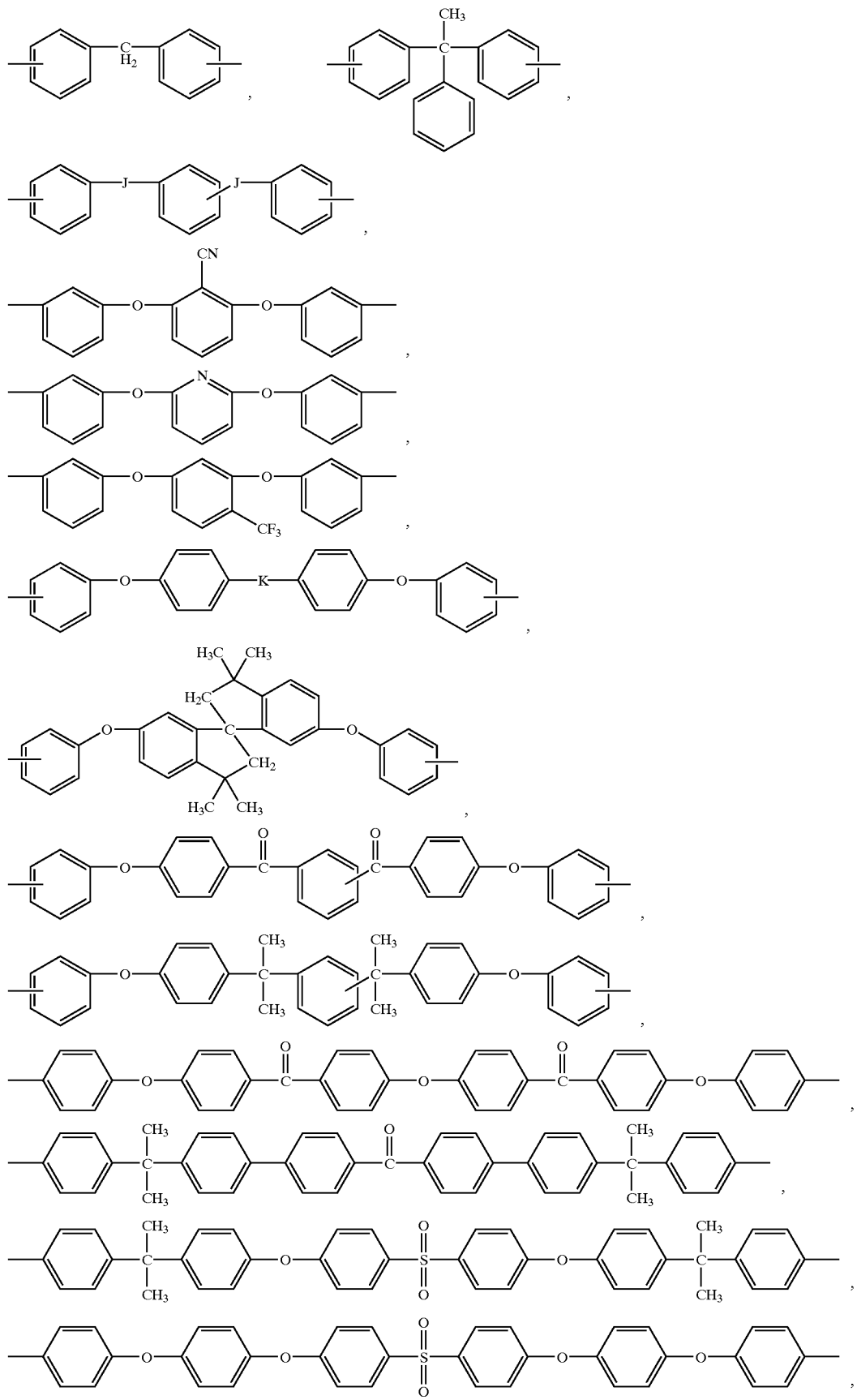

-continued

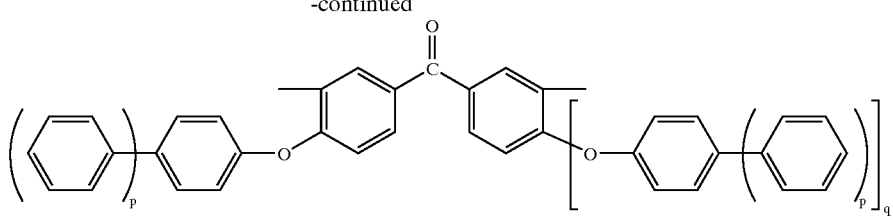

wherein J represents a divalent linking group selected from the group consisting of a carbonyl group, an ether group, an isopropylidene group and a hexafluoroisopropylidene group, K represents a divalent linking group selected from the group consisting of a direct bond, a carbonyl group, a sulfone group, a sulfide group, an ether group, an isopropylidene group and a hexafluoroisopropylidene group, p and q each independently stand for 0 or 1, and a position of each bond, said position being unspecified, is a para-position or meta-position; and R represents a tetravalent aromatic group selected from the group consisting of:

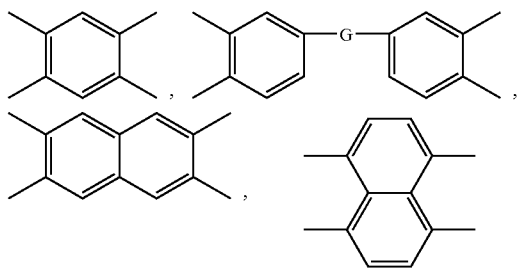

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group.

(8) A crosslinkable-group-containing polyimide as described above under claim 7, wherein 50 to 100 mole % of the recurring structural units represented by the chemical formula. (1) are of a recurring unit structure represented by the chemical formula (1a):

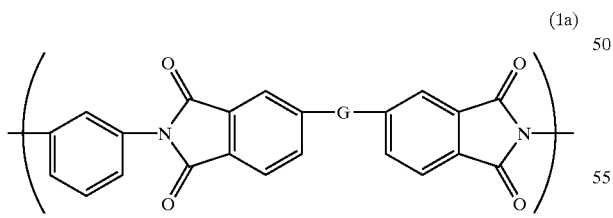

(1a)

wherein G is a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl] phenoxy group.

(9) A crosslinkable-group-containing polyimide as described above under (8), wherein in the chemical formula (1a), G is a 4'-oxy-4-biphenoxy group.

(10) A crosslinkable-group-containing polyimide as described above under (8), wherein in the chemical formula (1a), G is a 4-[1-(4-oxyphenyl)-1-methylethyl]phenoxy group.

(11) A crosslinkable-group-containing polyimide as described above under (7), wherein 50 to 100 mole % of the recurring structural units represented by the chemical formula (1) are of a recurring unit structure represented by the chemical formula (1b):

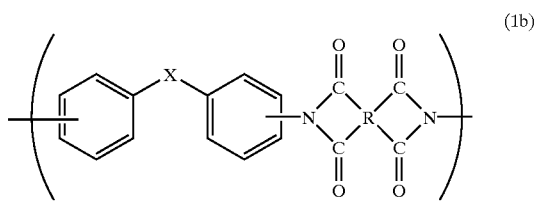

(1b)

wherein X and R are groups to be indicated next, respectively, that is,

X represents a divalent linking group selected from the group consisting of a direct bond, a carbonyl group, a sulfone group, a sulfide group, an ether group, an isopropylidene group and a hexafluoroisopropylidene group; and R represents a tetravalent linking group selected from the group consisting of:

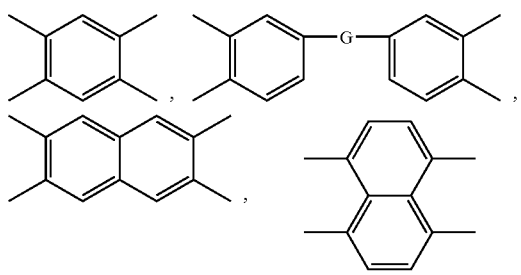

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

(12) A crosslinkable-group-containing polyimide as described above under (11), wherein in the chemical formula (1b), X is an oxygen atom;

imido-bonded positions of two benzenes to which X is directly bonded are a m-position and a para-position, respectively; and R is a 3,4,3',4'-substituted biphenyl.

(13) A crosslinkable-group-containing polyimide as described above under (7), wherein among the recurring structural units represented by the chemical formula (1), 50 to 100 mole % are of a recurring unit structure represented by the chemical formula (1c):

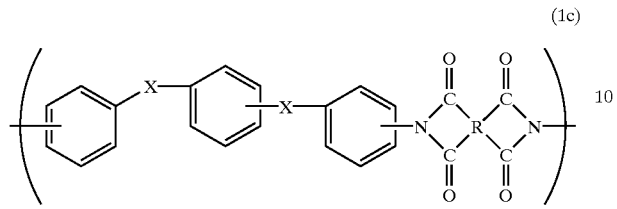

(1c)

wherein X and R are groups to be indicated next, respectively, that is,

X represents a divalent linking group selected from the group consisting of a direct bond, a carbonyl group, a sulfone group, a sulfide group, an ether group, an isopropylidene group and a hexafluoroisopropylidene group; and R represents a tetravalent linking group selected from the group consisting of:

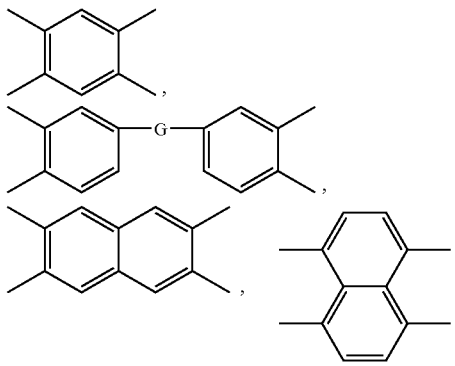

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

(14) A crosslinkable-group-containing polyimide as described above under (13), wherein in the chemical formula (1c), X is an oxygen atom.

(15) A crosslinkable-group-containing polyimide as described above under (13), wherein in the chemical formula (1c), X is an oxygen atom;

positions of a benzene ring, at which two Xs are directly bonded, respectively, are m-positions relative to each other;

bonded positions of each of two benzenes to each of which X and an imido group are directly bonded are p-positions relative to each other; and R is a 3,4,3',4'-substituted biphenyl.

(16) A crosslinkable-group-containing polyimide as described above under (7), wherein among the recurring structural units represented by the chemical formula (1), 50 to 100 mole % are of a recurring unit structure represented by the chemical formula (1e):

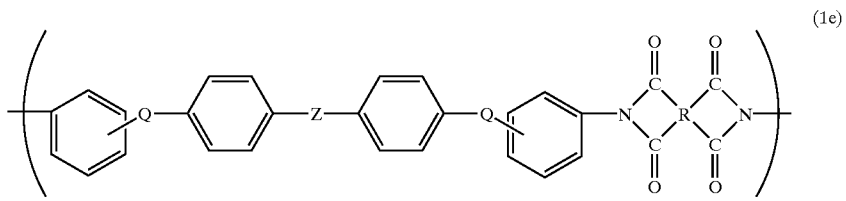

(1e)

wherein Q, Z and R are groups to be indicated next, respectively, that is,

Q represents a divalent aromatic group selected from the group consisting of an ether group and an isopropylidene group;

Z represents a divalent aromatic group selected from the group consisting of a direct bond, a carbonyl group, a sulfone group, a sulfide group, an ether group, an isopropylidene group, a hexafluoroisopropylidene group, and

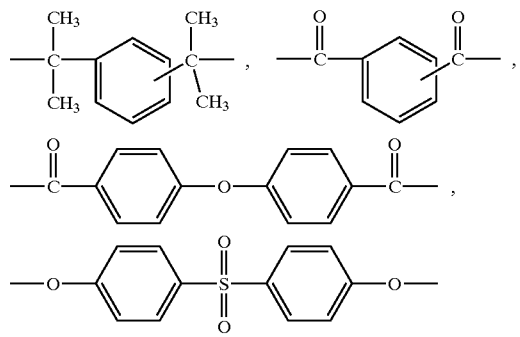

R represents a tetravalent aromatic group selected from the group consisting of:

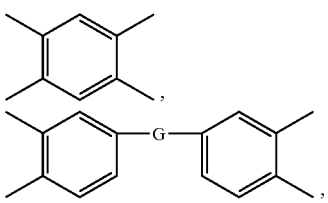

-continued

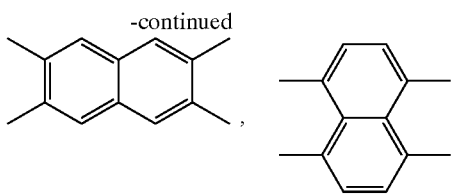

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

(17) A crosslinkable-group-containing polyimide as described above under (16), wherein in the chemical formula (1e), Q is an oxygen atom; and Z is at least one divalent group selected from the group consisting of a direct bond, a carbonyl group, a sulfone group, a sulfide group, an ether group, an isopropylidene group and a hexafluoroisopropylidene group.

(18) A crosslinkable-group-containing polyimide as described above under (16), wherein in the chemical formula (1e), Q is an oxygen atom;

Z is a direct bond; and

R is a 1,2,4,5-substituted benzene.

(19) A process for the production of a melt-moldable or formable, crosslinkable-group-containing polyimide, 1 to 80 mole % of molecule ends of the polyimide being crosslinkable-group-containing molecule ends represented by a chemical formula (2a) and 99 to 20 mole % of the molecule ends being crosslinkable-group-free molecule ends represented by a chemical formula (2b), which comprises end-blocking ends of polyimide backbones by using dicarboxylic acid anhydrides represented by the chemical formula (3e) and the chemical formula (3b):

(3a)

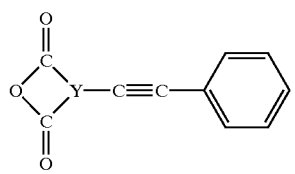

wherein Y represents a trivalent aromatic group selected from the group consisting:

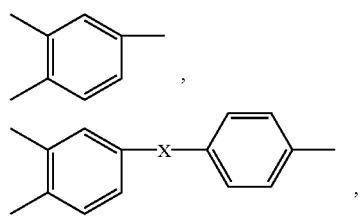

-continued

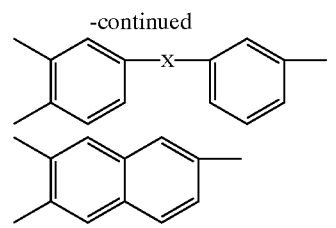

wherein X represents a divalent linking group selected from the group consisting of a direct bond, a carbonyl group, a sulfone group, a sulfide group, an ether group, an isopropylidene group and a hexafluoroisopropylidene group;

(3b)

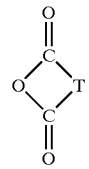

wherein T represents a divalent aromatic group consisting of:

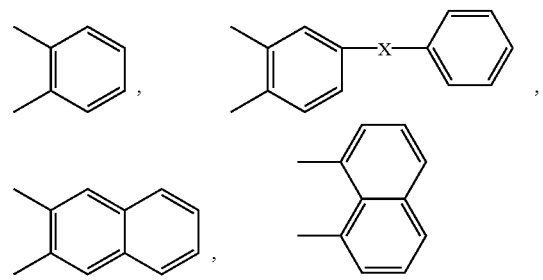

wherein X represents a divalent linking group selected from the group consisting of a direct bond, a carbonyl group, a sulfone group, a sulfide group, an ether group, an isopropylidene group and a hexafluoroisopropylidene group;

(2a)

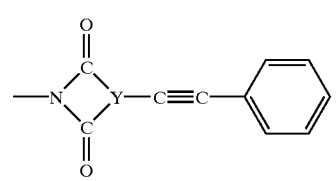

wherein Y represents a trivalent aromatic group selected from the group consisting:

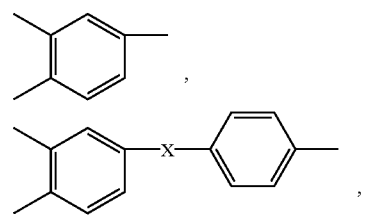

-continued

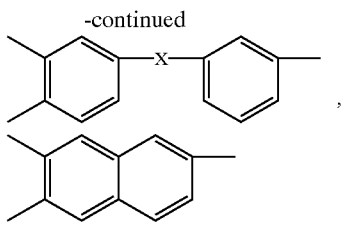
,

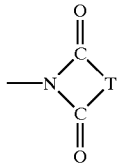

wherein X represents a divalent linking group selected from the group consisting of a direct bond, a carbonyl group, a sulfone group, a sulfide group, an ether group, an isopropylidene group and a hexafluoroisopropylidene group; and

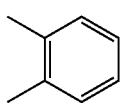 (2b)

wherein T represents a divalent aromatic group consisting of:

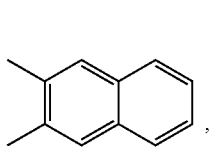, 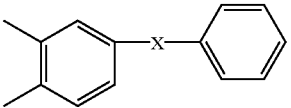

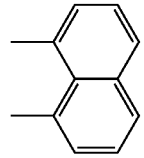

wherein X represents a divalent linking group selected from the group consisting of a direct bond, a carbonyl group, a sulfone group, a sulfide group, an ether group, an isopropylidene group and a hexafluoroisopropylidene group.

(20) A process as described above under (19), wherein the dicarboxylic acid anhydrides represented by the chemical formula (3a) and the chemical formula (3b) are used in amounts represented, on a molar ratio basis, by the numerical formula [1]:

1/99 ≦ the dicarboxylic acid anhydride represented by the chemical formula (3a)/the dicarboxylic acid anhydride represented by the chemical formula (3b) ≦ 80/20     [1]

(3a)
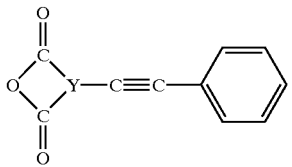

Y represents a trivalent aromatic group selected from the group consisting of:

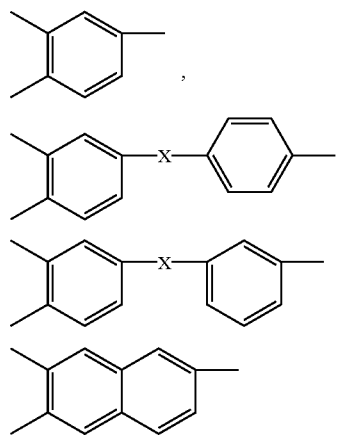

wherein X represents a divalent linking group selected from the group consisting of a direct bond, a carbonyl group, a sulfone group, a sulfide group, an ether group, an isopropylidene group and a hexafluoroisopropylidene group.

(3b)
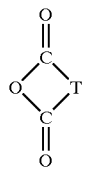

T represents a divalent aromatic group selected from the group consisting of:

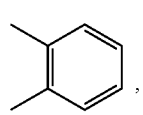, 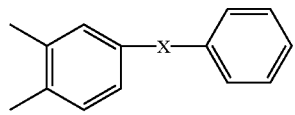,

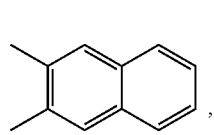, 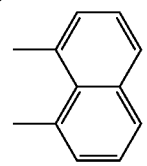

wherein X represents a divalent linking group selected from the group consisting of a direct bond, a carbonyl group, a sulfone group, a sulfide group, an ether group, an isopropylidene group and a hexafluoroisopropylidene group.

(21) A process as described above under (19) or (20), wherein in the chemical formula (3a) and/or the chemical formula (3b), T is the chemical formula (2a) and/or Y is the chemical formula (2e):

(2d)
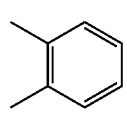

-continued

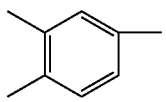
(2e)

(22) A process as described above under any one of (19)–(21), wherein the polyimide backbones have been obtained by thermally and/or chemically imidating a polyamic acid obtained as a polyimide precursor by polymerizing a diamine component and a tetracarboxylic acid anhydride component.

(23) A process as described above under (22), wherein the diamine component is at least one diamine component selected from the group consisting of diamine components represented by the chemical formula (4):

(4)

wherein Ar represents a divalent aromatic group selected from the group consisting of:

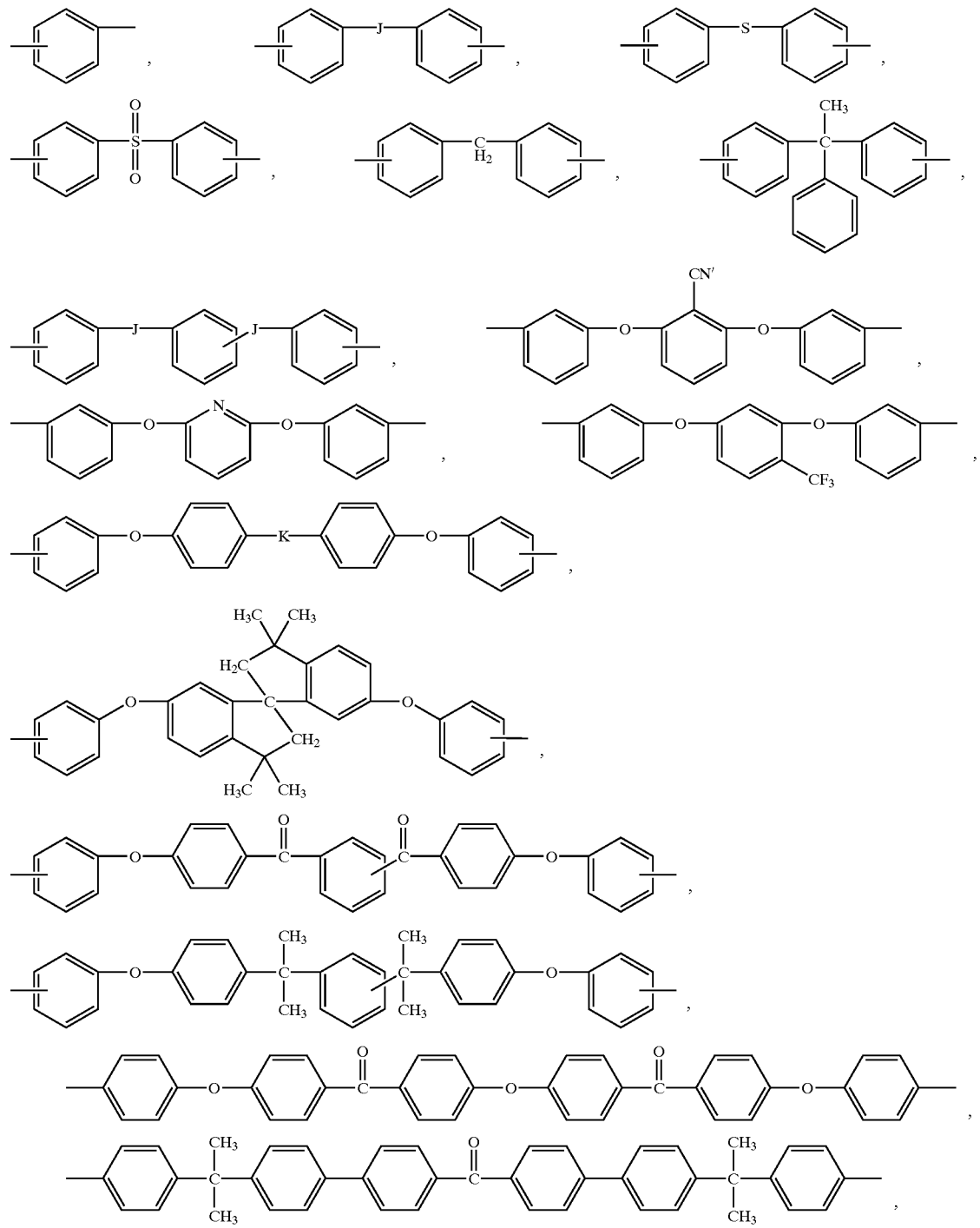

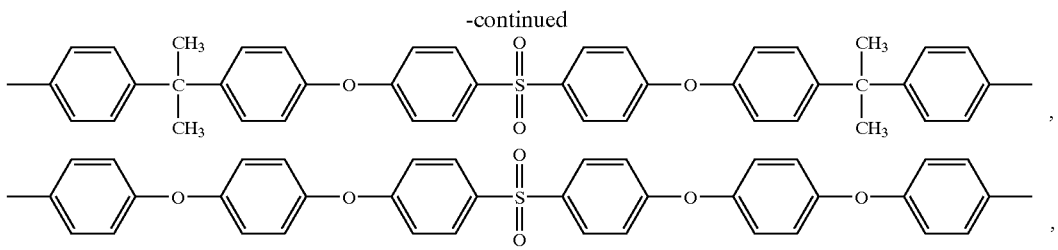

wherein J represents a divalent linking group selected from the group consisting of a carbonyl group, an ether group, an isopropylidene group and a hexafluoroisopropylidene group, K represents a divalent linking group selected from the group consisting of a direct bond, a carbonyl group, a sulfone group, a sulfide group, an ether group, an isopropylidene group and a hexafluoroisopropylidene group, p and q each independently stand for 0 or 1, and a position of each bond, said position being unspecified, is a para-position or meta-position;

(24) A process as described above under (23), wherein of the diamine component represented by the chemical formula (4), 50 to 100 mole % are represented by the chemical formula (4c):

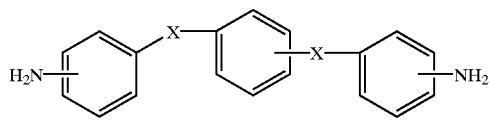

(4c)

wherein X represents a divalent linking group selected from the group consisting of a direct bond, a carbonyl group, a sulfone group, a sulfide group, an ether group, an isopropylidene group and a hexafluoroisopropylidene group, and a position of each bond, said position being unspecified, is a para-position or meta-position.

(25) A process as described above under (24), wherein in the chemical formula (4c), X is an oxygen atom.

(26) A process as described above under (24), wherein in the chemical formula (4c), X is an oxygen;

positions of a benzene ring, at which two Xs are directly bonded, respectively, are m-positions relative to each other; and bonded positions of each of two benzenes to each of which X and an amino group are directly bonded are p-positions relative to each other.

27. A process as described under (24), wherein of the diamine component represented by the chemical formula (4): 50 to 100 mole % are represented by the chemical formula (4d):

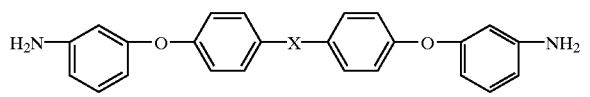

(4d)

wherein X represents a divalent linking group selected from the group consisting of a direct bond, a carbonyl group, a sulfone group, a sulfide group, an ether group, an isopropylidene group and a hexafluoroisopropylidene group.

(28) A process as described above under (27), wherein in the chemical formula (4d), X is a direct bond.

(29) A process as described above under (22), wherein the tetracarboxylic acid dihydride component is represented by the chemical formula (5):

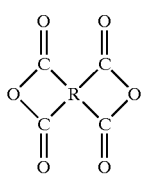

(5)

wherein R represents a tetravalent linking group selected from the group consisting of:

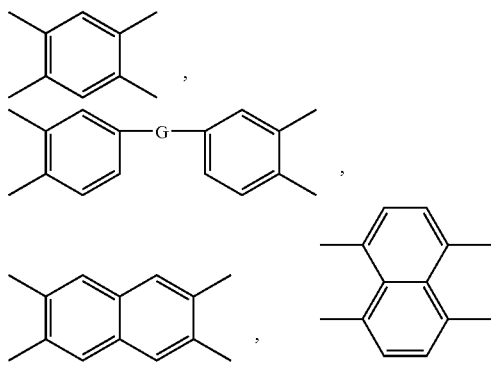

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group.

(30) A crosslinkable-group-containing polyimide as described above under any one of (1)–(18), there is a temperature T [° C.] which simultaneously satisfy the following numerical formulas [2] and [3]:

$$1 \leq MV30(T)/MV5(T) \leq 10 \qquad [2]$$

$$10 \leq MV5(T) \leq 10{,}000 \qquad [3]$$

where

MV5(T): melt viscosity [Pa·sec] of the polyimide as measured under a desired constant shearing stress in a range of from 0.1 to 1 [MPa] after causing the polyimide to melt by holding the polyimide at a temperature T [° C.] for 5 minutes; and MV30(T): melt viscosity [Pa·sec] of the polyimide as measured under the desired constant shearing stress in the range of from 0.1 to 1 [MPa] after causing the polyimide to melt by holding the polyimide at the temperature T [° C.] for 30 minutes.

(31) A crosslinkable-group-containing polyimide as described above under any one of (1)–(18), wherein there is a temperature T [° C.] which simultaneously satisfy the following numerical formulas [2], [3] and [4]:

$$1 \leq MV30(T)/MV5(T) \leq 10 \qquad [2]$$

$$10 \leq MV5(T) \leq 10,000 \qquad [3]$$

$$MV30(T+20)/MV5(T+20) \leq 20 \qquad [4]$$

where

MV5(T): melt viscosity [Pa·sec] of the polyimide as measured under a desired constant shearing stress in a range of from 0.1 to 1 [MPa] after causing the polyimide to melt by holding the polyimide at a temperature T [° C.] for 5 minutes;

MV5(T+20): melt viscosity [Pa·sec] of the polyimide as measured under the desired constant shearing stress in the range of from 0.1 to 1 [MPa] after causing the polyimide to melt by holding the polyimide at a temperature T+20 [° C.] for 5 minutes;

MV30(T): melt viscosity [Pa·sec] of the polyimide as measured under the desired constant shearing stress in the range of from 0.1 to 1 [MPa] after causing the polyimide to melt by holding the polyimide at the temperature T [° C.] for 30 minutes.

MV30(T+20): melt viscosity [Pa·sec] of the polyimide as measured under the desired constant shearing stress in the range of from 0.1 to 1 [MPa] after causing the polyimide to melt by holding the polyimide at a temperature T+20 [] for 30 minutes.

(32) A crosslinkable-group-containing polyimide as described above under any one of (1)–(18), which simultaneously satisfies the following numerical formulas [5] and [6]:

$$1 \leq MV30(360)/MV5(360) \leq 10 \qquad [5]$$

$$10 \leq MV5(360) \leq 10,000 \qquad [6]$$

where

MV5(360): melt viscosity [Pa·sec] of the polyimide as measured under a desired constant shearing stress in a range of from 0.1 to 1 [MPa] after causing the polyimide to melt by holding the polyimide at 360 [° C.] for 5 minutes; and MV30(360): melt viscosity [Pa·sec] of the polyimide as measured under the desired constant shearing stress in the range of from 0.1 to 1 [MPa] after causing the polyimide to melt by holding the polyimide at 360 [° C.] for 30 minutes.

(33) A crosslinkable-group-containing polyimide as described above under any one of (1)–(18), wherein a time t (min) which satisfies the numerical formula [7] lasts 10 minutes or longer:

$$G'(t)=G''(t) \qquad [7]$$

where

G' (t): storage modulus of the polyimide as measured at 360° C. and 1 Hz after an elapse of the time t (min) and G'' (t): loss modulus of the polyimide as measured at 360° C. and 1 Hz after an elapse of the time t (min).

(34) A crosslinked polyimide obtained by heat-treating a crosslinkable-group-containing polyimide as described above under any one of (1)–(18) and (30)–(33).

(35) A solution or suspension comprising a crosslinkable-group-containing polyimide as described above under any one of (1)–(18) and (30)–(33).

The polyimide according to the present invention is a crosslinkable-group-containing polyimide which contains crosslinking groups at 1 to 80 mole % of molecule ends thereof.

[Molecule Ends]

The term "molecule ends" as used herein means molecule ends, which are not contained in recurring structural units of a polyimide molecule chain and schematically correspond to "-End"s in the chemical formula (6a).

Where, as will be indicated by the chemical formula (6b), two kinds of units A and B exist in a recurring structural unit and the number of units of one kind ("A" in this case) is greater by one than that of the unit(s) of the other kind, molecule ends schematically corresponds to "-End"s in the chemical formula (6b).

It is to be noted that the structural unit A or B is not supposed to be contained in the structure of each "-End".

(6a)

(6b)

[Crosslinkable Groups]

The term "crosslinkable groups" means groups capable of forming a certain bond between molecule chains as a result of a reaction between crosslinkable groups or a crosslinkable group and a group on a polyimide backbone under specific crosslinking conditions. In the present invention, crosslinkable groups exist in molecule ends of polyimide chains.

No limitation is imposed on the crosslinking conditions, and a known crosslinking reaction such as heat-setting or photo-setting can be applied. From the standpoint of use, preferred are crosslinkable groups to which conditions not decomposing a polyimide backbone under crosslinking conditions are applicable.

If crosslinkable groups react with groups on a polyimide backbone, groups usable as the crosslinkable groups obviously differ depending on the polyimide backbone to be used.

As crosslinkable groups, those known to the public can be chosen and used as desired. No limitation is imposed on the kind of crosslinkable groups, but representative examples can include ethynyl groups, benzocyclobuten-4'-yl groups, vinyl groups, allyl groups, cyano groups, isocyanate groups, nitrilo groups, amino groups, isopropenyl groups, vinylene groups, vinylidene groups, ethynylidene groups, and biphenylenyl groups.

[Molecule Ends Having Preferred Crosslinkable Groups]

Molecule ends, each of which is usable in the present invention and has a crosslinkable group, are preferably those represented by the chemical formula (2a). The polyimide according to the present invention is characterized in that 1 to 80 mole % of the total number of end groups of the polymer chain are such crosslinkable-group-containing end groups and 99 to 20 mole % are crosslinkable-group-free end groups, preferably, those represented by the chemical formula (2b).

Specific examples of end structures represented by the chemical formula (2a) can include:
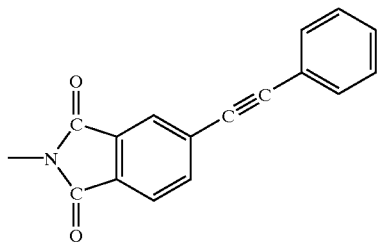
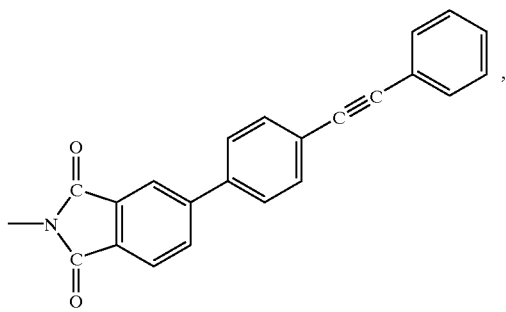,
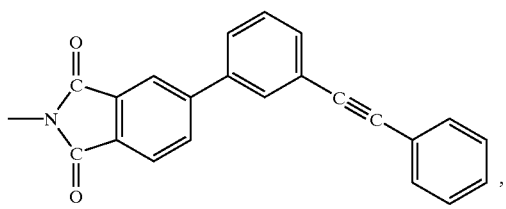,
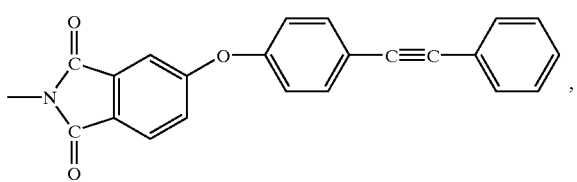,
,
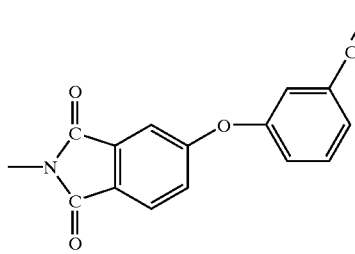,
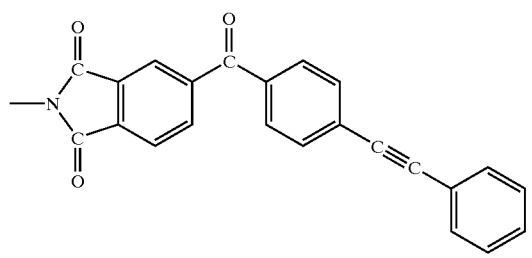,
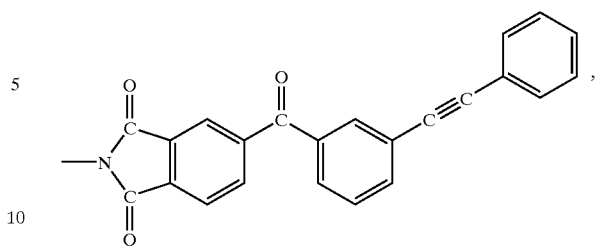,
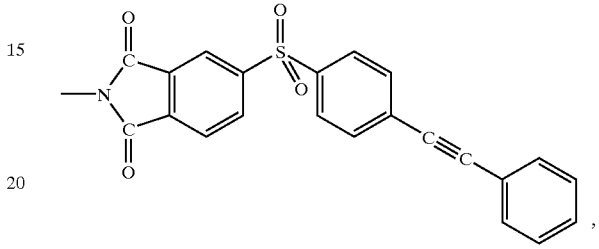,
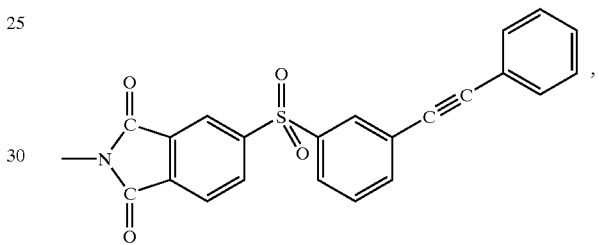,
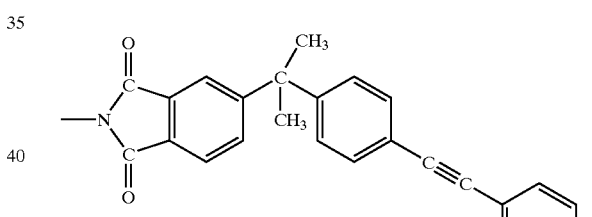,
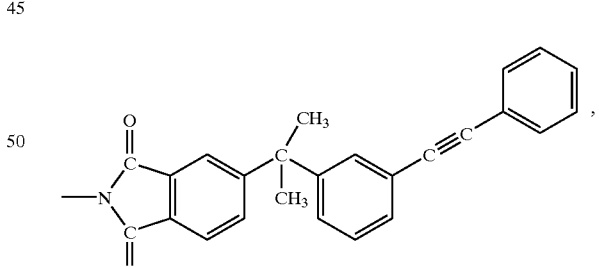,
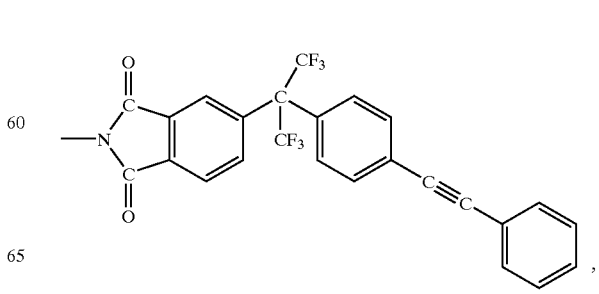,

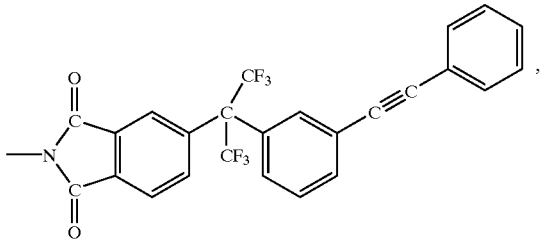

Incidentally, the crosslinkable-group-containing end groups are not limited to those exemplified above, but known crosslinkable-group-containing end groups can be used either singly or in combination as desired.

As the most preferred crosslinkable-group-containing end group, one of the chemical formula (2a) in which Y is the chemical formula (2e) is used. Specifically, it is:

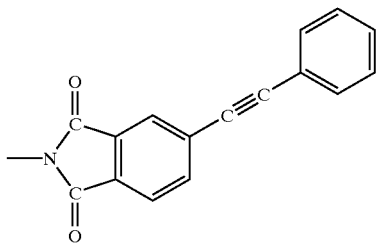

[Crosslinkable-group-free Molecule Ends]

As the crosslinkable-group-containing polyimide according to the present invention is characterized in that it has crosslinkable groups at 1 to 80 mole % of its molecule ends, 99 to 20 mole % of its molecule ends are crosslinkable-group-free molecule ends. The term "crosslinkable-group-free molecule ends" means molecule end groups which cannot for many bond between molecule chains because no reaction takes place between the molecule ends themselves or the molecule ends and groups on polyimide backbones under any conditions during a molding or forming step, a post treatment step or the like.

[Crosslinkable-group-containing Molecule Ends Which may Function as Crosslinkable-group-free Molecule Ends]

As the term "crosslinkable-group-free molecule ends" as used herein means molecule end groups incapable of crosslinking under any conditions during a molding or forming step, a post treatment step or the like as described above, a structure which becomes a crosslinkable group under certain conditions can function as a crosslinkable-group-free group when employed under conditions milder than the first-mentioned conditions.

[Preferred Crosslinkable-group-free Molecule Ends]

As crosslinkable-group-free molecule ends, those of known structures can be used either singly or in combination, and no limitation is imposed. Nonetheless, use of those represented by the chemical formula (2) is preferred. Most preferably, those of the chemical formula (2) in which T represents the chemical formula (2d) are used. Specifically, it is:

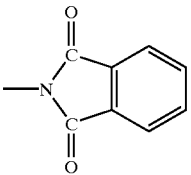

[Molar Ratio of Crosslinkable-group-containing Molecule Ends to Crosslinkable-group-free Molecule Ends]

The present invention relates to the crosslinkable-group-containing polyimide characterized in that it contains crosslinkable groups at 1 to 80 mole % of its molecule ends. It is therefore essential that the molar ratio of crosslinkable-group-containing molecule ends to crosslinkable-group-free molecule ends falls within the following range:

$$1/99 \leq [E'1]/[E'2] \leq 80/20$$

where
  [E'1]: the molar quantity of the crosslinkable-group-containing molecule ends; and
  [E'2]: the molar quantity of the crosslinkable-f-group-free molecule ends.

If the value of [E'1]/[E'2] falls short of this range and is smaller than 1/99, no sufficient crosslinking density can be achieved, leading to insufficient improvements in chemical resistance, heat resistance and mechanical properties. If the value of [E'1]/[E'2] is greater than 80/20, on the other hand, a sufficient crosslinking density is available, but upon melt molding or forming, a substantial viscosity increase takes place so that the melt molding or forming becomes infeasible.

The range of the [E'1]/[E'2] value has to be chosen appropriately depending on molding or forming conditions. In general, however, the preferred range is:

$$5/95 \leq [E'1]/[E'2] \leq 70/30,$$

and the more preferred range is:

$$10/90 \leq [E'1]/[E'2] \leq 70/30.$$

The still more preferred range varies depending on the molding or forming process. For example, in a batchwise molding or forming process, such as compression molding, that involves residence in a molten state, the still more preferred range is:

$$30/70 \leq [E'1]/[E'2] \leq 70/30,$$

and the most preferred range is:

$$40/60 \leq [E'1]/[E'2] \leq 60/40.$$

For example, in a molding or forming process, such as injection molding or extrusion, that involves residence in a molten state and requires a continuous operation, the preferred range is:

$$10/90 \leq [E'1]/[E'2] \leq 50/50,$$

and the most preferred range is:

$$20/80 \leq [E'1]/[E'2] \leq 40/60.$$

For example, in a molding or forming process that does not involve much residence in a molten state, the preferred range is:

$$20/80 \leq [E'1]/[E'2] \leq 60/40,$$

and the most preferred range is:

$$30/70 \leq [E'1]/[E'2] \leq 50/50.$$

[Structure of the Crosslinkable-group-containing Polyimide]

To form the backbone structure of the crosslinkable-group-containing polyimide according to the present invention, known polyimides are used singly, as a blend of a desired ratio, or as a copolymer of a desired ratio.

[Structure of Preferred Crosslinkable-group-containing Polyimide—(1)]

Although no limitation is imposed on the backbone structure of the crosslinkable-group-containing polyimide according to the present invention, preferred is a crosslinkable-group-containing polyimide characterized in that the backbone structure, which makes up the crosslinkable-group-containing polyimide, is substantially provided with thermoplasticity.

[What Does "Substantially Provided With Thermoplasticity" Mean?]

The expression "a backbone structure is substantially provided with thermoplasticity" as used herein means that plasticity is shown as a characteristic property of the backbone structure, specifically that a polyimide, which has been obtained by polymerizing a polyimide of the backbone structure under diamine-excess conditions and then blocking molecular chains of the polyimide at ends thereof with phthalic anhydride in a stoichiometric or greater amount, shows thermoplasticity.

[Structure of Preferred Crosslinkable-group-containing Polyimide—(2)]

Preferably, the polyimide is a crosslinkable-group-containing polyimide which permits melt molding or forming.

[Melt Molding or Forming]

The term "melt molding or forming" as used herein means a molding or forming process of the polyimide, in at least one step of which the resin is caused to flow in a molten state. The molten state of the polyimide can be achieved only at a temperature higher than its crystal melting temperature or glass transition temperature. To allow a resin to flow, the resin is required to have an adequate melt viscosity which varies depending on shearing stress which in turn differs depending on the molding or forming process. Incidentally, the temperature, shearing stress and melt viscosity differ depending on the molding or forming process.

Illustrative of the molding or forming process are extrusion, injection molding, compression molding, blow molding, vacuum forming, rotational molding, reaction injection molding, laminated molding, and casting.

[Variations in Melt Viscosity]

To continuously perform processing under steady state, variations in melt viscosity are required to be small. The term "variations in melt viscosity" means variations in viscosity when a resin is held at a processing temperature under processing shearing stress.

[Melt Viscosity]

From the foregoing, the polyimide according to the present invention is a crosslinkable-group-containing polyimide which, although no limitation is imposed on its viscosity, preferably satisfies the following numerical formulas [2] and [3] simultaneously:

$$1 \leq MV30(T)/MV5(T) \leq 10 \quad [2]$$

$$10 \leq MV5(T) \leq 10{,}000 \quad [3]$$

where

MV5(T): melt viscosity [Pa·sec] of the polyimide as measured under a desired constant shearing stress in a range of from 0.1 to 1 [MPa] after causing the polyimide to melt by holding the polyimide at a temperature T [° C.] for 5 minutes, and MV30(T): melt viscosity [Pa·sec] of the polyimide as measured under the desired constant shearing stress in the range of from 0.1 to 1 [MPa] after causing the polyimide to melt by holding the polyimide at the temperature T [° C.] for 30 minutes;

more preferably, satisfies the following numerical formulas [2], [3] and [4] simultaneously:

$$1 \leq MV30(T)/MV5(T) \leq 10 \quad [2]$$

$$10 \leq MV5(T) \leq 10{,}000 \quad [3]$$

$$MV30(T+20)/MV5(T+20) \leq 20 \quad [4]$$

where

MV5(T): melt viscosity [Pa·sec] of the polyimide as measured under a desired constant shearing stress in a range of from 0.1 to 1 [MPa] after causing the polyimide to melt by holding the polyimide at a temperature T [° C.] for 5 minutes, MV5(T+20): melt viscosity [Pa·sec] of the polyimide as measured under the desired constant shearing stress in the range of from 0.1 to 1 [MPa] after causing the polyimide to melt by holding the polyimide at a temperature T+20 [° C.] for 5 minutes, MV30(T): melt viscosity [Pa·sec] of the polyimide as measured under the desired constant shearing stress in the range of from 0.1 to 1 [MPa] after causing the polyimide to melt by holding the polyimide at the temperature T [° C.] for 30 minutes, and MV30(T+20): melt viscosity [Pa·sec] of the polyimide as measured under the desired constant shearing stress in the range of from 0.1 to 1 [MPa] after causing the polyimide to melt by holding the polyimide at a temperature T+20 [° C.] for 30 minutes; and most preferably, satisfies the following numerical formulas [2], [3] and [4b] simultaneously:

$$1 \leq MV30(T)/MV5(T) \leq 10 \quad [2]$$

$$10 \leq MV5(T) \leq 10{,}000 \quad [3]$$

$$MV30(T+20)/MV5(T+20) \leq 10 \quad [4b]$$

where

MV5(T): melt viscosity [Pa·sec] of the polyimide as measured under a desired constant shearing stress in a range of from 0.1 to 1 [MPa] after causing the polyimide to melt by holding the polyimide at a temperature T [° C.] for 5 minutes, MV5(T+20): melt viscosity [Pa·sec] of the polyimide as measured under the desired constant shearing stress in the range of from 0.1 to 1 [MPa] after causing the polyimide to melt by holding the polyimide at a temperature T+20 [° C.] for 5 minutes, MV30(T): melt viscosity [Pa·sec] of the polyimide as measured under the desired constant shearing stress in the range of from 0.1 to 1 [MPa] after causing the polyimide to melt by holding the polyimide at the temperature T [° C.] for 30 minutes, and MV30(T+20): melt viscosity [Pa·sec] of the polyimide as measured under the desired constant shearing stress in the range of from 0.1 to 1 [MPa] after causing the polyimide to melt by holding the polyimide at a temperature T+20 [° C.] for 30 minutes.

When as crosslinkable-group-containing end groups, those of the structure represented by the chemical formula (2) are used, inclusion of 360° C. within a range of the temperature T [° C.] which satisfies the above numerical formulas [2], [3], [4] and [4b] is preferred from the additional consideration of the fact that the crosslinking temperature condition for the crosslinkable groups is about 360° C. or higher.

In other words, the polyimide according to the present invention is a crosslinkable-group-containing polyimide which preferably satisfies the following numerical formulas [5] and [6] simultaneously:

$$1 \leq MV30(360)/MV5(360) \leq 10 \qquad [5]$$

$$10 \leq MV5(360) \leq 10{,}000 \qquad [6]$$

where

MV5(360): melt viscosity [Pa·sec] of the polyimide as measured under a desired constant shearing stress in a range of from 0.1 to 1 [MPa] after causing the polyimide to melt by holding the polyimide at 360 [° C.] for 5 minutes, and MV30(360): melt viscosity [Pa·sec] of the polyimide as measured under the desired constant shearing stress in the range of from 0.1 to 1 [MPa] after causing the polyimide to melt by holding the polyimide at 360 [° C.] for 30 minutes;

more preferably, satisfies the following numerical formulas [5], [6] and [8] simultaneously:

$$1 \leq MV30(360)/MV5(360) \leq 10 \qquad [5]$$

$$10 \leq MV5(360) \leq 10{,}000 \qquad [6]$$

$$MV30(380)/MV5(380) \leq 20 \qquad [8]$$

where

MV5(360): melt viscosity [Pa·sec] of the polyimide as measured under a desired constant shearing stress in a range of from 0.1 to 1 [MPa] after causing the polyimide to melt by holding the polyimide at 360 [° C.] for 5 minutes, MV5(380): melt viscosity [Pa·sec] of the polyimide as measured under the desired constant shearing stress in the range of from 0.1 to 1 [MPa] after causing the polyimide to melt by holding the polyimide at 380 [° C.] for 5 minutes, MV30(360): melt viscosity [Pa·sec] of the polyimide as measured under the desired constant shearing stress in the range of from 0.1 to 1 [MPa] after causing the polyimide to melt by holding the polyimide at 360 [° C.] for 30 minutes, MV30(380): melt viscosity [Pa·sec] of the polyimide as measured under the desired constant shearing stress in the range of from 0.1 to 1 [MPa] after causing the polyimide to melt by holding the polyimide at 380 [° C.] for 30 minutes; and most preferably, satisfies the following numerical formulas [5], [6] and [8b] simultaneously:

$$1 \leq MV30(360)/MV5(360) \leq 10 \qquad [5]$$

$$10 \leq MV5(360) \leq 10{,}000 \qquad [6]$$

$$MV30(380)/MV5(380) \leq 10 \qquad [8b]$$

where

MV5(360): melt viscosity [Pa·sec] of the polyimide as measured under a desired constant shearing stress in a range of from 0.1 to 1 [MPa] after causing the polyimide to melt by holding the polyimide at 360 [° C.] for 5 minutes, MV5(380): melt viscosity [Pa·sec] of the polyimide as measured under the desired constant shearing stress in the range of from 0.1 to 1 [MPa] after causing the polyimide to melt by holding the polyimide at 380 [° C.] for 5 minutes, MV30(360): melt viscosity [Pa·sec] of the polyimide as measured under the desired constant shearing stress in the range of from 0.1 to 1 [MPa] after causing the polyimide to melt by holding the polyimide at 360 [° C.] for 30 minutes, MV30(380): melt viscosity [Pa·sec] of the polyimide as measured under the desired constant shearing stress in the range of from 0.1 to 1 [MPa] after causing the polyimide to melt by holding the polyimide at 380 [° C.] for 30 minutes.

[Measuring Method of Melt Viscosity]

Although no particular limitation is imposed on the measuring method of a melt viscosity, the melt viscosity can be measured, for example, by a Koka-type flow tester (e.g., "CFT500A" manufactured by Shimadzu Corporation) under conditions of an orifice of 1.0 mm (diameter)×10 mm (length) and a load of 100 kgf.

It is known (from "Rheology Measuring Methods" compiled by the Rheology Committee of the Society of Polymer Science, Japanese) that in this case, shearing stress (Tw) [Pa] is determined by calculating apparent shear stress against a nozzle wall and the value so calculated is expressed by:

$$Tw = P \times R / 2Lc$$

where

P: extrusion pressure [Pa];

R: nozzle diameter/2 [cm]; and

Lc: nozzle length [cm].

The shear stress measured by this measuring method is, therefore, 0.245 [MPa].

[Gel Time]

As another parameter which also indicates whether or not a melt flow is feasible, gel time can be mentioned. The gel time of a resin at a given temperature is represented by t which satisfies the following numerical formula [7]:

$$G'(t) = G''(t) \qquad [7]$$

where

G' (t): storage modulus of the resin as measured at the given temperature and a constant frequency after an elapse of the time t [min]; and G" (t): loss modulus of the resin as measured at the given temperature and the constant frequency after an elapse of the time t (min).

No limitation is imposed on the gel time, because upon measuring the gel time, the sample temperature and the measuring frequency must be changed depending on the processing method and the properties of the resin. In the case of each polyimide in this application, however, the gel time measured at a constant sample temperature of 360° C. and 1 Hz may preferably be 10 [min] or longer, with 20 [min] or longer being more preferred.

No particular limitation is imposed on the measuring methods of the storage modulus and loss modulus. As an example, however, they can be measured by a melt viscoelasticity meter (e.g., "RDS-II" manufactured by Rheometrix Scientific F.E.) equipped with parallel plates (e.g., 25 mm disposable).

[Preferred Structure of Crosslinkable-group-containing Polyimide—(3)]

More preferably, the crosslinkable-group-containing polyimide according to the present invention is a crosslinkable-group-containing polyimide containing molecule chains each of which has a crosslinkable-group-containing end at an end thereof and a crosslinkable-group-free end at an opposite end thereof. Although no limitation is imposed on the content of the molecule-chains, their content may be preferably 0.2 mole % or higher, more preferably 1 mole % or higher, most preferably 5 mole % or higher.

The crosslinkable-group-containing polyimide—which is characterized in that it contains molecule chains, each of which has a crosslinkable-group-containing end at an end thereof and a crosslinkable-group-free end at an opposite end thereof—may more preferably be a crosslinkable-group-containing polyimide having the structure represented by the chemical formula (2c). Although no limitation is imposed on the content of the molecule chains in the polyimide either, their content may be preferably 0.2 mole % or higher, more preferably 1 mole % or higher, most preferably 5 mole % or higher.

[Preferred Structure of Crosslinkable-group-containing Polyimide—(4)]

The crosslinkable-group-containing polyimide according to the present invention may preferably contain recurring structural units represented by the chemical formula (1) in the polyimide backbone.

[More Preferred Structure of Crosslinkable-group-containing Polyimide—(1)]

One of more preferred examples of the crosslinkable-group-containing polyimide according to the present invention which has recurring structural units represented by the chemical formula (1) is characterized in that 50 to 100 mole % of the recurring structural units are recurring structural units represented by the chemical formula (1a).

Among these, most preferred are crosslinkable-group-containing polyimides 50 to 100 mole % of the recurring structural units of each of which have one of the following structures:

[More Preferred Structure of Crosslinkable-group-containing Polyimide—(2)]

Another one of the more preferred examples of the crosslinkable-group-containing polyimide according to the present invention which has recurring structural units represented by the chemical formula (1) is characterized in that 50 to 100 mole % of the recurring structural units are recurring structural units represented by the chemical formula (1b).

Among these, most preferred are crosslinkable-group-containing polyimides 50 to 100 mole % of the recurring structural units of each of which have the following structure:

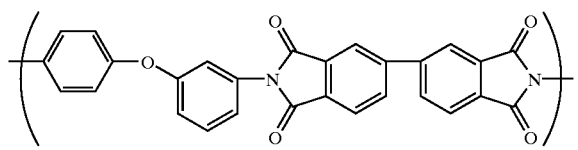

[More Preferred Structure of Crosslinkable-group-containing Polyimide—(3)]

A further one of the more preferred examples of the crosslinkable-group-containing polyimide according to the present invention which has recurring structural units represented by the chemical formula (1) is characterized in that 50 to 100 mole % of the recurring structural units are recurring structural units represented by the chemical formula (1c).

Among these, preferred are crosslinkable-group-containing polyimides 50 to 100 mole % of the recurring structural units of each of which has the chemical formula (1c) in which X is an oxygen atom, and most preferred are crosslinkable-group-containing polyimides 50 to 100 mole % of the recurring structural units of each of which has a structure represented by:

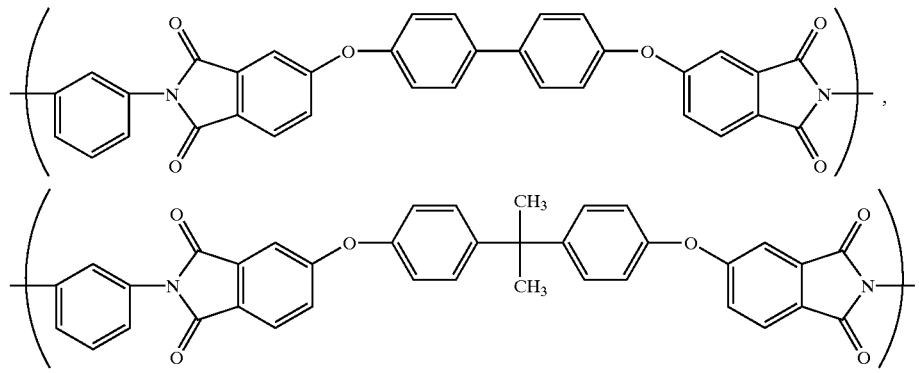

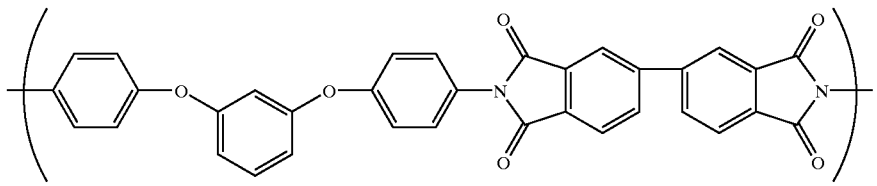

[More Preferred Structure of Crosslinkable-group-containing Polyimide—(4)]

A still further one of the more preferred examples of the crosslinkable-group-containing polyimide according to the present invention which has recurring structural units represented by the chemical formula (1) is characterized in that 50 to 100 mole % of the recurring structural units are recurring structural units represented by the chemical formula (1e).

Among these, preferred are crosslinkable-group-containing polyimides 50 to 100 mole % of the recurring structural units of each of which are recurring structural units represented by the following formula (1d):

-continued

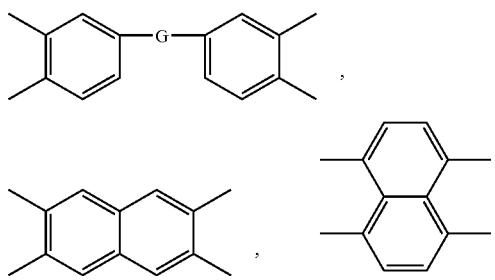

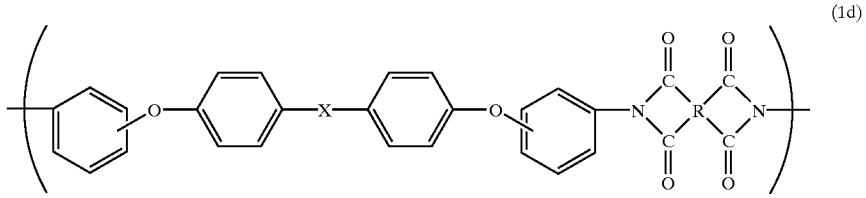

(1d)

wherein X and R are groups to be indicated next, respectively, that is,

X represents a divalent linking group selected from the group consisting of a direct bond, a carbonyl group, a sulfone group, a sulfide group, an ether group, an isopropylidene group and a hexafluoroisopropylidene group; and R represents a tetravalent aromatic group selected from the group consisting of:

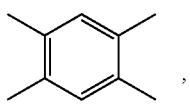

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

Among these, preferred are crosslinkable-group-containing polyimides 50 to 100 mole % of the recurring structural units of each of which has the chemical formula (1d) in which Z2 is an oxygen atom, and most preferred are crosslinkable-group-containing polyimides 50 to 100 mole % of the recurring structural units of each of which has a recurring unit structure represented by:

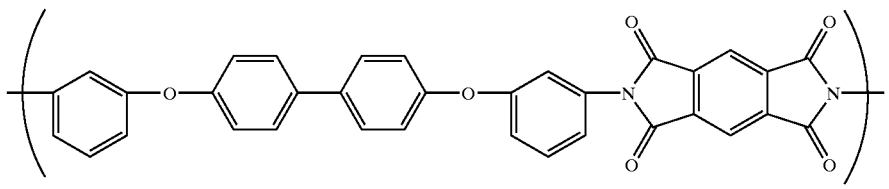

[Molecular Weight of Crosslinkable-group-containing Polyimide]

As a measure of the molecular weight of a crosslinkable-group-containing polyimide, a logarithmic viscosity number is used.

[Logarismic Viscosity Number of Crosslinkable-group-containing Polyimide]

The logarithmic viscosity number of a crosslinkable-group-containing polyimide is in a range of from 0.1 to 1.5 dL/g. A logarithmic viscosity number smaller than 0.1 leads to a decrease in the molecular weight between crosslinking points and hence to substantial reductions in mechanical properties, while a logarithmic viscosity number higher than 1.5 leads to an increase in melt viscosity and thus to a considerable reduction in melt moldability or formability. The preferred logarithmic viscosity number is in a range of from 0.2 to 1.2, with a range of from 0.3 to 0.8 being more preferred, and a range of from 0.4 to 0.6 being most preferred.

[Measuring Method of Logarithmic Viscosity Number]

The above-described logarithmic viscosity number can be measuring in a 9:1 by weight mixed solvent of p-chlorophenol and phenol, at a solution viscosity of 0.5 g/100 mL and 35° C., by using, for example, a Ubbellohde viscometer.

[Regularity When the Crosslinkable-group-containing Polyimide is a Copolymer]

When the crosslinkable-group-containing polyimide according to the present invention is a copolymer, a limitation may be imposed or may not be imposed on the specific order or regularity of recurring units of two or more kinds which make up the copolymer. Concerning the kind of the copolymer, the copolymer can be of any one of random, alternating and block structures.

[Production Process of Crosslinkable-group-containing Polyimide]

A detailed description will hereinafter be made of the process for the production of the crosslinkable-group-containing polyimide according to the present invention. However, it should be borne in mind that no limitation is imposed on the production process in the present invention.

[Raw Materials to be Used]

The crosslinkable-group-containing polyimide according to the present invention is generally obtained from the following raw materials:

(A) a diamine component;

(B) a tetracarboxylic acid dianhydride component;

(C) an end blocking agent having a crosslinkable group; and (D) an end blocking agent having no crosslinkable group.

[Diamine Component]

The diamine component usable to obtain the crosslinkable-group-containing polyimide according to the present invention can preferably be, but is not limited to, an aromatic diamine.

Examples of the diamine component can include:

a) Diamines containing one benzene ring:
  p-phenylenediamine, and
  m-phenylenediamine;

b) Diamines containing two benzene rings:
  3,3'-diaminodiphenyl ether,
  3,4'-diaminodiphenyl ether,
  4,4'-diaminodiphenyl ether,
  3,3'-diaminodiphenyl sulfide,
  3,4'-diaminodiphenyl sulfide,
  4,4'-diaminodiphenyl sulfide,
  3,3'-diaminodiphenyl sulfone,
  3,4'-diaminodiphenyl sulfone,
  4,4'-diaminodiphenyl sulfone,
  3,3'-diaminobenzophenone,
  4,4'-diaminobenzophenone,
  3,4'-diaminobenzophenone,
  3,3'-diaminodiphenylmethane,
  4,4'-diaminodiphenylmethane,
  3,4'-diaminodiphenylmethane,
  2,2-di(3-aminophenyl)propane,
  2,2-di(4-aminophenyl)propane,
  2-(3-aminophenyl)-2-(4-aminophenyl)propane,
  2,2-di(3-aminophenyl)-1,1,1,3,3,3,-hexafluoropropane,
  2,2-di(4-aminophenyl)-1,1,1,3,3,3,-hexafluoropropane,
  2-(3-aminophenyl)-2-(4-aminophenyl)-1,1,1,3,3,3,-hexafluoropropane,
  1,1-di(3-aminophenyl)-1-phenylethane,
  1,1-di(4-aminophenyl)-1-phenylethane, and
  1-(3-aminophenyl)-1-(4-aminophenyl)-1-phenylethane;

c) Diamines containing three benzene rings:
  1,3-bis(3-aminophenoxy)benzene,
  1,3-bis(4-aminophenoxy)benzene,
  1,4-bis(3-aminophenoxy)benzene,
  1,4-bis(4-aminophenoxy)benzene,
  1,3-bis(3-aminobenzoyl)benzene,
  1,3-bis(4-aminobenzoyl)benzene,
  1,4-bis(3-aminobenzoyl)benzene,
  1,4-bis(4-aminobenzoyl)benzene,
  1,3-bis(3-amino-α,α-dimethylbenzyl)benzene,
  1,3-bis(4-amino-α,α-dimethylbenzyl)benzene,
  1,4-bis(3-amino-α,α-dimethylbenzyl)benzene,
  1,4-bis(4-amino-α,α-dimethylbenzyl)benzene,
  1,3-bis(3-amino-α,α-ditrifluoromethylbenzyl)-benzene,
  1,3-bis(4-amino-α,α-ditrifluoromethylbenzyl)-benzene,
  1,4-bis(3-amino-α,α-ditrifluoromethylbenzyl)-benzene,
  1,4-bis(4-amino-α,α-ditrifluoromethylbenzyl)-benzene,
  2,6-bis(3-aminophenoxy)benzonitrile, and
  2,6-bis(3-aminophenoxy)pyridine;

d) Diamines containing four benzene rings:
 4,4'-bis(3-aminophenoxy)biphenyl,
 4,4'-bis(4-aminophenoxy)biphenyl,
 bis[4-(3-aminophenoxy)phenyl]ketone,
 bis[4-(4-aminophenoxy)phenyl]ketone,
 bis[4-(3-aminophenoxy)phenyl]sulfide,
 bis[4-(4-aminophenoxy)phenyl]sulfide,
 bis[4-(3-aminophenoxy)phenyl]sulfone,
 bis[4-(4-aminophenoxy)phenyl]sulfone,
 bis[4-(3-aminophenoxy)phenyl]ether,
 bis[4-(4-aminophenoxy)phenyl]ether,
 2,2-bis[4-(3-aminophenoxy)phenyl]propane,
 2,2-bis[4-(4-aminophenoxy)phenyl]propane,
 2,2-bis[3-(3-aminophenoxy)phenyl]-1,1,1,3,3,3-hexafluoropropane, and
 2,2-bis[4-(4-aminophenoxy)phenyl]-1,1,1,3,3,3-hexafluoropropane;
e) Diamines containing five benzene rings:
 1,3-bis[4-(3-aminophenoxy)benzoyl]benzene,
 1,3-bis[4-(4-aminophenoxy)benzoyl]benzene,
 1,4-bis[4-(3-aminophenoxy)benzoyl]benzene,
 1,4-bis[4-(4-aminophenoxy)benzoyl]benzene,
 1,3-bis[4-(3-aminophenoxy)-α,α-dimethylbenzyl]benzene,
 1,3-bis [4-(4-aminophenoxy)-α,α-dimethylbenzyl]benzene,
 1,4-bis[4-(3-aminophenoxy)-α,α-dimethylbenzyl]benzene, and
 1,4-bis[4-(4-aminophenoxy)-α,α-dimethylbenzyl]benzene;
f) Diamines containing six benzene rings:
 4,4'-bis[4-(4-aminophenoxy)benzoyl]diphenyl ether,
 4,4'-bis[4-(4-amino-α,α-dimethylbenzyl)phenoxy]benzophenone,
 4,4'-bis[4-(4-amino-α,α-dimethylbenzyl)phenoxy]diphenyl sulfone, and
 4,4'-bis[4-(4-aminophenoxy)phenoxy]diphenyl sulfone;
g) Diamines containing aromatic substituent group(s):
 3,3'-diamino-4,4'-diphenoxybenzophenone,
 3,3'-diamino-4,4'-dibiphenoxybenzophenone,
 3,3'-diamino-4-phenoxybenzophenone, and
 3,3'-diamino-4-biphenoxybenzophenone; and
h) Diamines containing a spirobiindane ring:
 6,6'-bis(3-aminophenoxy)3,3,3',3'-tetramethyl-1,1'-spirobiindane, and
 6,6'-bis(4-aminophenoxy)3,3,3',3'-tetramethyl-1,1-spirobiindane.

Also usable are diamines each of which is obtained by substituting some or all of the hydrogen atoms on one or more of the aromatic ring(s) of the corresponding one of the above-described diamines by a like number of substituent group(s) selected from fluoro, methyl, methoxy, trifluoromethyl or trifluoromethoxy groups.

Further, these diamines are also usable after in place of some or all of the hydrogen atoms on one or more of the aromatic ring(s) of each of the diamines, a like number of ethynyl group(s), benzocyclobuten-4'-yl group(s), vinyl group(s), allyl group(s), cyano group(s), isocyanate group (s), nitrilo group(s) and/or isopropenyl group(s), which can act as crosslinking points, are introduced as substituent group (s), preferably to an extent not impairing the moldability or formability. Moreover, one or more of vinylene groups, vinylidene groups and ethynylidene groups, which can act as crosslinking points, can be incorporated into each backbone skeleton, rather than as substituent group(s), preferably to an extent not impairing the moldability or formability.

In addition, for the purpose of achieving improvements in or modifications to performance, copolymerization can be conducted using one or more aliphatic diamines, to an extent not impairing various good physical properties, together with the above-described diamine. Examples of such aliphatic diamines can include:
i) Siloxanediamines:
 1,3-bis(3-aminopropyl)tetramethyldisiloxane,
 1,3-bis(4-aminobutyl)tetramethyldisiloxane,
 α,ω-bis(3-aminopropyl)polydimethylsiloxane, and
 α,ω-bis(3-aminobutyl)polydimethylsiloxane;
j) Ethyleneglycoldiamines:
 bis(aminomethyl) ether,
 bis(2-aminoethyl) ether,
 bis(3-aminopropyl) ether,
 bis(2-aminomethoxy)ethyl]ether,
 bis[2-(2-aminoethoxy)ethyl]ether,
 bis[2-(3-aminoprotoxy)ethyl]ether,
 1,2-bis(aminomethoxy)ethane,
 1,2-bis(aminoethoxy)ethane,
 1,2-bis[2-(aminomethoxy)ethoxy]ethane,
 1,2-bis[-2-(2-aminomethoxy)ethoxy]ethane,
 ethylene glycol bis(3-aminopropyl) ether,
 diethylene glycol bis(3-aminopropyl) ether, and
 triethylene glycol bis(3-aminopropyl) ether;
k) Methylenediamines:
 1,3-diaminopropane,
 1,4-diaminobutane,
 1,5-diaminopentane,
 1,6-diaminohexane,
 1,7-diaminoheptane,
 1,8-diaminooctane,
 1,9-diaminononane,
 1,10-diaminodecane,
 1,11-diaminoundecane, and
 1,12-diaminododecane; and
l) Alicyclic diamines:
 1,2-diaminocyclohexane,
 1,3-diaminocyclohexane,
 1,4-diaminocyclohexane,
 1,2-di(2-aminoethyl)cyclohexane,
 1,3-di(2-aminoethyl)cyclohexane,
 1,4-di(2-aminoethyl)cyclohexane,
 bis(4-aminocyclohexyl)methane,
 2,6-bis(aminomethyl)bicyclo[2.2.1]heptane, and
 2,5-bis(aminomethyl)bicyclo[2.2.1]heptane.

These diamines can be used either singly or in combination as needed.

[Preferred Diamine Components]

Among the above-exemplified diamine components, preferred diamines are those represented by the chemical formula (4).

[More Preferred Diamine Components (1)]

Among the diamines represented by the chemical formula (4), diamines of a more preferred type are those represented by the chemical formula (4c). When these more preferred diamine components are used, it is particularly preferred to use them in a proportion of 50 to 100 mole %.

Usable examples of the diamines represented by the chemical formula (4c) can include:

1,3-bis(3-aminophenoxy)benzene,
1,3-bis(4-aminophenoxy)benzene,
1,4-bis(3-aminophenoxy)benzene,
1,4-bis(4-aminophenoxy)benzene,
1,3-bis(3-aminobenzoyl)benzene,
1,3-bis(4-aminobenzoyl)benzene,
1,4-bis(3-aminobenzoyl)benzene,
1,4-bis(4-aminobenzoyl)benzene,
1,3-bis(3-amino-α,α-dimethylbenzyl)benzene,
1,3-bis(4-amino-α,α-dimethylbenzyl)benzene,
1,4-bis(3-amino-α,α-dimethylbenzyl)benzene,
1,4-bis(4-amino-α,α-dimethylbenzyl)benzene,
1,3-bis(3-amino-α,α-ditrifluoromethylbenzyl)-benzene,
1,3-bis(4-amino-α,α-ditrifluoromethylbenzyl)-benzene,
1,4-bis(3-amino-α,α-ditrifluoromethylbenzyl)-benzene,
1,4-bis(4-amino-α,α-ditrifluoromethylbenzyl)-benzene,
2,6-bis(3-aminophenoxy)benzonitrile, and
2,6-bis(3-aminophenoxy)pyridine.

Among these, particularly preferred diamines are:
1,3-bis(3-aminophenoxy)benzene,
1,3-bis(4-aminophenoxy)benzene,
1,4-bis(3-aminophenoxy)benzene,
1,4-bis(4-aminophenoxy)benzene,
1,3-bis(3-aminobenzoyl)benzene,
1,3-bis(4-aminobenzoyl)benzene,
1,4-bis(3-aminobenzoyl)benzene, and
1,4-bis(4-aminobenzoyl)benzene; and
the most preferred diamine is:
    1,3-bis(4-aminophenoxy)benzene.

[More Preferred Diamine Components (2)]

Among the diamines represented by the chemical formula (4), diamines of another more preferred type are those represented by the chemical formula (4d). When these more preferred diamine components are used, it is particularly preferred to use them in a proportion of 50 to 100 mole %.

Examples of the diamines represented by the chemical formula (4d) can include:

4,4'-bis(3-aminophenoxy)biphenyl,
bis[4-(3-aminophenoxy)phenyl]ketone,
bis[4-(3-aminophenoxy)phenyl]sulfide,
bis[4-(3-aminophenoxy)phenyl]sulfone,
bis[4-(3-aminophenoxy)phenyl]ether,
2,2-bis[4-(3-aminophenoxy)phenyl]propane, and
2,2-bis[3-(3-aminophenoxy)phenyl]-1,1,1,3,3,3-hexafluoropropane.

Among these, the particularly preferred diamine component is:
4,4'-bis(3-aminophenoxy)biphenyl.

[Tetracarboxylic Acid Dianhydride Component]

No limitation is imposed on the tetracarboxylic acid dianhydride component employed to obtain the polyimide according to the present invention, and the following illustrative tetracarboxylic acid dianhydrides can be used either singly or in combination as desired:

pyromellitic dianhydride,
3,3'4,4'-biphenyltetracarboxylic acid dianhydride,
3,3'4,4'-benzophenonetetracarboxylic acid dianhydride,
bis(3,4-dicarboxyphenyl)ether dianhydride,
bis(3,4-dicarboxyphenyl)sulfide dianhydride,
bis(3,4-dicarboxyphenyl)sulfone dianhydride,
2,2-bis(3,4-dicarboxyphenyl)propane dianhydride,
2,2-bis(3,4-dicarboxyphenyl)-1,1,1,3,3,3-hexafluoropropane dianhydride,
1,3-bis(3,4-dicarboxyphenoxy)benzene dianhydride,
1,4-bis(3,4-dicarboxyphenoxy)benzene dianhydride,
4,4'-bis(3,4-dicarboxyphenoxy)biphenyl dianhydride,
2,2-bis[(3,4-dicarboxyphenoxy)phenyl]propane dianhydride,
2,3,6,7-naphthalenetetracarboxylic acid dianhydride,
1,4,5,8-naphthalenetetracarboxylic acid dianhydride,
ethylenetetracarboxylic acid dianhydride,
butanetetracarboxylic acid dianhydride,
cyclopentanecarboxylic acid dianhydride,
2,2',3,3'-bezophenonetetracarboxylic acid dianhydride,
2,2',3,3'-biphenyltetracarboxylic acid dianhydride,
2,2-bis(2,3-dicarboxyphenyl)propane dianhydride,
2,2-bis(2,3-dicarboxyphenyl)-1,1,1,3,3,3-hexafluoropropane dianhydride,
bis(2,3-dicarboxyphenyl)ether dianhydride,
bis(2,3-dicarboxyphenyl)sulfide dianhydride,
bis(2,3-dicarboxyphenyl)sulfone dianhydride,
1,3-bis(2,3-dicarboxyphenoxy)benzene dianhydride,
1,4-bis(2,3-dicarboxyphenoxy)benzene dianhydride, and
1,2,5,6-naphthalenetettacarboxylic acid dianhydride.

In combination with all the kinds of the above-described tetracarboxylic acid dianhydride components, diamines in each of which some or all of the hydrogen atoms on one or more of the aromatic ring(s) have been replaced by a like number of substituent groups selected from fluoro groups, methyl groups, methoxy groups, trifluoromethyl groups and/or trifluoromethoxy groups can be used.

Further, the above-described diamines are also usable after in place of some or all of the hydrogen atoms on one or more of the aromatic ring(s) of each of the diamines, a like number of ethynyl group(s), benzocyclobuten-4'-yl group(s), vinyl group(s), allyl group(s), cyano group(s), isocyanate group(s), nitrilo group(s) and/or isopropenyl group(s), which can act as crosslinking points, are introduced as substituent group(s), preferably to an extent not impairing the moldability or formability. Moreover, one or more of vinylene groups, vinylidene groups and ethynylidene groups, which can act as crosslinking points, can be incorporated into each backbone skeleton, rather than as substituent group(s), preferably to an extent not impairing the moldability or formability.

These tetracarboxylic acid dianhydride components can be used either singly or in combination as needed.

Depending on the production process, tetracarboxylic acid monoanhydrides, tetracarboxylic compounds other than anhydrides, or their derivatives such as salts can also be used as desired instead of such dianhydrides.

[Preferred Tetracarboxylic Acid Dianhydride Components]

Among the above-exemplified tetracarboxylic acid dianhydride components, preferred tetracarboxylic acid dianhydrides are tetracarboxylic acid dianhydrides represented by the chemical formula (5). Specific examples can include:

pyromellitic dianhydride,
3,3'4,4'-biphenyltetracarboxylic acid dianhydride,
3,3'4,4'-benzophenonetetracarboxylic acid dianhydride, bis(3,4-dicarboxyphenyl)ether dianhydride,
bis(3,4-dicarboxyphenyl)sulfide dianhydride,
bis(3,4-dicarboxyphenyl)sulfone dianhydride,
2,2-bis(3,4-dicarboxyphenyl)propane dianhydride,
2,2-bis(3,4-dicarboxyphenyl)-1,1,1,3,3,3-hexafluoropropane dianhydride,
1,3-bis(3,4-dicarboxyphenoxy)benzene dianhydride,
1,4-bis(3,4-dicarboxyphenoxy)benzene dianhydride,
4,4'-bis(3,4-dicarboxyphenoxy)biphenyl dianhydride,
2,2-bis[(3,4-dicarboxyphenoxy)phenyl]propane dianhydride,
2,3,6,7-naphthalenetetracarboxylic acid dianhydride, and
1,4,5,8-naphthalenetetracarboxylic acid dianhydride,

[More Preferred Tetracarboxylic Acid Dianhydride Components]

Among the diamines represented by the chemical formula (5), more preferred tetracarboxylic acid dianhydrides can be:
pyromellitic dianhydride,
3,3'4,4'-biphenyltetracarboxylic acid dianhydride,
3,3'4,4'-benzophenonetetracarboxylic acid dianhydride,
bis(3,4-dicarboxyphenyl)ether dianhydride,
bis(3,4-dicarboxyphenyl)sulfide dianhydride,
bis(3,4-dicarboxyphenyl)sulfone dianhydride,
2,2-bis(3,4-dicarboxyphenyl)-1,1,1,3,3,3-hexafluoropropane dianhydride, and
1,4-bis(3,4-dicarboxyphenoxy)benzene dianhydride.

One or more tetracarboxylic acid dianhydride components selected from the group consisting of these more preferred tetracarboxylic acid dianhydrides can be used.

[Amount of the Tetracarboxylic Acid Dianhydride Component to be Used]

The total amount of the tetracarboxylic acid dianhydride is from 0.8 to 1.25 moles per mole of the total amount of the diamine component to be used. By changing this molar ratio, the molecular weight of the resulting crosslinkable-group-containing polyimide can be controlled. A molar ratio lower than 0.8 cannot provide a molecular weight high enough to bring about sufficient properties, while a molar ratio higher than 1.25 leads to a reduction in the molecular weight.

When a dicarboxylic acid or its anhydride or derivative is used as an end blocking agent, the total amount of the tetracarboxylic acid dianhydride component may be preferably from 0.8 to 0.99, more preferably from 0.85 to 0.97 per mole of the total amount of the diamine component to be used, with a range of from 0.90 to 0.95 being most preferred.

In this case, use of a tetracarboxylic acid dianhydride component beyond the above range results in insufficient end blocking, thereby causing adverse effects on the thermal stability and moldability or formability.

When a monoamine is used as an end blocking agent, the total amount of the tetracarboxylic acid dianhydride component to be used may be preferably from 1.01 to 1.25 moles, more preferably from 1.05 to 1.20 moles per mole of the total amount of the diamine component to be used, with a range of from 1.07 to 1.15 being most preferred.

In this case, use of a tetracarboxylic acid dianhydride component below the above range results in insufficient end blocking, thereby causing adverse effects on the thermal stability and moldability or formability.

The control of the molecular weight of the crosslink-able-group-containing polyimide can be achieved by adjusting the molar ratio of the total amount of the tetracarboxylic acid dianhydride component to the total amount of the diamine component to be used. Depending on the polymerization process, the kind of the solvent, the polymerization time, the polymerization time and the like, however, their optimum charging ratio may differ in some instances.

[Crosslinkable-group-containing End Blocking Agent]

No limitation is imposed on the crosslinkable-group-containing end blocking agent to be used in the present invention. Crosslinkable-group-containing end blocking agents of various kinds are usable depending on the synthesis process of the polyimide, including monoamines and dicarboxylic acid anhydrides as representative examples. As crosslinkable group(s) to be introduced, a variety of known crosslinkable groups can be selected in accordance with molding or forming conditions.

Although no limitation is imposed on the kind of the crosslinkable group(s), representative examples can include ethynyl group, benzocyclobuten-4'-yl group, vinyl group, allyl group, cyano group, isocyanate group, nitrilo group, amino group, isopropenyl group, vinylene group, vinylidene group, and ethynylidene group.

[Preferred Crosslinkable-group-containing End Blocking Agents]

The crosslinkable-group-containing end blocking agent usable in the present invention may preferably be a crosslinkable-group-containing dicarboxylic acid anhydride. Depending on the synthesis process, its ring-opened product or its derivative such as its salt can be used.

Examples can include:

unsaturated aliphatic dicarboxylic acid anhydrides represented by maleic anhydride and nadic anhydride, ethynyl-containing dicarboxylic acid anhydrides, represented by 1-phenyl-2-(3,4-dicarboxyphenyl)acetylene anhydride, ethynylphthalic anhydride and 6-ethynyl-2,3-dicarboxynaphthalene anhydride, and phthalic acid anhydrides or 2,3-dicarboxynaphthalene anhydride derivatives containing a benzocyclo-buten-4'-yl group, vinyl group, allyl group or isopropenyl group.

[End Blocking Agents Containing More Preferred Crosslinking Group]

The crosslinkable group contained in the structure may preferably be an ethynyl group, with one containing a phenylethynylbenzene structure being more preferred.

[End Blocking Agents Containing Still More Preferred Crosslinking Group]

The crosslinkable-group-containing end blocking agent usable in the present invention may more preferably be a dicarboxylic acid anhydride represented by the chemical formula (3a).

Specific examples are:
1-phenyl-2-(3,4-dicarboxyphenyl)acetylene anhydride,
1-phenyl-2-(3-(3,4-dicarboxyphenoxy)phenyl)acetylene anhydride,
1-phenyl-2-(3-(3,4-dicarboxyphenylcarbonyl)phenyl)acetylene anhydride,
1-phenyl-2-(3-(3,4-dicarboxyphenylsulfonyl)phenyl)acetylene anhydride,
1-phenyl-2-(3-(3,4-dicarboxyphenylsulfinyl)phenyl)acetylene anhydride,
1-phenyl-2-(3-(2-(3,4-dicarboxyphenyl)isopropanyl)phenyl)acetylene anhydride,
1-phenyl-2-(3-(1,1,1,3,3,3-hexafluoro-2-(3,4-dicarboxyphenyl)isopropanyl)phenyl)acetylene anhydride,
1-phenyl-2-(3-(3,4-dicarboxyphenyl)phenyl)acetylene anhydride, 1-phenyl-2-(4-(3,4-dicarboxyphenyl)phenyl)acetylene anhydride, 1-phenyl-2-(4-(3,4-dicarboxyphenylcarbonyl)phenyl) acetylene anhydride, 1-phenyl-2-(4-(3,4-dicarboxyphenylsulfonyl)phenyl) acetylene anhydride, 1-phenyl-2-(4-(3,4-dicarboxyphenylsulfinyl)phenyl) acetylene anhydride, 1-phenyl-2-(4-(2-(3,4-dicarboxyphenyl)isopropanyl) phenyl)acetylene anhydride, 1-phenyl-2-(4-(1,1,1,3,3,3-hexafluoro-2-(3,4-dicarboxyphenyl)isopropanyl)-phenyl)acetylene anhydride, 1-phenyl-2-(4-(3,4-dicarboxyphenyl)phenyl)acetylene anhydride, and 2 3-dicarboxy-6-phenylethynyl)naphthalene anhydride.

The above-described, crosslinkable-group-containing end blocking agents can be used either singly or in combination. End blocking agents in each of which some or all of the hydrogen atoms on one or more of the aromatic ring(s) have been replaced by a like number of substituent groups selected from fluoro groups, methyl groups, methoxy groups, trifluoromethyl groups and/or trifluoromethoxy groups can also be used.

Further, the above-described, crosslinkable-group-containing dicarboxylic acid anhydrides are also usable after in place of some or all of the hydrogen atoms on one or more of the aromatic ring(s) of each of the anhydrides, a like number of ethynyl group(s), benzocyclobuten-4'-yl group (s), vinyl group(s), allyl group(s), cyano group(s), isocyanate group(s), nitrilo group(s) and/or isopropenyl group(s), which can act as crosslinking points, are introduced as substituent group(s), preferably to an extent not impairing the moldability or formability.

[Most Preferred, Crosslinkable-group-containing End Blocking Agent]

Among the above-described, crosslinkable-group-containing end blocking agents, 1-phenyl-2-(3,4-dicarboxyphenyl) acetylene anhydride is most preferred from the standpoint of the properties and practical application of the crosslinkable-group-containing polyimide according to the present invention.

[Crosslinkable-group-free End Blocking Agent]

No limitation is imposed on the crosslinkable-group-free end blocking agent usable in the present invention. Depending on the synthesis process of the polyimide, a variety of crosslinkable-group-free end blocking agents can be used. Representative examples are monoamines or dicarboxylic acid anhydrides. It is essential that a group, which may function as a crosslinking group under conditions of a molding or forming step or post-treatment step, is not contained in the structure. Examples of the crosslinking group can include ethynyl group, benzocyclobuten-4'-yl group, vinyl group, allyl group, cyano group, isocyanate group, nitrilo group, amino group, isopropenyl group, vinylene group, vinylidene group, and ethynylidene group.

[Preferred, Crosslinkable-group-free End Blocking Agents]

The crosslinkable-group-free end blocking agent usable in the present invention may preferably be a dicarboxylic acid anhydride. Depending on the synthesis process, its ring-opened product or its derivative such as its salt can be used.

Specific examples are:

phthalic anhydride, 4-phenylphthalic anhydride, 4-phenoxyphthalic anhydride, 4-phenylsulfinylphthallic acid, 4-phenylcarbonylphthalic acid, 4-(2-phenylisopropyl)phthalic anhydride, 4-(1,1,1,3,3,3-hexafluoro-2-phenylisopropyl)phthalic anhydride, 2,3-naphthalenedicarboxylic anhydride, and 1,8-naphthalenedicarboxylic anhydride.

The above-described dicarboxylic acid anhydrides can be used either singly or in combination. Diamines in each of which some or all of the hydrogen atoms on one or more of the aromatic ring(s) have been replaced by a like number of substituent groups selected from fluoro groups, methyl groups, methoxy groups, trifluoromethyl groups and/or trifluoromethoxy groups can also be used.

[Most Preferred, Crosslinkable-group-free End Blocking Agent]

Among the above-described dicarboxylic acid anhydrides, phthalic acid is most preferred from the standpoint of the properties and practical application of the crosslinkable-group-containing polyimide according to the present invention.

[Molar ratio of the Crosslinkable-group-containing End Blocking Agent to the Crosslinkable-group-free End Blocking Agent]

No limitation is imposed on the molar ratio of the crosslinkable-group-containing blocking agent to the crosslinkable-group-free blocking agent insofar as the ends of the synthesized crosslinkable-group-containing polyimide satisfy the conditions that "the molecule ends have crosslinking groups at 1 to 80 mole % thereof". Preferably, however, their molar ratio falls within the following range:

$$1/99 \leq [E1]/[E2] \leq 80/20$$

where

[E1]: the molar quantity of the used crosslinkable-group-containing blocking agent; and

[E2]: the molar quantity of the used crosslinkable-group-free blocking agent ends.

If the value of [E1]/[E2] falls short of this range and is smaller than 1/99, no sufficient crosslinking density can be achieved, leading to insufficient improvements in chemical resistance, heat resistance and mechanical properties. If the value of [E1]/[E2] is greater than 80/20, on the other hand, a sufficient crosslinking density is available, but upon melt molding or forming, a substantial viscosity increase takes place so that the melt molding or forming becomes infeasible.

The range of the [E1]/[E2] value has to be chosen appropriately depending on molding or forming conditions. In general, however, the preferred range is:

$$5/95 \leq [E1]/[E2] \leq 70/30,$$

and the more preferred range is:

$$10/90 \leq [E1]/[E2] \leq 70/30.$$

The still more preferred range varies depending on the molding or forming process. For example, in a batchwise molding or forming process, such as compression molding, that involves residence in a molten state, the still more preferred range is:

$$30/70 \leq [E1]/[E2] \leq 70/30,$$

and the most preferred range is:

$$40/60 \leq [E1]/[E2] \leq 60/40.$$

For example, in a molding or forming process, such as injection molding or extrusion, that involves residence in a molten state and requires a continuous operation, the preferred range is:

$$10/90 \leq [E1]/[E2] \leq 50/50,$$

and the most preferred range is:

$$20/80 \leq [E1]/[E2] \leq 40/60.$$

For example, in a molding or forming process that does not involve much residence in a molten states the preferred range is:

$$20/80 \leq [E1]/[E2] \leq 60/40,$$

and the most preferred range is:

$$30/70 \leq [E1]/[E2] \leq 50/50.$$

[Amount of the End Blocking Agent to be Used]

No limitation is imposed on the amount of the end blocking agent to be used, insofar as the conditions that the ends of the synthesized crosslinkable-group-containing polyimide satisfy the conditions that "the molecule ends have crosslinking groups at 1 to 80 mole % thereof".

However, the end blocking agent may be used in an amount that satisfies preferably the following range:

$$([Dc]-[Ma])/([Da]-[Tc]) > 2,$$

more preferably the following range:

$$20 > ([Dc]-[Ma])/([Da]-[Tc]) > 3$$

where

[Da]: total amount of the diamine component (mol),

[Tc]: total amount of the tetracarboxylic acid dianhydride component (or its ring-opened product or derivative) (mol),

[Ma]: total amount of the monoamine component to be used as an end blocking agent (mol), and

[Dc]: total amount of the dicarboxylic acid anhydride component (or its ring-opened product or derivative) to be used as an end blocking agent (mol).

If the value of ([Dc]-[Ma])/([Da]-[Tc]) falls short of this range and is smaller than it, no sufficient blocking of molecule ends is feasible, resulting in deteriorations in thermal stability, thermal oxidation stability, and moldability or formability. If the value exceeds the above range, on the other hand, it becomes difficult to control the molecular weight and also to wash off any extra portion of the end blocking agent.

[Production Process of the Crosslinkable-group-containing Polyimide]

The polyimide can be obtained by providing the above-described raw materials and conducting polymerization and imidation by known methods. Although no limitation is imposed on the production process, the polymerization is generally conducted in a solvent.

Examples of the process can generally include:

A) a process which comprises stirring a diamine component and a tetracarboxylic acid dianhydride component in a solvent to obtain a crosslinkable-group-containing polyamic acid and then thermally or chemically conducting its dehydrating imidation, and B) a direct polymerization process which comprises directly heating a diamine component and a tetracarboxylic acid dianhydride component in a form dissolved or suspended in a solvent such that dehydrating imidation is thermally effected.

[Polymerization Solvent]

Examples of the solvent can include:

m) Phenol solvents:
Phenol, o-chlorophenol, m-chlorophenol, p-chlorophenol, o-cresol, m-cresol, p-cresol, 2,3-xylenol, 2,4-xylenol, 2,5-xylenol, 2,6-xylenol, 3,4-xylenol, and 3,5-xylenol;

n) Aprotonic amide solvents:
N,N-Dimethylformamide, N,N-dimethylacetamide, N,N-diethylacetamide, N-methyl-2-pyrrolidone, 1,3-dimethyl-2-imidazolidine, N-methylcaprolactam, and hexamethylphosphorotriamide;

o) Ether solvents:
1,2-Dimethoxyethane, bis(2-methoxyethyl)ether, 1,2-bis(2-methoxyethoxy)ethane, tetrahydrofuran, bis[2-(2-methoxyethoxy)ethyl]ether, and 1,4-dioxane;

p) Amine solvents:
Pyridine, quinoline, isoquinoline, α-picoline, β-picoline, γ-picoline, isophorone, piperidine, 2,4-lutidine, 2,6-lutidine, trimethylamine, triethylamine, tripropylamine, and tributylamine; and q) Other solvents:
Dimethyl sulfoxide, dimethyl sulfone, diphenyl ether, sulphorane, diphenyl sulfone, tetramethylurea, anisole, and water.

These solvents can be used either singly or in combination. Each of these solvents can also be used by mixing it with one or more of solvents to be described subsequently herein under r), s), t) and u). When used as a mixture, it is not absolutely necessary to choose solvents in such a combination that allows the solvents to be mutually dissolved at a desired ratio, and no problem or inconvenience arises even if they cannot be mixed or their mixture is not homogeneous.

[Polymerization Concentration]

Absolutely no limitation is imposed on the concentration at which polymerization is to be conducted in such a solvent. Expressing the proportion of the total weight of the whole diamine component and the whole tetracarboxylic acid dianhydride component in terms of percentage on the basis of the total weight of the whole solvent, the whole diamine component and the whole tetracarboxylic acid dianhydride component, the preferred polymerization concentration is from 5 to 50%, with 10 to 30% being more preferred.

[Charging Order]

No limitation is imposed on the order in which the diamine component, the tetracarboxylic acid dianhydride component and the end blocking agent are charged when the diamine component, the tetracarboxylic acid dianhydride component or the end blocking agent consists of two or more kinds of diamines, dianhydrides or blocking agents, they can be added in an arbitrary order. It is also discretionary to add each component or agent at once or in portions.

[Polymerization Conditions]

No particular limitation is imposed on the polymerization temperature, polymerization time or polymerization pressure. Known conditions can be applied.

The polymerization temperature may generally be in a range of from −10° C. to 10° C. in the case of the polymerization of the crosslinkable-group-containing polyamic acid, and is a range of from 50° C. to 250° C. in the case of the imidation. The reaction time may generally be from 1 to 48 hours, although it differs depending on the kinds of the monomers to be used, the kind of the solvent to be employed or the kind of the reaction temperature to be employed. Further, as the reaction pressure, atmospheric pressure is sufficient.

[Logarithmic Viscosity Number of Crosslinkable-group-containing Polyamic Acid]

When polymerization is conducted through a crosslinkable-group-containing polyamic acid, the logarithmic viscosity number of the crosslinkable-group-containing polyamic acid may preferably be in a range of from 0.1 to 2.0 dL/g (as measured at a concentration of 0.5 g/dL and 35° C. in N,N-dimethylacetamide). A logarithmic viscosity number smaller than 0.1 leads to a decrease in the molecular weight between crosslinking points so that mechanical properties are lowered significantly, whereas a logarithmic viscosity number greater than 2.0 leads to an increase in melt viscosity so that melt moldability or formability is reduced substantially. The preferred logarithmic viscosity number is in a range of from 0.3 to 1.2, with a range of from 0.4 to 0.7 being more preferred.

[Chemical Imidation]

Chemical imidation is a process to chemically effect dehydration by reacting the crosslinkable-group-containing polyamic acid with a dehydrating agent having hydrolytic ability.

Usable examples of the dehydrating agent can include aliphatic carboxylic acid anhydrides represented by acetic anhydride and trifluoroacetic anhydride; phosphoric acid anhydrides represented by polyphosphoric acid and phosphorus pentoxide; mixed acid anhydrides of these acids; and acid chlorides led by chloromethanesulfonic acid, phosphorus pentoxide and thionyl chloride. These dehydrating agents can be used either singly or in combination. These dehydrating agents can be used in an amount of 2 to 10 moles, preferably 2.1 to 4 moles, per mole of the whole amount of the diamine component to be used.

Further, chemical imidation can also be conducted in the presence of a base catalyst. As the base catalyst so used, the amine solvents mentioned above under p) can be mentioned. In addition, organic bases such as imidazole, N,N-dimethylaniline and N,N-diethylaniline as well as inorganic bases such as potassium hydroxide, sodium hydroxide, potassium carbonate, sodium carbonate, potassium hydrogencarbonate and sodium hydrogencarbonate can be mentioned. These catalysts can be used in an amount of from 0.001 to 0.50 mole, preferably from 0.05 to 0.2 mole, per mole of the whole amount of the diamine component to be used.

No particular limitation is imposed on the reaction temperature, reaction time and reaction pressure for the chemical imidation process, and known conditions can be applied. Described specifically, the reaction temperature may preferably be from −10° C. to around 120° C., with a range of from around room, temperature to 70° C. being more preferred. It is room temperature that is most preferable and practical from the standpoint of practice. On the other hand, the reaction time may preferably be from about 1 to 24 hours although it differs depending on the kind of the solvent to be used and other reaction conditions. More preferably, the reaction time may be from 2 to around 10 hours. As the reaction pressure, atmospheric pressure is sufficient. As the atmosphere, air, nitrogen, helium, neon or argon is usable, and no particular limitation is imposed thereon. Preferably, however, nitrogen or argon which is an inert gas is chosen.

[Thermal Imidation]

Thermal imidation can be achieved by heating polyamic acid or its solution generally to 100° C. to 300° C.

The thermal imidation can also conducted in the concurrent presence of a similar base catalyst as that employed in the chemical imidation process.

No particular limitation is imposed on the reaction temperature, reaction time and reaction pressure for the thermal imidation process, and known conditions can be applied. Described specifically, as the reaction temperature, 80° C. to around 400° C. can be used, with a range of from 100° C. to around 300° C. being preferred. On the other hand, the reaction time may preferably be from 0.5 to 24 hours although it differs depending on the kind of the solvent to be used and other reaction conditions. As the reaction pressure, atmospheric pressure is sufficient. As the atmosphere, air, nitrogen, helium, neon or argon is usable, and no particular limitation is imposed thereon. Preferably, however, nitrogen or argon which is an inert gas is chosen.

[Combined Use of Chemical Imidation and Thermal Imidation]

Chemical imidation and thermal imidation can be used in combination.

Illustrative are:

A) a process in which heating is also conducted at the same time upon practice of the above-described chemical imidation process, and B) a process in which upon conducting the above-described thermal imidation process, a dehydrating agent useful in chemical imidation is caused to exist concurrently.

[Direct Polymerization Process]

The term "direct polymerization process" as used herein means a process which comprises directly heating a diamine component and a tetracarboxylic acid dianhydride component in a form dissolved or suspended in a solvent such that dehydrating imidation is thermally effected. This direct polymerization is achieved by conducting polymerization and imidation in a solvent in a similar manner as in thermal imidation.

Like the chemical imidation process, the direct polymerization process can also be conducted in the concurrent presence of a base catalyst. Usable base catalysts and their amount to be used are the same as those described above in connection with the chemical imidation process.

Further, to take out of the system water which is to be formed by the dehydrating imidation reaction, it is also possible to make another solvent exist at the same time. Solvents which are usable here can include:

r) benzene, toluene, o-xylene, m-xylene, p-xylene, chlorobenzene, o-dichlorobenzene, m-dichlorobenzene, p-dichlorobenzene, bromobenzene, o-dibromobenzene, m-dibromobenzene, p-dibromobenzene, o-chlorotoluene, m-chlorotoluene, p-chlorotoluene, o-bromotoluene, m-bromotoluene, and p-bromotoluene.

These solvents can be used either singly or in combination. Each of these solvents can also be used by further mixing it with one or more of the solvents described above under m) to q) and the solvents to be described subsequently under s) to u). When used as a mixture, it is not absolutely necessary to choose solvents in such a combination that allows the solvents to be mutually dissolved at a desired ratio, and no problem or inconvenience arises even if they cannot be mixed or their mixture is not homogeneous. Absolutely no limitation is imposed on the amount of the dehydrating agent to be used.

No particular limitation is imposed on the reaction temperature, reaction time and reaction pressure, and known conditions can be applied. Described specifically, as the reaction temperature, 100° C. to around 300° C. can be applied, with a range of from 120° C. to around 250° C. being preferred. On the other hand, the reaction time may generally be from 0.5 hour to 24 hours although it differs depending on the kind of the solvent to be used and other reaction conditions. As the reaction pressure, atmospheric pressure is sufficient. As the atmosphere, air, nitrogen, helium, neon or argon is usable, and no particular limitation is imposed thereon. Preferably, however, nitrogen or argon which is an inert gas is chosen.

[Treatment of the Crosslinkable-group-containing Polyimide]

The crosslinkable-group-containing polyimide can be improved in chemical resistance, heat resistance, mechanical properties and the like by subjecting it to intermolecular crosslinking through its treatment during or after its molding or forming.

Conditions for such a crosslinking reaction are not limited and can be set as desired. Further, these conditions significantly vary depending on the kind and quantity of crosslinkable groups to be used.

When crosslinkable-group-containing molecule ends are represented by the chemical formula (2a), for example, the preferred crosslinking method is heat treatment, and by the heat treatment, carbon-carbon triple bonds are thermally caused to react so that crosslinks are formed between molecular chains.

[Conditions for the Heat Treatment]

When crosslinkable-group-containing molecule ends are represented by the chemical formula (2a), the temperature, time and pressure of the heat treatment are not particularly limited, and are determined depending on properties required for a crosslinked thermoplastic polyimide to be obtained. As the temperature of the heat treatment, 250° C. to around 450° C., preferably 300° C. to around 400° C. can be applied, with 330° C. to around 380° C. being most preferred from the standpoint of practice. At a temperature lower than 250° C. the crosslinking reaction hardly takes, while at a temperature higher than 450° C., polyimide backbones undergo modifications so that their properties cannot be obtained sufficiently.

Although the time of the heat treatment differs depending on the other conditions for the heat treatment, it may be preferably 0.1 hour or longer, more preferably 0.2 hour or longer, and the most preferred time is 1 hour or longer.

A heat treatment time shorter than this time results in an insufficient crosslinking density, thereby practically failing to observe improvements in physical properties.

On the other hand, an excessively long crosslinking time is disadvantageous from the standpoint of the process efficiency, and depending on the backbone structure, there is a potential problem of modifications. The upper limit of a preferred heat treatment time is 100 hours.

As the pressure for the heat treatment, atmospheric temperature is sufficient. If necessary, however, it is also possible to adopt such a process that heat treatment is effected while conducting degasfication or the like under elevated pressure.

As the atmosphere, air, nitrogen, helium, neon or argon is usable, and no particular limitation is imposed thereon. Preferably, however, nitrogen or argon which is an inert gas is chosen.

[Heat Treatment Method]

The heat treatment method differs depending on the form of a crosslinkable-group-containing polyimide, and no limitation is imposed thereon. When a crosslinkable-group-containing polyimide obtained, for example, in the form of powder or granules is used, examples of its heat treatment method can include:

A) to subject it, as is, to heat treatment;
B) to apply melt molding or forming to obtain a molded or formed product shaped as desired, and then to subject the molded or formed product to heat treatment;
C) to simultaneously conduct heat treatment while applying melt molding or forming; and
D) to conduct its heat treatment, as is, to an intermediate extent, then to apply melt molding or forming to obtain a molded or formed product shaped as desired, and thereafter to subject the molded or formed product to heat treatment again.

As their applications, the followings are possible, respectively:

A) as a crosslinked thermoplastic polyimide is obtained in the form of powder or granules, it can be added, as is, as a filler to other resins or can be formed, as is, into a molded product by sinter molding;
B) all general melt molding or forming;
C) Forming of films or sheets especially by pressing, and their use as adhesives; and
D) All general melt molding or forming, especially forming of films or sheets by pressing and their use as adhesives.

[Treatment Methods Other Than Heat Treatment]

Instead of heat treatment, various energy sources which induce crosslinking can be used. Illustrative are irradiations of visible light, ultraviolet rays, ultraviolet rays, radiations such as α-, β- and γ-rays, electron beams, and X-rays, and further, plasma treatment and doping treatment.

[Crosslinking Promoter and Crosslinking Retarder]

A crosslinking promoter or crosslinking retarder can be used to control the crosslinking reaction velocity. No limitation is imposed on the crosslinking promoter or crosslinking retarder. A compound which, when used together with a crosslinkable-group-containing polyimide, can substantially promote or retard the crosslinking reaction, can be used in combination as desired.

It is possible to add, for example, a metal catalyst containing gallium, germanium, indium or lead, a transition metal catalyst containing molybdenum, manganese, nickel, cadmium, cobalt, chromium, iron, copper, tin, platinum or the like, a phosphorus compound, a silicon compound, a nitrogen compound, or a sulfur compound.

[Solution or Suspension Containing a Crosslinkable-group-containing Polyimide]

A solution or suspension which contains a crosslink-able-group-containing polyimide according to the present invention can be used in a pre-treatment step of shaping or melt molding or forming of the crosslinkable-group-containing polyimide.

The solution or suspension can be prepared using a solvent which does not cause a chemical reaction with the crosslinkable-group-containing polyimide according to the present invention.

Usable examples of the solvent can include, in addition to the solvent described above under m) to q) and r), the followings:

s) Acetone, methyl ethyl ketone, methyl isobutyl ketone, methanol, ethanol, propanol, isopropanol, butanol, isobutanol, pentane, hexane, heptane, cyclohexane, dichloromethane, chloroform, carbon tetrachloride, fluorobenzene, methyl acetate, ethyl acetate, butyl acetate, methyl formate, and ethyl formate;

t) Water, the amine solvents described above under p), imidazole, N,N-dimethylaniline, N,N-diethylaniline, and aqueous solutions containing potassium hydroxide, sodium hydroxide, potassium carbonate, sodium carbonate, potassium hydrogencarbonate, and sodium hydrogencarbonate, respectively; and u) Silicone oil, machine oil, working oil, kerosine, gasoline, and jet fuel.

These solvents can be used either singly or in combination. They can also be used by further mixing them with one or more of the solvents described above under m) to r). When used as a mixture, it is not absolutely necessary to choose solvents in such a combination that allows the solvents to be mutually dissolved at a desired ratio, and no problem or inconvenience arises even if they cannot be mixed or their mixture is not homogeneous. The concentrations of the aqueous solutions described above under t) are not limited and can be determined as desired. In general, their concentrations are in a range of from 1 to 60%.

No limitation is imposed on the preparation method of the solution or suspension which contains the polyimide according to the present invention, and all known methods are applicable.

Illustrative preparation methods can include:

A) to use, as is, a solution or suspension after completion of polymerization; and B) to obtain the crosslinkable-group-containing polyimide in the form of powder, granules or a block, and then to dissolve or disperse it in the above-described solvent.

No limitations are imposed on the preparation conditions, such as temperature, time and stirring method, upon preparation of the solution or suspension. In the case of the suspension, no limitation is imposed on the particle size or particle size distribution of powder, granules or the like to be dispersed, and upon preparation, a dispersion promoter or an emulsifier can also be added.

[Alloys and Blends With Other Resins]

In accordance with the application purpose of the crosslinkable-group-containing polyimide according to the present invention, it can be blended or alloyed, to an extent not impairing the object of the present invention, with suitable amount or amounts of one or more of resins such as thermoplastic resins, for example, polyethylene, polypropylene, polyvinyl chloride, polyvinylidene chloride, polybutadiene, polystyrene, polyvinyl acetate ABS resin, polybutylene terephthalate, polyethylene terephthalate, polyphenylene oxide, polycarbonates, PTFE, celluloid, polyarylates, polyether nitrites, polyamides, polysulfones, polyether sulfones, polyether ketones, polyphenyl sulfide, polyamide-imides, polyether imides, modified polyphenylene oxide and polyimides, and thermosetting resins, for example, thermosetting polybutadiene, formaldehyde resins, amino resins, polyurethane, silicone resins, SBR, NBR, unsaturated polyesters, epoxy resins, polycyanates, phenol resins and polybismaleimide. No particular limitation is imposed on their blending or alloying method, and a known method can be applied.

[Fillers and Additives]

With the crosslinkable-group-containing polyimide according to the present invention, various fillers or additives can be mixed to extents not impairing the object of the present invention. Their examples can include abrasion resistance improvers such as graphite, carborundum, silica powder, molybdenum disulfide and fluorinated resins; electrical characteristics improvers such as clay and mica; anti-track property improvers such as asbestos, silica and graphite; acid resistance improvers such as barium sulfate, silica and calcium metasilicate; thermal conductivity improvers such as iron powder, zinc powder, aluminum powder and copper powder; and further, glass beads, glass balls, talc, diatomaceous earth, alumina, Shirasu (white volcanic ash) balloons, alumina hydrate, metal oxides, colorants, and pigments. No particular limitation is imposed on the mixing method, and a known method can be applied.

EXAMPLES

The present invention will hereinafter be described in further detail by Examples. It should however be bone in mind that the present invention is by no means limited by the Examples.

Testing methods of various tests, which are common to the Examples and Comparative Examples, are as described next:

1) Logarithmic Viscosity Number of Polyimide Powder

A sample (0.50 g) was dissolved under heat in 100 mL of a mixed solvent of p-chlorophenol and phenol (90:10 by weight ratio), and after cooling the solution to 35° C., the logarithmic viscosity number was measured.

2) Melt Viscosity

A melt viscosity was measured by a Shimadzu Koka-type flow tester ("CFT500A") through an orifice of 1.0 mm (diameter)×10 mm (length), under a load of 100 kgf and, unless otherwise specifically indicated, under 360° C.×5 min.

3) 5% Weight Loss Temperature

Using DTA-TG ("Shimadzu DT-40 series, 40M"), a 5% weight loss temperature was measured at a heating rate of 10° C./min. in air.

4) Glass Transition Temperature and Crystal Melting Temperature

Glass transition temperature and crystal melting temperature were measured at a heating rate of 10° C./min by DSC ("Shimadzu DT-40 series, DSC-41M").

5) Tensile Strength of Molded Product

ASTM-D-638 was followed.

6) Logarithmic Viscosity Number of Polyamic Acid Varnish

After a varnish the solid content of which was 0.50 g was dissolved in N-methyl-2-pyrrolidone to give a total volume of 100 mL, its logarithmic viscosity number was measured at 35° C.

7) Mechanical Properties of Film

Mechanical properties were measured following ASTM D-822.

8) Heat Distortion Temperature

ASTM D-648 was followed.

Experiment A Series

In Example A1 to Example A91, a description will be made about certain examples out of the present invention, in each of which 50 to 100 mole % of recurring structural units in a backbone structure are of a recurring unit structure represented by:

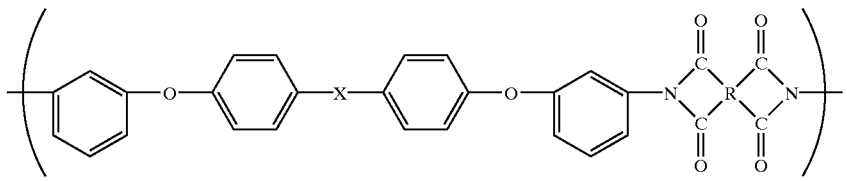

wherein X represents a divalent linking group selected from the group consisting of a direct bond, a carbonyl group, a sulfone group, a sulfide group, an ether group, an isopropylidene group and a hexafluoroisopropylidene group; and R represents a tetravalent aromatic group selected from the group consisting of:

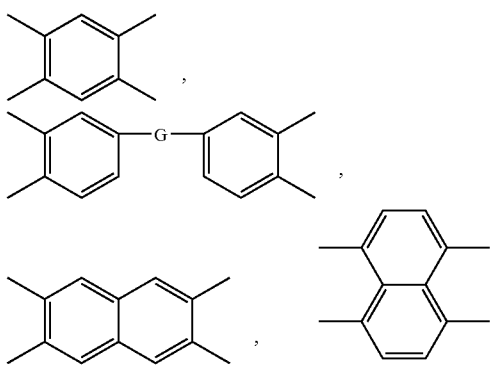

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl] phenoxy group.

Examples A1–A7, Comparative Examples A1–A3

In each of these examples and comparative examples, 4,4'-bis(3-aminophenoxy)biphenyl (368.43 g, 1.000 mol), pyromellitic dianhydride (102.52 g, 0.470 mol), and 3,3'4,4'-biphenyltetracarboxylic acid dianhydride (138.28 g, 0.470mol) were charged as monomers together with the corresponding end blocking agent(s), the kind(s) and amount(s) of which are shown in Table A1, and m-cresol (1,830 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and reactions were conducted under 200° C. reflux conditions for 4 hours.

TABLE A1

| Ex./Comp.Ex. No. | Charged amount of PA [g] | Charged amount of PA [mmol] | Charged amount of PCE [g] | Charged amount of PCE [mmol] | PA/PCE molar ratio |
|---|---|---|---|---|---|
| Example A1 | 17.60 | 118.8 | 0.2979 | 1.200 | 99/1 |
| Example A2 | 16.89 | 114.0 | 1.489 | 6.000 | 95/5 |
| Example A3 | 16.00 | 108.8 | 2.979 | 12.00 | 90/10 |
| Example A4 | 14.22 | 96.00 | 5.958 | 24.00 | 80/20 |
| Example A5 | 10.66 | 72.00 | 11.92 | 48.00 | 60/40 |
| Example A6 | 7.110 | 48.00 | 17.87 | 72.00 | 40/60 |
| Example A7 | 3.555 | 24.00 | 23.83 | 96.00 | 20/80 |
| Comp.Ex. A1 | 2.666 | 18.00 | 25.32 | 102.0 | 15/85 |
| Comp.Ex. A2 | 0 | 0 | 29.79 | 120.0 | 0/100 |
| Comp.Ex. A3 | 17.77 | 120.0 | 0 | 0 | 100/0 |

[Note] In Table A1, "PA" stands for phthalic anhydride, and "PCE" stands for 1-phenyl-2-(3,4-dicarboxyphenyl) acetylene anhydride.

The temperature was then lowered to 190° C., at which the corresponding end blocking agent(s) shown in Table A1, were charged again. The resulting contents were heated again, and the reactions were then conducted under 200° C. reflux conditions for further 4 hours.

The reaction mixture was thereafter cooled to 100° C., the resulting viscous polymer solution was discharged into toluene (10 liters) which was under vigorous agitation, and a precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 220° C. for 12 hours under a nitrogen gas stream. The yield of the thus-obtained powder and the logarithmic viscosity number, glass transition temperature, 5% weight loss temperature and melt viscosity (360° C./5 min.) are shown in Table A2.

The present invention is characterized in that concerning the molecule ends, the ratio of the chemical formula (2a) to the chemical formula (2b) ranges from 1/99 to 80/20 as recited in certain claims. From the above-described results, it is also evident that those having ratios of the chemical formula (2a) to the chemical formula (2b) greater than 80/20 are considerably inferior in moldability or formability to those having ratios of the chemical formula (2a) to the chemical formula (2b) equal to or smaller than 80/20.

TABLE A2

| Ex./comp.Ex. No. | Yield [g] | Logarithmic viscosity number [dL/g] | Glass transition temp. [° C.] | 5% Weight loss temp. [° C.] | Melt viscosity 360 [° C.] 5 min. Pa · S |
|---|---|---|---|---|---|
| Example A1 | 538.5 | 0.462 | 237 | 561 | 980 |
| Example A2 | 541.0 | 0.466 | 237 | 560 | 1000 |
| Example A3 | 540.2 | 0.465 | 236 | 561 | 960 |
| Example A4 | 542.9 | 0.466 | 235 | 559 | 950 |
| Example A5 | 543.5 | 0.461 | 236 | 560 | 1010 |
| Example A6 | 541.7 | 0.470 | 237 | 561 | 1150 |
| Example A7 | 542.8 | 0.467 | 236 | 560 | 1890 |
| Comp.Ex. A1 | 544.0 | 0.470 | 237 | 561 | No flow |
| Comp.Ex. A2 | 544.2 | 0.478 | 235 | 559 | No flow |
| Comp.Ex. A3 | 540.2 | 0.466 | 236 | 560 | 960 |

Examples A8–A12, Comparative Examples A4–5

Using the powders obtained in Examples A2–A6 and Comparative Example 3, compression molding was conducted. The powders used in the respective examples and comparative examples are shown next in Table A3.

TABLE A3

| Ex./Comp.Ex. No. | Ex./Comp.Ex. No. of used powder |
|---|---|
| Example A8 | Example A2 |
| Example A9 | Example A3 |
| Example A10 | Example A4 |
| Example A11 | Example A5 |
| Example A12 | Example A6 |
| Comp.Ex. A4, A5 | Comp.Ex. A3 |

Described specifically, in each of these examples and comparative examples, the powder was extruded into pellets at 355° C. by a 25-mm single-screw extruder. After the pellets were filled in a compression mold of configurations specified in ASTM-D-638, compression molding was conducted at 360° C. for 12 hours (Examples A8–A12, Comparative Example A4) or under conditions of 360° C. and 5 minutes (Comparative Example A5). In all the examples and comparative examples, good molded products were obtained. Using those molded products, a tensile test was performed at room temperature (23° C.). The results are shown in Table A4.

The present invention is characterized in that concerning the molecule ends, the ratio of the chemical formula (2a) to the chemical formula (2b) ranges from 1/99 to 80/20 as recited in certain claims. From the above-described results, it is also evident that those having ratios of the chemical formula (2a) to the chemical formula (2b) not reaching 1/99 are inferior in mechanical properties to those having ratios of the chemical formula (2a) to the chemical formula (2b) equal to or greater than 1/99.

TABLE A4

| Ex./Comp.Ex. No. | PA/PCE molar ratio | Break strength [MPa] | Yield strength [MPa] | Modulus of elasticity [MPa] | Elongation [%] |
|---|---|---|---|---|---|
| Example A8 | 95/5 | 96.80 | 101.00 | 2200 | 76.2 |
| Example A9 | 90/10 | 98.00 | 102.00 | 2280 | 80.1 |
| Example A10 | 80/20 | 97.80 | 102.00 | 2310 | 76.5 |
| Example A11 | 60/40 | 99.20 | 105.00 | 2430 | 78.1 |
| Example A12 | 40/60 | 98.30 | 108.00 | 2690 | 55.1 |
| Comp.Ex. A4 | 100/0 | 92.10 | 98.50 | 2110 | 81.1 |
| Comp.Ex. A5 | 100/0 | 91.90 | 97.80 | 2150 | 80.9 |

[Note] In Table A4, "PA/PCE molar ratio" means the molar ratio of phthalic anhydride to 1-phenyl-2-(3,4-dicarboxy-phenyl) acetylene anhydride.

Examples A13–A17, Comparative Examples A6–A8

In each of these examples and comparative examples, 4,4'-bis(3-aminophenoxy)biphenyl (368.43 g, 1.000 mol), pyromellitic dianhydride (102.52 g, 0.470 mol), and 3,3',4,4'-biphenyltetracarboxylic acid dianhydride (138.28 g, 0.470 mol) were charged as monomers together with m-cresol (1,630 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained. During the reaction, the corresponding end blocking agent(s) described in Table A5 and m-cresol (200.0 mL) were charged into another vessel and were then heated beforehand at 100° C. for 1 hour under a nitrogen atmosphere to provide a solution. The solution of the end blocking agent(s) was charged in its entirety into the solution of the end-unblocked polymer, and reaction(s) was(were) then conducted under 200° C. reflux conditions for 2 hours.

TABLE A5

| Ex./Comp.Ex. No. | Charged amount of PA [g] | [mmol] | Charged amount of PCE [g] | [mmol] | PA/PCE molar ratio |
|---|---|---|---|---|---|
| Example A13 | 33.77 | 228.0 | 2.979 | 12.0 | 95/5 |
| Example A14 | 31.99 | 216.0 | 5.958 | 24.0 | 90/10 |
| Example A15 | 28.44 | 192.0 | 11.96 | 48.0 | 80/20 |
| Example A16 | 21.33 | 144.0 | 23.83 | 96.0 | 60/40 |
| Example A17 | 14.21 | 96.00 | 35.75 | 144.0 | 40/60 |
| Comp.Ex. A6 | 5.332 | 36.00 | 50.64 | 204.0 | 15/85 |
| Comp.Ex. A7 | 0 | 0 | 59.58 | 240.0 | 0/100 |
| Comp.Ex. A8 | 35.55 | 240.0 | 0 | 0 | 100/0 |

[Note] In Table A5, "PA" stands for phthalic anhydride, and "PCE" stands for 1-phenyl-2-(3,4-dicarboxyphenyl) acetylene anhydride.

The reaction mixture was thereafter cooled to 100° C. While maintaining the resultant viscous polymer solution at 100° C., toluene (4 liters) was charged dropwise into the polymer solution over 4 hours. After toluene (3 liters) which had been heated at 80° C. was additionally charged, the resulting mixture was allowed to cool down to room temperature. Toluene (3 liters) was added further, followed by stirring for 1 hour. A precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 200° C. under reduced pressure for 12 hours under a gentle nitrogen gas stream. The yield of the thus-obtained powder and the logarithmic viscosity number, glass transition temperature, 5% weight loss temperature and melt viscosity (360° C./5 min.) are shown in Table A6.

The present invention is characterized in that concerning the molecule ends, the ratio of the chemical formula (2a) to the chemical formula (2b) ranges from 1/99 to 80/20 as recited in certain claims. From the above-described results, it is also evident that those having ratios of the chemical formula (2a) to the chemical formula (2b) greater than 80/20 are considerably inferior in moldability or formability to those having ratios of the chemical formula (2a) to the chemical formula (2b) equal to or smaller than 80/20.

TABLE A6

| Ex./Comp.Ex. No. | Yield [g] | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|---|
| Example A13 | 540.2 | 0.461 | 238 | 561 | 1020 |
| Example A14 | 541.7 | 0.470 | 237 | 563 | 1050 |
| Example A15 | 540.3 | 0.467 | 235 | 560 | 1040 |
| Example A16 | 542.4 | 0.465 | 236 | 561 | 990 |
| Example A17 | 542.0 | 0.468 | 238 | 561 | 1200 |
| Comp.Ex. A6 | 543.9 | 0.465 | 238 | 562 | No flow |
| Comp.Ex. A7 | 542.5 | 0.471 | 236 | 559 | No flow |
| Comp.Ex. A8 | 541.3 | 0.469 | 237 | 561 | 970 |

Examples A18–A22, Comparative Examples A9, A10

Using the powders obtained in Examples A13–A17 and Comparative Example A8, compression molding was conducted. The powders used in the respective examples and comparative examples are shown next in Table A7.

TABLE A7

| Ex./Comp.Ex. No. | Ex./Comp.Ex. No. of used powder |
|---|---|
| Example A18 | Example A13 |
| Example A19 | Example A14 |
| Example A20 | Example A15 |
| Example A21 | Example A16 |
| Example A22 | Example A17 |
| Comp.Ex. A9, A10 | Comp.Ex. A8 |

Described specifically, in each of these examples and comparative examples, the powder was extruded into pellets at 355° C. by a 25-mm single-screw extruder. After the pellets were filled in a compression mold having a size of 10.0 mm in width and 80.0 mm in length, compression molding was conducted at 360° C. for 12 hours (Examples A18–A22, Comparative Example A9) or under conditions of 360° C. and 5 minutes (Comparative Example A10). In all the examples and comparative examples, good molded products were obtained. Those specimens were all of 10.0 mm±0.010 mm in width, 80.0 mm±0.010 mm in length and 1.500 mm±0.010 mm in thickness. Using those molded products, a chemical resistance test was performed by the below-described method.

Described specifically, each specimen was held in place at portions 5.00 mm apart from opposite ends thereof, and was then adjusted and fixed such that a displacement of 3.50 mm in the direction of the thickness would be given when the specimen was bent by a jig maintained in contact with the specimen at a center thereof (a portion 40.0 mm apart from the respective ends). Under those conditions, the specimen was immersed in toluene or methyl ethyl ketone. One hour, 24 hours and 168 hours later, the specimen was taken out of the solvent and visually observed for cracks. The results of the chemical resistance test are shown in Table A8.

The present invention is characterized in that concerning the molecule ends, the ratio of the chemical formula (2a) to the chemical formula (2b) ranges from 1/99 to 80/20 as recited in certain claims. From the above-described results, it is evident that those having ratios of the chemical formula (2a) to the chemical formula (2b) not reaching 1/99 are inferior in chemical resistance to those having ratios of the chemical formula (2a) to the chemical formula (2b) equal to or greater than 1/99.

TABLE A8

| Ex./ Comp. | Toluene immersion time | | | MEK immersion time | | | PA/PCE molar |
|---|---|---|---|---|---|---|---|
| Ex. No. | 1 hr. | 24 hr. | 168 hr. | 1 hr. | 24 hr. | 168 hr. | ratio |
| Example A18 | A | A | A | B | B | C | 95/5 |
| Example A19 | A | A | A | A | B | B | 90/10 |
| Example A20 | A | A | A | A | A | B | 80/20 |
| Example A21 | A | A | A | A | A | A | 60/40 |
| Example A22 | A | A | A | A | A | A | 40/60 |
| Comp.Ex. A9 | A | B | B | C | C | C | 0/100 |
| Comp.Ex. A10 | A | B | B | C | C | C | 0/100 |

[Note]
In Table A8, "A", "B" and "C" indicate "completely free of cracks", "cracks observed in a very small number" and "cracks observed in a large number", respectively, in this order. Further, "PA/PCE molar ratio" means the molar ratio of phthalic anhydride to 1-phenyl-2-(3,4-dicarboxy-phenyl) acetylene anhydride, and "MEK" stands for methyl ethyl ketone.

Examples A23–A32, Comparative Examples A11–A16

In each of these examples and comparative examples, the following two reactions (A), (B) were conducted.

(A) 4,4'-Bis(3-aminophenoxy) biphenyl (368.43 g, 1.000 mol), pyromellitic dianhydride (102.52 g, 0.470 mol), and 3,3',4,4'-biphenyltetracarboxylic acid dianhydride (138.28 g, 0.470 mol) were charged as monomers together with phthalic anhydride (10.66 g, 72.00 mmol) and 1-phenyl-2-(3,4-dicarboxyphenyl)acetylene anhydride (11.92 g, 48.00 mmol) as end blocking agents, m-cresol (1,830 g) as a solvent, and γ-picoline (13.970 g, 0.1500 mol) as a catalyst into a vessel equipped with a stirrer, a reflux condenser, a water trap and a nitrogen gas inlet tube. The contents were heated with stirring to 150° C. over 2 hours under a nitrogen atmosphere, and reactions were conducted at 150° C. for 2 hours.

As end blocking agents, phthalic anhydride (5.33g, 36.00 mmol) and 1-phenyl-2-(3,4-dicarboxyphenyl)acetylene anhydride (5.96 g, 24.00 mmol) were then charged, followed by the reactions at 150° C. for further 8 hours.

The reaction mixture was thereafter cooled to 60° C., the resulting viscous polymer solution was discharged into methyl ethyl ketone (10 liters) which was under vigorous agitation, and a precipitate was then collected by filtration. The precipitate was again suspended and allowed to reprecipitate in methyl ethyl ketone (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

(B) In each of these examples and comparative examples, polyimide powder was obtained in exactly the same manner as in the reaction (A) except that upon preparation of the make-up, the amount(s) of the end blocking agent (s) of the kind(s) was(were) changed to only phthalic anhydride (17.77 g, 120.00 mmol) and that during the reactions, the amount(s) of the end blocking agent(s) of the kind(s) was(were) changed to only phthalic anhydride (8.89 g, 60.00 mmol).

The yields of the powders obtained in the two reactions (A),(B) and their logarithmic viscosity numbers, glass transition temperatures, 5% weight loss temperatures and melt viscosities (360° C./5 min.) are shown in Table A9.

Further, each powder was extruded into pellets at 355° C. by a 25-mm single-screw extruder. After the pellets were filled in a compression mold of the shape specified in ASTM-D-638, compression molding was conducted under the conditions described in Table A10.

TABLE A9

| | Yield [g] | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|---|
| (A) | 543.0 | 0.466 | 236 | 560 | 1050 |
| (B) | 541.6 | 0.465 | 236 | 561 | 1000 |

TABLE A10

| Ex./Comp.Ex. No. | Used powder | Compression molding conditions |
|---|---|---|
| Examples A23, A28 | (A) | 360° C., 2 hr. |
| Examples A24, A29 | (A) | 360° C., 6 hr. |
| Examples A25, A30 | (A) | 360° C., 12 hr. |
| Examples A26, A31 | (A) | 360° C., 24 hr. |
| Examples A27, A32 | (A) | 360° C., 72 hr. |
| Comp.Ex. A11, A14 | (B) | 360° C., 2 hr. |
| Comp.Ex. A12, A15 | (B) | 360° C., 12 hr. |
| Comp.Ex. A13, A16 | (B) | 360° C., 72 hr. |

Using the specimens so obtained, a tensile test at room temperature (23° C.) and a high-temperature tensile test at 177° C. were performed. The results are shown in Table A11.

From the foregoing, it is evident that the crosslinkable-group-containing polyimide according to the present invention can be significantly improved in room-temperature and high-temperature mechanical properties by annealing, and it is also appreciated that this effect cannot be expected from the conventional polyimides of the comparative examples.

TABLE A11

| Ex./Comp. Ex. No. | PA/PCE molar ratio | Testing temp. [° C.] | Break strength [MPa] | Yield strength [MPa] | Modulus of elasticity [MPa] | Elongation [%] |
|---|---|---|---|---|---|---|
| Example A23 | 60/40 | 23 | 96.30 | 99.00 | 2320 | 76.9 |
| Example A24 | 60/40 | 23 | 98.00 | 102.00 | 2390 | 81.0 |
| Example A25 | 60/40 | 23 | 99.20 | 105.00 | 2430 | 78.1 |
| Example A26 | 60/40 | 23 | 102.00 | 111.00 | 2500 | 80.2 |
| Example A27 | 60/40 | 23 | 103.00 | 115.00 | 2510 | 74.7 |
| Comp.Ex. A11 | 100/0 | 23 | 93.10 | 97.80 | 2100 | 77.1 |
| Comp.Ex. A12 | 100/0 | 23 | 92.80 | 98.00 | 2090 | 78.5 |
| Comp.Ex. A13 | 100/0 | 23 | 92.50 | 98.80 | 2140 | 76.6 |
| Example A28 | 60/40 | 177 | 78.20 | 65.10 | 1880 | 144 |
| Example A29 | 60/40 | 177 | 84.20 | 68.20 | 1950 | 151 |
| Example A30 | 60/40 | 177 | 91.00 | 72.10 | 2150 | 140 |
| Example A31 | 60/40 | 177 | 86.50 | 82.00 | 2320 | 128 |
| Example A32 | 60/40 | 177 | 74.40 | 84.00 | 2540 | 105 |
| Comp.Ex. A14 | 100/0 | 177 | 65.10 | 47.50 | 1680 | 150 |
| Comp.Ex. A15 | 100/0 | 177 | 66.00 | 47.80 | 1700 | 151 |
| Comp.Ex. A16 | 100/0 | 177 | 63.10 | 47.40 | 1660 | 144 |

Examples A28–A32, Comparative Examples A14–A16

In each of these examples and comparative examples, pyromellitic dianhydride and 3,3',4,4'-biphenyl-tetracarboxylic acid dianhydride were charged in their corresponding amounts shown in Table A12 together with 4,4'-bis(3-aminophenoxy)biphenyl (368.43 g, 1.000 mol), all as monomers, into a vessel equipped with a stirrer, a reflux condenser, a water trap and a nitrogen gas inlet tube. As a solvent, m-cresol was also charged in its corresponding amount shown in Table A12. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained.

During the reaction, the corresponding end blocking agents described in Table A13 and m-cresol (200.0 mL) were charged into another vessel and were then heated beforehand at 100° C. for 1 hour under a nitrogen atmosphere to provide a solution. The solution of the end blocking agents was charged in its entirety into the solution of the end-unblocked polymer, and reactions were then conducted under 200° C. reflux conditions for 2 hours.

TABLE A12

| Ex./Comp.Ex. No. | Charged amount of PMDA [g] | [mol] | Charged amount of BPDA [g] | [mol] | Charged amount of m-cresol [g] |
|---|---|---|---|---|---|
| Example A28 | 146.58 | 0.6720 | 84.74 | 0.2880 | 1600 |
| Example A29, 31 | 142.00 | 0.6510 | 82.09 | 0.2790 | 1580 |
| Example A30, 32 | 137.42 | 0.6300 | 79.44 | 0.2700 | 1560 |
| Comp.Ex. A14 | 146.58 | 0.6720 | 84.74 | 0.2880 | 1600 |
| Comp.Ex. A15 | 142.00 | 0.6510 | 82.09 | 0.2790 | 1580 |
| Comp.Ex. A16 | 137.42 | 0.6300 | 79.44 | 0.2700 | 1560 |

[Note] In Table A12, "PMDA" stands for pyromellitic dianhydride, and "BPDA" stands for 3,3',4,4'-biphenyl-tetracarboxylic acid dianhydride.

TABLE A13

| Ex./Comp.Ex. No. | Charged amount of PA [g] | [mmol] | Charged amount of PCE [g] | [mmol] | PA/PCE molar ratio |
|---|---|---|---|---|---|
| Example A28 | 16.59 | 112.0 | 11.92 | 48.00 | 70/30 |
| Example A29 | 29.03 | 196.0 | 20.85 | 84.00 | 70/30 |
| Example A30 | 41.47 | 280.0 | 29.79 | 120.0 | 70/30 |
| Example A31 | 20.74 | 140.0 | 34.75 | 140.0 | 50/50 |
| Example A32 | 29.62 | 200.0 | 49.45 | 200.0 | 50/50 |
| Comp.Ex. A14 | 3.555 | 24.00 | 33.76 | 136.0 | 15/85 |
| Comp.Ex. A15 | 6.221 | 42.00 | 59.08 | 238.0 | 15/85 |
| Comp.Ex. A16 | 8.887 | 60.00 | 84.40 | 340.0 | 15/85 |

[Note] In Table A13, "PA" stands for phthalic anhydride, and "PCE" stands for 1-phenyl-2-(3,4-dicarboxyphenyl) acetylene anhydride.

The reaction mixture was thereafter cooled to 60° C., the resulting viscous polymer solution was discharged into methyl ethyl ketone (10 liters) which was under vigorous agitation, and a precipitate was then collected by filtration. The precipitate was again suspended and allowed to reprecipitate in methyl ethyl ketone (4 liters) After the reprecipitate was collected by filtration and then provisionally dried at 50° C. for 24 hours, the reprecipitate was dried at 220° C. for 12 hours under a nitrogen gas stream, whereby polyimide powder was obtained.

The logarithmic viscosity number, glass transition temperature, 5% weight loss temperature and melt viscosity (360° C./5 min., 15 min., 30 min.) of the thus-obtained polyimide powder are shown in Table A14.

It is appreciated from the results that the crosslinkable-group-containing polyimide according to the present invention, even at various molecular weights, has good melt fluidity and is better in moldability or formability than the polyimides of the comparative examples.

TABLE A14

| Ex./Comp.Ex. No. | Logarithmic viscosity number [dL/g] | Glass transition temp. [° C.] | 360° C. Melt Viscosity [Pa · S] | | |
|---|---|---|---|---|---|
| | | | 5 min. | 15 min. | 30 min. |
| Example A28 | 0.772 | 238 | 3280 | 3410 | 4120 |
| Example A29 | 0.430 | 236 | 890 | 920 | 1130 |
| Example A30 | 0.319 | 230 | 360 | 360 | 390 |
| Example A31 | 0.422 | 235 | 940 | 1250 | 4860 |
| Example A32 | 0.324 | 231 | 390 | 630 | 1310 |
| Comp.Ex. A14 | 0.758 | 239 | No flow | ← | ← |
| Comp.Ex. A15 | 0.426 | 236 | No flow | ← | ← |
| Comp.Ex. A16 | 0.317 | 230 | 7830 | No flow | ← |

Examples A33–A37, Comparative Examples A17–A19

In each of these examples and comparative examples, pyromellitic dianhydride and N-methyl-2-pyrrolidone were charged in their corresponding amounts shown in Table A15 together with 4,4'-bis(3-aminophenoxy)biphenyl(368.43 g, 1.000 mol) into a vessel equipped with a stirrer and a nitrogen gas inlet tube. While stirring the contents under a nitrogen atmosphere, a reaction was conducted at room temperature for 12 hours, whereby a polyamic acid varnish was obtained. The corresponding end blocking agents, the kind(s) and amount(s) of which are shown in Table A15, were charged into the thus-obtained varnish, followed by reactions at room temperature for 12 hours.

TABLE A15

| Ex./Comp.Ex. No. | Charged amount of PMDA | | Amount of NMP | Charged amount of PA | | Charged amount of PCE | |
|---|---|---|---|---|---|---|---|
| | [g] | [mol] | [g] | [g] | [mol] | [g] | [mol] |
| Example A33 | 215.94 | 0.990 | 4285 | 1.481 | 10.00 | 2.482 | 10.00 |
| Example A34 | 209.40 | 0.960 | 3274 | 5.925 | 40.00 | 9.930 | 40.00 |
| Example A35 | 202.85 | 0.930 | 3238 | 10.37 | 70.00 | 17.38 | 70.00 |
| Example A36 | 196.31 | 0.900 | 2573 | 14.81 | 100.0 | 24.82 | 100.0 |
| Example A37 | 174.50 | 0.800 | 1629 | 29.62 | 200.0 | 49.45 | 200.0 |
| Comp.Ex. A17 | 215.94 | 0.990 | 4285 | 2.962 | 20.00 | 0 | 0 |
| Comp.Ex. A18 | 202.85 | 0.930 | 3238 | 20.74 | 140.0 | 0 | 0 |
| Comp.Ex. A19 | 174.50 | 0.800 | 1629 | 59.25 | 400.0 | 0 | 0 |

[Note] In Table A15, "PMDA", "NMP", "PA" and "PCE" stand for pyromellitic dianhydride, N-methyl-2-pyrrolidone, phthalic anhydride, and 1-phenyl-2-(3,4-dicarboxyphenyl)acetylene anhydride, respectively.

The logarithmic viscosity number of the thus-obtained polyamic acid varnish is shown in Table A16. Using that varnish, a film was prepared. Described specifically, the varnish was evenly cast on a soft glass plate. Within an oven through which a nitrogen gas stream was flowing, the film was heated from 500° C. to 200° C. at a heating rate of 1° C. per minute, and was then cured at 200° C. for 2 hours. Further, the film was heated from 200° C. to 370° C. at a heating rate of 15° C. per minute, and was then annealed at 370° C. for 4 hours. After the resulting film was quenched, hot water was poured over the film such that the film was peeled off from the glass plate. Incidentally, the film of Comparative Example A19 was so brittle that upon quenching, it shattered into small pieces, thereby failing to obtain a film. From the films of the remaining examples, good films were obtained. A tensile test of each film, which had been obtained by the above-described procedures, was performed at room temperature (23° C.) The results are shown in Table A16.

From these results, it is evident that the crosslinkable-group-containing polyimide according to the present invention, at various molecular weights, exhibits better physical properties than the polyimides of the comparative examples.

TABLE A16

| Ex./Comp.Ex. No. | Logarithmic viscosity number [dL/g] | Break strength [Mpa] | Yield strength [MPa] | Modulus of elasticity [MPa] | Elongation [%] |
|---|---|---|---|---|---|
| Example A33 | 1.45 | 102.00 | 108.00 | 2640 | 82.1 |
| Example A34 | 0.767 | 97.00 | 107.00 | 2560 | 80.3 |
| Example A35 | 0.430 | 97.20 | 105.00 | 2590 | 79.8 |
| Example A36 | 0.341 | 96.90 | 103.00 | 2680 | 78.6 |
| Example A37 | 0.288 | 97.10 | 104.00 | 2670 | 80.0 |
| Comp.Ex. A17 | 1.58 | 92.60 | 98.10 | 2060 | 88.1 |
| Comp.Ex. A18 | 0.422 | 90.10 | 98.30 | 2050 | 80.2 |
| Comp.Ex. A19 | 0.291 | — | — | — | — |

Examples A38–A42, Comparative Examples A20–A22

In each of these examples and comparative examples, 500 mL of the corresponding one of the varnishes—which had been obtained in Examples A33–A37 and Comparative Examples A17–A19, respectively—were discharged into methanol (10 liters) which was under vigorous agitation, and a precipitate was collected by filtration. The precipitate was washed further with methanol (800mL). After provisional drying under reduced pressure at 50° C. for 24 hours, the precipitate was dehydrated and imidated under reduced pressure at 250° C. for 12 hours under a gentle nitrogen gas stream, whereby polyimide powder was obtained. The used varnish and the glass transition temperature and 5% weight loss temperature of the thus-obtained polyimide powder are shown in Table A17.

Further, the powder was placed on a heat-resistant dish, annealed under nitrogen gas at 380° C. for 2 hours, and then quenched. Thereafter, its glass transition temperature and 5% weight loss temperature were measured. The results are shown in Table A17.

From these results, it is appreciated that, when annealed, the crosslinkable-group-containing polyimide according to the present invention is significantly improved in glass transition temperature but the polyimides of the comparative examples are not improved.

TABLE A17

| Ex./Comp. Ex. No. | Used varnish | Before annealing | | After annealing | |
|---|---|---|---|---|---|
| | | Tg [° C.] | Td5 [° C.] | Tg [° C.] | Td5 [° C.] |
| Example A38 | Example A33 | 245 | 560 | 268 | 552 |
| Example A39 | Example A34 | 245 | 560 | 266 | 553 |
| Example A40 | Example A35 | 244 | 559 | 265 | 554 |

TABLE A17-continued

| Ex./Comp. Ex. No. | Used varnish | Before annealing Tg [° C.] | Before annealing Td5 [° C.] | After annealing Tg [° C.] | After annealing Td5 [° C.] |
|---|---|---|---|---|---|
| Example A41 | Example A36 | 242 | 552 | 264 | 550 |
| Example A42 | Example A37 | 237 | 544 | 265 | 543 |
| Comp.Ex. A20 | Comp.Ex. A17 | 245 | 561 | 244 | 555 |
| Comp.Ex. A21 | Comp.Ex. A18 | 244 | 560 | 243 | 554 |
| Comp.Ex. A22 | Comp.Ex. A19 | 235 | 542 | 235 | 521 |

[Note]
In Table A17, "Tg" indicates a glass transition temperature, and "Td5" designates a 5% weight loss temperature.

Examples A43–A45, Comparative Example A23

In each of these examples and comparative example, 4,4'-bis(3-aminophenoxy)biphenyl (368.43 g, 1.000 mol) and pyromellitic dianhydride (205.03 g, 0.940 mol) were charged as monomers together with m-cresol (1,520 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained. During the reaction, the corresponding end blocking agent (s) described in Table A18 and m-cresol (200.0 mL) were charged into another vessel and were then heated beforehand at 100° C. for 1 hour under a nitrogen atmosphere to provide a solution. The solution of the end blocking agent(s) was charged in its entirety into the solution of the end-unblocked polymer, and reaction(s) was (were) then conducted under 200° C. reflux conditions for 2 hours.

TABLE A18

| Ex./Comp. Ex. No. | Charged amount of PA [g] | Charged amount of PA [mmol] | Charged amount of PCE [g] | Charged amount of PCE [mmol] | PA/PCE molar ratio |
|---|---|---|---|---|---|
| Example A43 | 33.77 | 228.0 | 2.979 | 12.0 | 95/5 |
| Example A44 | 31.99 | 216.0 | 5.958 | 24.0 | 90/10 |
| Example A45 | 28.44 | 192.0 | 11.92 | 48.0 | 80/20 |
| Comp.Ex. A23 | 17.77 | 120.0 | 0 | 0 | 100/0 |

[Note]
In Table A18, "PA" stands for phthalic anhydride, and "PCE" stands for 1-phenyl-2-(3,4-dicarboxyphenyl) acetylene anhydride.

The reaction mixture was thereafter cooled to 100° C. While maintaining the resultant viscous polymer solution at 100° C., toluene (4 liters) was charged dropwise into the polymer solution over 4 hours. After toluene (3 liters) which had been heated at 80° C. was additionally charged, the resulting mixture was allowed to cool down to room temperature. Toluene (3 liters) was added further, followed by stirring for 1 hour. A precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 200° C. under reduced pressure for 12 hours under a gentle nitrogen gas stream. The logarithmic viscosity number, glass transition temperature, crystal melting temperature, 5% weight loss temperature and melt viscosity (410° C./5 min.) of the thus-obtained polyimide powder are shown in Table A19.

Using the polyimide powder so obtained, pelletization was conducted at 400° C. by extrusion. Injection molding was then conducted at a resin temperature of from 380 to 410° C., an injection pressure of from 1,400 to 1,600 kg/cm² and a mold temperature of 170° C., whereby an amorphous specimen of the shape specified in ASTM-D-638 was obtained.

To the thus-obtained amorphous specimen, annealing treatment was applied further under a nitrogen gas stream, whereby the specimen was crystallized and, where the specimen was that of one of the examples, the specimen was subjected to crosslinking. The annealing treatment consisted of the following nine steps: ① heating from room temperature to 220° C. at a heating rate of 5° C./min., ② annealing at 220° C. for 5 hours, ③ heating from 220° C. to 280° C. at a heating rate of 5° C./min., ④ annealing at 280° C. for 5 hours, ⑤ heating from 280° C. to 320° C. at a heating rate of 5° C./min., ⑥ annealing at 320° C. for 5 hours, ⑦ heating from 320° C. to 350° C. at a heating rate of 5° C./min., ⑧ annealing at 350° C. for 24 hours, and ⑨ cooling to room temperature at a cooling rate of 5° C./min.

Using the specimen, a tensile test was performed. The results are shown in Table A20.

TABLE A19

| Ex./Comp. Ex. No. | Logarithmic viscosity number [dL/g] | Glass transition temp. [° C.] | Crystal melting temp. [° C.] | 5% Weight loss temp. [° C.] | Melt viscosity 410 [° C.] 5 min. [Pa · S] |
|---|---|---|---|---|---|
| Example A43 | 0.463 | 245 | 388 | 560 | 620 |
| Example A44 | 0.466 | 246 | 389 | 561 | 640 |
| Example A45 | 0.468 | 245 | 388 | 560 | 720 |
| Comp.Ex. A23 | 0.465 | 246 | 388 | 560 | 610 |

TABLE A20

| Ex./Comp. Ex. No. | Break strength [MPa] | Yield strength [MPa] | Modulus of elasticity [MPa] | Elongation [%] |
|---|---|---|---|---|
| Example A43 | 101.00 | 102.00 | 2510 | 12.2 |
| Example A44 | 98.30 | 100.00 | 2570 | 16.1 |
| Example A45 | 97.80 | 102.00 | 2660 | 21.6 |
| Comp.Ex. A23 | 95.00 | 99.70 | 2410 | 10.4 |

From the above results, it is evident that the crosslinkable-group-containing polyimide according to the present invention, even when crystallized, has good mechanical properties.

Examples A46–A49, Comparative Examples A24–A27

In each of these examples and comparative examples, the following two reactions (A),(B) were conducted.
(A) 4,4'-Bis(3-aminophenoxy)biphenyl (368.43 g, 1.000 mol), pyromellitic dianhydride (101.43 g, 0.465 mol) and 3,3',4,4'-biphenyltetracarboxylic acid anhydride (136.81 g, 0.465 mol) were charged as monomers together with m-cresol (1,820 g) as a solvent into a vessel equipped with a stirrer, a reflux condenser, a water trap and a nitrogen gas inlet tube. The contents were heated with stirring to 200° C. over 3 hours under a nitrogen atmosphere, and a reaction was conducted under 200° C. reflux conditions for 2 hours, whereby a solution of an end-unblocked polymer was obtained. During the reaction, phthalic anhydride (20.74 g, 140.0 mmol) and 1-phenyl-2-(3,4-dicarboxyphenyl)acetylene anhydride (34.75 g, 140.0 mmol) were charged as end blocking agents together with m-cresol (200.0 mL) into another vessel, and were then heated beforehand at 100° C. for 1 hour under a nitrogen atmosphere to provide a solution. The solution of the end blocking agents was charged in its entirety into the solution of the end-unblocked polymer, and reactions were then conducted under 200° C. reflux conditions for 2 hours.

The reaction mixture was thereafter cooled to 60° C., the resulting viscous polymer solution was discharged into methanol (10 liters) which was under vigorous agitation, and a precipitate was then collected by filtration. The precipitate was again suspended and allowed to reprecipitate in methanol (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

(B) In each of these examples and comparative examples, polyimide powder was obtained in exactly the same manner as in the reaction (A) except that the amounts of the end blocking agents of the kinds were changed to only phthalic anhydride (41.47 g, 280.00 mmol).

The logarithmic viscosity numbers, glass transition temperatures, 5% weight loss temperatures and melt viscosities (360° C./5 min.) of the powders obtained in the two reactions (A),(B) are shown in Table A21.

Further, each powder was extruded into pellets at 355° C. by a 25-mm single-screw extruder. After the pellets were filled in a compression mold of the shape specified in ASTM-D-638, compression molding was conducted under the conditions described in Table A22.

Using the thus-obtained specimen, a chemical resistance test was performed. Described specifically, the specimen was fixed on a jig in a state stretched by 0.5%, and was then immersed in toluene or methyl ethyl ketone at room temperature (23° C.) for 24 hours. Using the immersed specimen, a tensile test was performed at room temperature (23° C.). The results of the tensile test were compared with those of a tensile test of a corresponding non-immersed specimen, and a break strength retention (%) was calculated. The term "break strength retention (%)" as used herein means a value expressed in terms of percentage by comparing the break strength of an immersed specimen with the break strength of a corresponding non-immersed specimen.

The results are shown in Table A22.

TABLE A21

|  | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|
| (A) | 0.426 | 232 | 560 | 850 |
| (B) | 0.421 | 233 | 561 | 830 |

TABLE A22

| Ex./Comp. Ex. No. | Used powder | Compression molding conditions | Retention of break strength [%] Toluene | MEK |
|---|---|---|---|---|
| Example A46 | (A) | 390° C., 6 hr. | 95.8 | 82.5 |
| Example A47 | (A) | 370° C., 6 hr. | 97.2 | 88.3 |
| Example A48 | (A) | 350° C., 6 hr. | 92.6 | 82.0 |
| Example A49 | (A) | 330° C., 6 hr. | 89.8 | 72.9 |
| Comp.Ex. A24 | (B) | 390° C., 6 hr. | 82.2 | 45.1 |
| Comp.Ex. A25 | (B) | 370° C., 6 hr. | 87.4 | 42.0 |
| Comp.Ex. A26 | (B) | 350° C., 6 hr. | 86.6 | 49.2 |
| Comp.Ex. A27 | (B) | 330° C., 6 hr. | 85.0 | 6.4 |

[Note]
In Table A22, "MEK" stands for methyl ethyl ketone.

From the above results, it is evident that the crosslinkable-group-containing polyimide according to the present invention is significantly improved in chemical resistance by annealing under various conditions irrespective of the annealing temperature. It is appreciated that this effect cannot be expected from the conventional polyimides of the comparative examples.

Examples A50–A54, Comparative Examples A28–A32

In each of these examples and comparative examples, polyimide powder was synthesized in exactly the same manner as in Examples A13–A17 except that the corresponding one of various diamines and pyromellitic dianhydride (202.85 g, 0.930 mol) were used as monomers and that phthalic anhydride (20.74 g, 140.0 mmol) and 1-phenyl-2-(3,4-dicarboxy-phenyl)acetylene anhydride (34.75 g, 140.0 mmol) were used as end blocking agents in each of the examples but only phthalic anhydride (41.47 g, 280.00 mmol) was used as an end blocking agent in each of the comparative examples.

Further, the thus-obtained polyimide powder was extruded into pellets at 325° C. to 365° C. by a 25-mm single-screw extruder. After the pellets were filled in a compression mold of the shape specified in ASTM-D-648, Compression molding was conducted under the conditions of 360° C. and 6 hours.

Using the specimen so obtained, its heat distortion temperature was measured.

The kinds and amounts of the diamines, which were used in the respective examples and comparative examples, and the heat distortion temperatures are shown in Table A23.

TABLE A23

| Ex. No. | Comp. Ex. No. | Diamine Kind/ | Charged amount [g]/ | Charged amount [mol] | Heat distortion temp. [° C.] Ex. | Comp.Ex. |
|---|---|---|---|---|---|---|
| A50 | A28 | b) | 396.44 | 1.000 | 265 | 235 |
| A51 | A29 | c) | 432.49 | 1.000 | 285 | 260 |
| A52 | A30 | d) | 400.49 | 1.000 | 250 | 215 |
| A53 | A31 | e) | 384.43 | 1.000 | 255 | 225 |
| A54 | A32 | f) | 518.46 | 1.000 | 260 | 220 |

[Note]
In Table A23, the diamines are indicated by the following signs:
b) bis[4-(3-aminophenoxy)phenyl] ketone,
c) bis[4-(3-aminophenoxy)phenyl] sulfone,
d) bis(4-(3-aminophenoxy)phenyl] sulfide,
e) bis(4-(3-aminophenoxy)phenyl] ether, and
f) 2,2-bis[3-(3-aminophenoxy)phenyl]-1,1,1,3,3,3-hexafluoropropane.

Examples A55–A59, Comparative Examples A33–A37

In each of these examples and comparative examples, polyimide powder was synthesized in exactly the same manner as in Examples A13–A17 except that the corresponding one of various diamines, 4, 4'-bis(3-aminophenoxy)biphenyl (331.59g, 0.900 mol) and pyromellitic dianhydride (202.85 g, 0.930 mol) were used as monomers and that phthalic anhydride (20.74 g, 140.0 mmol) and 1-phenyl-2-(3,4-dicarboxyphenyl)-acetylene anhydride (34.75 g, 140.0 mmol) were used as end blocking agents in each of the examples but only phthalic anhydride (41.47 g, 280.00 mmol) was used as an end blocking agent in each of the comparative examples.

In a similar manner as in Examples A50–A54, specimens were then obtained from the respective polyimide powders, and their heat distortion temperatures were measured. The kinds and amounts of the diamines, which were used in the respective examples, and the heat distortion temperatures are shown in Table A24.

TABLE A24

| Ex. No. | Comp. Ex. No. | Diamine Kind/ | Charged amount [g]/ | Charged amount [mol] | Heat distortion temp. [° C.] Ex. | Comp.Ex. |
|---|---|---|---|---|---|---|
| A55 | A33 | g) | 20.02 | 0.100 | 295 | 255 |
| A56 | A34 | h) | 20.02 | 0.100 | 300 | 260 |
| A57 | A35 | i) | 24.83 | 0.100 | 290 | 260 |
| A58 | A36 | j) | 26.03 | 0.100 | 290 | 250 |
| A59 | A37 | k) | 32.83 | 0.100 | 285 | 240 |

[Note]
In Table A24, the diamines are indicated by the following sign:
a) 4,4'-bis(3-aminophenoxy)biphenyl,
g) 3,4'-diaminodiphenyl ether,
h) 4,4'-diaminodiphenyl ether,
i) 3,3'-diaminodiphenyl sulfone,
j) 1,3-bis(3-aminophenoxy) benzene, and
k) 1,3-bis(3-aminophenoxy) 4-trifluoromethyl-benzene.

Examples A60–A64, Comparative Examples A38–A42

In each of these examples and comparative examples, polyimide powder was synthesized in exactly the same manner as in Examples A13–A17 except that the corresponding ones of various diamines, 4,4'-bis(3-aminophenoxy)biphenyl (221.058 g, 0.600 mol) and pyromellitic dianhydride (202.85 g, 0.930 mol) were used as monomers and that phthalic anhydride (20.74 g, 140.0 mmol) and 1-phenyl-2-(3,4-dicarboxyphenyl)acetylene anhydride (34.75 g, 140.0 mmol) were used as end blocking agents in each of the examples but only phthalic anhydride (41.47 g, 280.00 mmol) was used as an end blocking agent in each of the comparative examples.

In a similar manner as in Examples A50–A54, specimens were then obtained, and their heat distortion temperatures were measured.

The kinds and amounts of the diamines, which were used in the respective examples and comparative examples, and the heat distortion temperatures are shown in Table A25.

TABLE A25

| Ex. No. | Comp. Ex. No. | Diamine Kind/ | Charged amount [g]/ | Charged amount [mol] | Heat distortion temp. [° C.] Ex. | Comp.Ex. |
|---|---|---|---|---|---|---|
| A60 | A38 | m) | 211.48 | 0.400 | 265 | 230 |
| A61 | A39 | n) | 261.10 | 0.400 | 255 | 220 |
| A62 | A40 | o) | 158.58 | 0.400 | 275 | 240 |
| A63 | A41 | p) | 121.74 | 0.400 | 280 | 245 |
| A64 | A42 | q) | 196.26 | 0.400 | 265 | 230 |

[Note]
In Table A25, the diamines are indicated by the following signs:
a) 4,4'-bis(3-aminophenoxy)biphenyl,
m) 1,3-bis[4-(4-aminophenoxy)-α,α-dimethyl]benzene,
n) 4,4'-bis[4-(4-aminophenoxy)benzoyl]diphenyl ether,
o) 3,3'-diamino-4,4'-diphenoxybenzophenone,
p) 3,3'-diamino-4-phenoxybenzophenone, and
q) 6,6'-bis(3-aminophenoxy)3,3,3',3',-tetramethyl-1,1'-spiroindane.

Examples A65–A69, Comparative Examples A43–A47

In each of these examples and comparative examples, polyimide powder was synthesized in exactly the same manner as in Examples A13–A17 except that 4,4'-bis(3-amino-phenoxy)biphenyl (368.43 g, 1.000 mol) and the corresponding one of various acid anhydrides were used as monomers and that phthalic anhydride (20.74 g, 140.0 mmol) and 1-phenyl-2-(3,4-dicarboxyphenyl)acetylene anhydride (34.75 g, 140.0 mmol) were used as end blocking agents in each of the examples but only phthalic anhydride (41.47 g, 280.00 mmol) was used as an end blocking agent in each of the comparative examples. In a similar manner as in Examples A50–A54, specimens were then obtained, and their heat distortion temperatures were measured.

The kinds and amounts of the acid anhydrides, which were used in the respective examples and comparative examples, and the heat distortion temperatures are shown in Table A26.

TABLE A26

| Ex. No. | Comp. Ex. No. | Acid anhydride Kind/ | Charged amount [g]/ | Charged amount [mol] | Distortion temp. [° C.] Ex. | Comp.Ex. |
|---|---|---|---|---|---|---|
| A65 | A43 | s) | 273.62 | 0.930 | 260 | 225 |
| A66 | A44 | t) | 299.67 | 0.930 | 255 | 225 |
| A67 | A45 | u) | 288.50 | 0.930 | 255 | 220 |
| A68 | A46 | v) | 413.14 | 0.930 | 245 | 220 |
| A69 | A47 | w) | 374.16 | 0.930 | 255 | 225 |

[Note]
In Table A26, the acid anhydrides are indicated by the following signs:
s) 3,3',4,4'-biphenyltetracarboxylic acid dianhydride,
t) 3,3',4,4'-benzophenonetetracarboxylic acid dianhydride,
u) bis(3,4-dicarboxyphenyl) ether dianhydride,
v) 2,2-bis(3,4-dicarboxyphenyl)-1,1,1,3,3,3-hexafluoropropane dianhydride, and
w) 1,4-bis(3,4-dicarboxyphenyl)benzene dianhydride.

From the above test, it is evident that crosslinkable-group-containing polyimides according to the present invention, which have various structures, are far superior in heat resistance to similar polymers having no crosslinkable groups.

Examples A70–A75, Comparative Examples A43–A48

In each of these examples and comparative examples, a 15% (W/W) polyamic acid varnish was obtained in a similar manner as in Examples A33–A37 by using dimethyl acetamide as a solvent, the corresponding diamine(s) and acid anhydride (s), the amounts and kinds of which are shown in Table A27, as monomers, and phthalic anhydride (10.66 g, 72.00 mmol) and 1-phenyl-2-(3,4-dicarboxyphenyl) acetylene anhydride (11.92 g, 48.00 mmol) as end blocking agents in each of the examples or only phthalic anhydride (17.77 g, 120.00 mmol) as an end blocking agent in each of the comparative examples.

TABLE A27

| Ex. No. | Comp. Ex. No. | Diamine (one to three kinds) | | | Acid anhydride (one or two kinds) | | |
|---|---|---|---|---|---|---|---|
| | | Kind/ | Charged amount [g]/ | Charged amount [mol] | Kind/ | Charged amount [g]/ | Charged amount [mol] |
| A70 | A48 | a) | 331.59 | 0.900 | r) | 143.52 | 0.658 |
| | | h) | 20.24 | 0.100 | s) | 82.97 | 0.282 |
| A71 | A49 | a) | 331.59 | 0.900 | r) | 143.52 | 0.658 |
| | | i) | 24.83 | 0.100 | s) | 82.97 | 0.282 |
| A72 | A50 | a) | 221.06 | 0.600 | r) | 205.03 | 0.940 |
| | | i) | 49.66 | 0.200 | | | |
| | | j) | 52.07 | 0.200 | | | |
| A73 | A51 | a) | 221.06 | 0.600 | r) | 184.53 | 0.846 |
| | | i) | 49.66 | 0.200 | s) | 27.66 | 0.094 |
| | | j) | 52.07 | 0.200 | | | |
| A74 | A52 | b) | 396.44 | 1.000 | r) | 102.52 | 0.470 |
| | | | | | s) | 136.28 | 0.470 |
| A75 | A53 | c) | 302.74 | 0.700 | t) | 302.90 | 0.940 |
| | | o) | 118.93 | 0.300 | | | |

[Note]
In Table A27, the diamines and acid anhydrides are indicated by the following signs:
a) 4,4'-bis(3-aminophenoxy)biphenyl,
b) bis[4-(3-aminophenoxy)phenyl] ketone,
c) bis[4-(3-aminophenoxy)phenyl] sulfone,
h) 4,4'-diaminodiphenyl ether,
i) 3,3'-diaminodiphenyl sulfone,
j) 1,3-bis(3-aminophenoxy) benzene,
o) 3,3'-diamino-4,4'-diphenoxybenzophenone,
r) pyromellitic dianhydride,
s) 3,3',4,4'-biphenyltetracarboxylic acid anhydride, and
t) 3,3',4,4'-benzophenonetetracarboxylic acid anhydride.

Using the thus-obtained varnishes, films were prepared under similar conditions as in Examples 33–37. Those films were punched by a die, whereby elongated rectangular specimens of 5.00 mm in width and 260 mm in length were obtained. Using those specimens, a chemical resistance test was performed.

Described specifically, each film was held in place at portions 5.00 mm apart from opposite ends thereof. Using a device capable of finely adjusting the distance between those portions, the distance between those portions was set at 251.75 mm. Under those conditions, the specimen was immersed together with the device in toluene or methyl ethyl ketone. One hour, 24 hours and 168 hours later, the specimen was taken out of the solvent and visually observed for cracks. The results are shown together with the logarithmic viscosity numbers of the varnishes in Table A28.

Incidentally, "A", "B" and "C" in Table A28 indicate "completely free of cracks", "cracks observed in a very small number" and "cracks observed in a large number", respectively, in this order. Further, "MEK" stands for methyl ethyl ketone.

TABLE A28

| Ex./ Comp. Ex. No. | Loga- rithmic viscosity number [dL/g] | Toluene immersion time | | | MEK immersion time | | |
|---|---|---|---|---|---|---|---|
| | | 1 hr. | 24 hr. | 168 hr. | 1 hr. | 24 hr. | 168 hr. |
| Example A70 | 0.455 | A | A | A | A | A | A |
| Example A71 | 0.461 | A | A | A | A | A | A |
| Example A72 | 0.449 | A | A | A | A | A | B |
| Example A73 | 0.466 | A | A | A | A | A | B |
| Example A74 | 0.480 | A | A | A | A | A | A |
| Example A75 | 0.452 | A | A | A | A | A | A |
| Comp.Ex. A48 | 0.449 | A | B | B | B | C | C |
| Comp.Ex. A49 | 0.466 | A | B | B | B | C | C |
| Comp.Ex. A50 | 0.453 | A | B | B | C | C | C |
| Comp.Ex. A51 | 0.470 | A | B | B | C | C | C |
| Comp.Ex. A52 | 0.478 | A | B | B | B | C | C |
| Comp.Ex. A53 | 0.451 | A | A | B | B | B | C |

Examples A76–A79, Comparative Example A54

In each of these examples and comparative example, a 15% (W/W) polyamic acid varnish was obtained in a similar manner as in Examples A33–A37 by using dimethylformamide as a solvent and 4,4'-bis(3-aminophenoxy)biphenyl (368.43 g, 1.000 mol) and pyromellitic dianhydride (142.00 g, 0.651 mol) and 3,3',4,4'-benzophenonetetracarboxylic acid dianhydride (89.90 g, 0.279 mol) as monomers together with the corresponding end blocking agent(s) the amount(s) and kind(s) of which are shown in Table A29.

Using the thus-obtained varnishes, films were prepared under similar conditions as in Examples 33–37. Employing those films, a chemical resistance test was performed in toluene in a similar manner as in Examples A70–A75. The results are shown together with the logarithmic viscosity numbers of the varnishes in Table A29.

Incidentally, "A", "B" and "C" in Table A28 indicate "completely free of cracks", "cracks observed in a very small number" and "cracks observed in a large number", respectively, in this order.

TABLE A29

| Ex./ Comp. Ex. No. | End blocking agent (one to three kinds) | | | Loga- rithmic visco- sity number [dL/g] | Toluene immersion time | | |
|---|---|---|---|---|---|---|---|
| | Kind/ | Charged amount [g]/ | Charged amount [mol] | | 1 hr. | 24 hr. | 168 hr. |
| Example A76 | A) | 14.52 | 0.0980 | 0.421 | A | A | A |
| | C) | 14.29 | 0.0420 | | | | |
| Example A77 | A) | 14.52 | 0.0980 | 0.410 | A | A | A |
| | D) | 14.80 | 0.0420 | | | | |
| Example A78 | A) | 11.41 | 0.0770 | 0.415 | A | A | A |
| | E) | 18.79 | 0.0630 | | | | |

TABLE A29-continued

| Ex./ Comp. Ex. No. | End blocking agent (one to three kinds) Kind/ | Charged amount [g]/ | Charged amount [mol] | Loga- rithmic visco- sity number [dL/g] | Toluene immersion time | | |
|---|---|---|---|---|---|---|---|
| | | | | | 1 hr. | 24 hr. | 168 hr. |
| Example A79 | A) | 14.52 | 0.0980 | 0.411 | A | A | A |
| | B) | 8.238 | 0.0280 | | | | |
| | C) | 9.529 | 0.0280 | | | | |
| Comp. Ex. A54 | A) | 17.94 | 0.140 | 0.418 | A | B | B |

[Note]
In Table A29, the end blocking agents are indicated by the following signs:
A) phthalic anhydride
B) 1-phenyl-2-(3,4-dicarboxyphenyl)acetylene anhydride,
C) 1-phenyl-2-(4-(3,4-dicarboxyphenoxy)phenyl)acetylene anhydride,
D) 1-phenyl-2-(4-(3,4-dicarboxybenzoyl)phenyl)acetylene anhydride, and
E) 2,3-dicarboxy-6-(phenylethynyl)naphthalene anhydride.

From the above results, it is evident that crosslinkable-group-containing polyimides according to the present invention, which have various structures, are far superior in heat resistance to similar polymers having no crosslinkable groups.

Examples A80–A82

Using the polyimide powders employed above in Examples A28–A30, their melt viscosities were measured by varying the measuring temperature and the residence time in various ways within a range of from 300° C. to 400° C. The results are shown in Table A30.

Incidentally, the shearing stress under those measuring conditions was constant at 0.245 MPa.

TABLE A30

| Ex. No. | Ex. No. of used powder | Measuring temp. [° C.] | Melt viscosity [Pa · S] | |
|---|---|---|---|---|
| | | | 5 min. | 30 min. |
| Example A80 | Example A28 | 300 | No flow | ← |
| | | 320 | 58000 | 59200 |
| | | 340 | 10800 | 11500 |
| | | 360 | 3280 | 4120 |
| | | 380 | 1650 | 7820 |
| | | 400 | 1770 | 18000 |
| Example A81 | Example A29 | 300 | No flow | ← |
| | | 320 | 11500 | 11600 |
| | | 340 | 2110 | 2300 |
| | | 360 | 890 | 1130 |
| | | 380 | 510 | 3810 |
| | | 400 | 550 | 6930 |
| Example A82 | Example A30 | 300 | 38400 | 35500 |
| | | 320 | 3100 | 3110 |
| | | 340 | 750 | 770 |
| | | 360 | 360 | 390 |
| | | 380 | 190 | 860 |
| | | 400 | 230 | 2990 |

Comparative Examples A55–A57

Using the polyimide powders employed above in Comparative Examples A14–A16, their melt viscosities and the temperature dependency of their melt viscosity stability were ascertained in a similar manner as in Example A80–A82.

The results are shown in Table A31.

TABLE A31

| Comp. Ex. No. | Comp. Ex. No. of used powder | Measuring temp. [° C.] | Melt viscosity [Pa · S] | |
|---|---|---|---|---|
| | | | 5 min. | 30 min. |
| Comp.Ex. A55 | Comp.Ex. A14 | 300 | No flow | ← |
| | | 320 | 62000 | 101000 |
| | | 340 | 13900 | No flow |
| | | 360 | No flow | ← |
| | | 380 | No flow | ← |
| | | 400 | No flow | ← |
| Comp.Ex. A55 | Comp.Ex. A15 | 300 | No flow | ← |
| | | 320 | 16600 | 33100 |
| | | 340 | 3450 | No flow |
| | | 360 | No flow | ← |
| | | 380 | No flow | ← |
| | | 400 | No flow | ← |
| Comp.Ex. A57 | Comp.Ex. A16 | 300 | 37700 | 36400 |
| | | 320 | 4020 | 10440 |
| | | 340 | 1330 | No flow |
| | | 360 | 7830 | No flow |
| | | 380 | No flow | ← |
| | | 400 | No flow | ← |

From the results of Examples A80–A82 and Comparative Examples A55–A57, it is evident that over a wide temperature range, the crosslinkable-group-containing polyimide according to the present invention has high stability in melt viscosity and hence, excellent moldability or formability.

Examples A83–A87

Using a melt viscoelasticity meter ("RDS-II" manufactured by Rheometrix Scientific F.E.) equipped with parallel plates (e.g., 25 mm disposable), the gel times of the powders polymerized in Examples A13–A17 were measured at various temperatures. Incidentally, the term "gel time" means a time which is required until a gel point is reached at a constant frequency and a given temperature. The term "gel point", in turn, means an intersecting point between lines G' and G" when storage modulus G' and loss modulus G" are each plotted as a function of time t (min.).

The measurement was performed up to 2 hours at each temperature. The results are shown in Table A32. Incidentally, ">120" which appears in Table A32 indicates that no gel point was reached within the measuring time.

TABLE A32

| Ex. No. | Ex. No. of used powder | Measuring temp. [° C.] | Gel time [min.] |
|---|---|---|---|
| Example A83 | Example A13 | 330 | >120 |
| | | 360 | >120 |
| | | 390 | >120 |
| Example A84 | Example A14 | 330 | >120 |
| | | 360 | >120 |
| | | 390 | 52 |
| Example A85 | Example A15 | 330 | >120 |
| | | 360 | 112 |
| | | 390 | 31 |
| Example A86 | Example A16 | 330 | >120 |
| | | 360 | 45 |
| | | 390 | 17 |
| Example A87 | Example A17 | 330 | >120 |
| | | 360 | 22 |
| | | 390 | 8 |

Comparative Examples A58–A59

The gel times of the powders, which were polymerized in Comparative Examples A6–A7, at various temperatures were measured in a similar manner as in Example A83–A87. The resulted are shown in Table A33.

TABLE A33

| Comp. Ex. No. | Comp. Ex. No. of used powder | Measuring temp. [° C.] | Gel time [min.] |
|---|---|---|---|
| Comp. Ex. A58 | Comp. Ex. A6 | 330 | 55 |
|  |  | 360 | 6 |
|  |  | 390 | 3 |
| Comp. Ex. A59 | Comp. Ex. A7 | 330 | 15 |
|  |  | 360 | 3 |
|  |  | 390 | 2 |

From the results of Examples A83–A87 and Comparative Examples A58–A59, it is evident that over a wide temperature range the crosslinkable-group-containing polyimide according to the present invention is slow in gelation and hence, is excellent in moldability or formability.

Examples A88–A91, Comparative Examples A60–A63

Polyimide powder was obtained in exactly the same manner as in the reaction (A) described in Examples A46–A49 except that the amounts of the end blocking agents of the kinds were changed to only 1-phenyl-2-(3,4-dicarboxyphenyl)acetylene anhydride (69.50 g, 280.00 mmol). This polyimide powder will be identified by (C).

Further, the polyimide powder obtained in the reaction (B) described in Examples A46–A49 and the above-described polyimide (C) were blended at the ratios described in Table A34, respectively, whereby homogeneous mixed powders were obtained. These mixed powders will be identified by (D) and (E).

Physical properties of the mixed powders (C)–(E) are shown in Table A34.

TABLE A34

|  | Blending ratio (B)/(C) [wt/wt] | Logarithmic viscosity [dL/g] | Glass transition temp. [° C.] | 5% Weight loss temp. [° C.] |
|---|---|---|---|---|
| (C) | — | 0.427 | 234 | 560 |
| (D) | 50/50 | 0.426 | 234 | 560 |
| (E) | 10/90 | 0.426 | 234 | 560 |

The polyimide powders (D) and (E) obtained above were separately extruded into pellets in a similar manner as in Examples A46–A49, and their compression molding and chemical resistance test were performed.

The results are shown in Table A35.

TABLE A35

| Ex./Comp. Ex. No. | Used powder | Compression molding conditions | Retention of break strength [%] | |
|---|---|---|---|---|
|  |  |  | Toluene | MEK |
| Example A88 | (D) | 390° C., 6 hr. | 91.8 | 68.5 |
| Example A89 | (D) | 370° C., 6 hr. | 92.1 | 73.0 |
| Example A90 | (D) | 350° C., 6 hr. | 90.7 | 70.2 |
| Example A91 | (D) | 330° C., 6 hr. | 88.0 | 64.4 |
| Comp. Ex. A60 | (E) | 390° C., 6 hr. | 78.3 | 42.2 |
| Comp. Ex. A61 | (E) | 370° C., 6 hr. | 82.0 | 42.6 |
| Comp. Ex. A62 | (E) | 350° C., 6 hr. | 81.4 | 43.3 |
| Comp. Ex. A63 | (E) | 330° C., 6 hr. | 80.3 | 45.9 |

[Note]
In Table A35, "MEK" stands for methyl ethyl ketone.

From the above results, it is evident that crosslinkable-group-containing polyimides according to the present invention, which are available from blending, can also be significantly improved in chemical resistance by annealing under various conditions irrespective of the annealing temperature. It is appreciated that this effect cannot be expected from the polyimides of the. comparative examples.

Experiment B Series

In Example B1 to Example B62, a description will be made about certain examples out of the present invention, in each of which 50 to 100 mole % of recurring structural units in a backbone structure are of a recurring unit structure represented by:

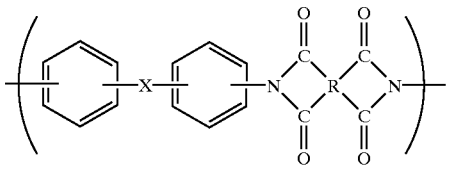

wherein X represents a divalent linking group selected from the group consisting of a direct bond, a carbonyl group, a sulfone group, a sulfide group, an ether group, an isopropylidene group and a hexafluoroisopropylidene group; and R represents a tetravalent aromatic group selected from the group consisting of:

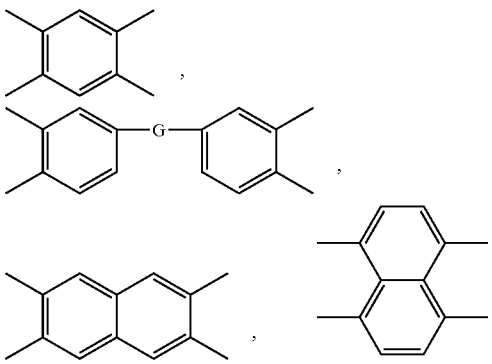

wherein G represents a divalent aromatic group selected from the group consisting of a direct bond, a carbonyl group, a sulfone group, a sulfide group, an ether group, an isopropylidene group, a hexafluoroisopropylidene group, and at least one divalent linking group selected from the group of substituent groups represented by the following formulas:

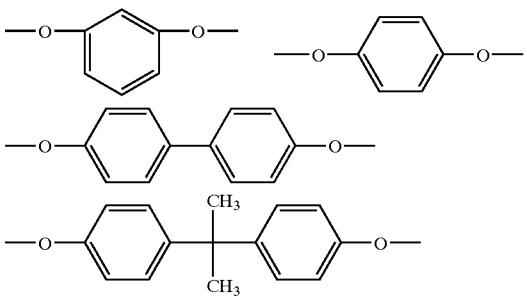

Examples B1–B7, Comparative Examples B1–B3

In each of these examples and comparative examples, 3,4'-diaminodiphenyl ether (200.24 g, 1.000 mol), 3,3',4,4'- biphenyltetracarboxylic acid dianhydride (138.28 g, 0.470 mol) and bis(3,4-dicarboxyphenyl)ether dianhydride (145.80 g, 0.470 mol) were charged as monomers together with the corresponding end blocking agent(s), the kind(s) and amount(s) of which are shown in Table B1, and m-cresol (1,937 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and reactions were conducted under 200° C. reflux conditions for 4 hours. In Table B1, "PA" stands for phthalic anhydride, and "PCE" stands for 1-phenyl-2-(3,4-dicarboxyphenyl)-acetylene anhydride.

TABLE B1

| Ex./Comp. Ex. No. | Charged amount of PA [g] | Charged amount of PA [·nmol] | Charged amount of PCE [g] | Charged amount of PCE [mmol] | PA/PCE molar ratio |
|---|---|---|---|---|---|
| Example B1 | 17.60 | 118.8 | 0.2979 | 1.200 | 99/1 |
| Example B2 | 16.89 | 114.0 | 1.489 | 6.000 | 95/5 |
| Example B3 | 16.00 | 108.0 | 2.979 | 12.00 | 90/10 |
| Example B4 | 14.22 | 96.00 | 5.958 | 24.00 | 80/20 |
| Example B5 | 10.66 | 72.00 | 11.92 | 48.00 | 60/40 |
| Example B6 | 7.110 | 48.00 | 17.87 | 72.00 | 40/60 |
| Example B7 | 3.555 | 24.00 | 23.83 | 96.00 | 20/80 |
| Comp. Ex. B1 | 2.666 | 18.00 | 25.32 | 102.0 | 15/85 |
| Comp. Ex. B2 | 0 | 0 | 29.79 | 120.0 | 0/100 |
| Comp. Ex. B3 | 17.77 | 120.0 | 0 | 0 | 100/0 |

The temperature was then lowered to 190° C., at which the corresponding end blocking agent(s) shown in Table B1 was (were) charged again. The resulting contents were heated again, and the reactions were then conducted under 200° C. reflux conditions for further 4 hours.

The reaction mixture was thereafter cooled to 100° C., the resulting viscous polymer solution was discharged into toluene (10 liters) which was under vigorous agitation, and a precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 210° C. for 12 hours under a nitrogen gas stream. The yield of the thus-obtained powder and the logarithmic viscosity number, glass transition temperature, 5% weight loss temperature and melt viscosity (360° C./5 min.) are shown in Table B2.

TABLE B2

| Ex./Comp. Ex. No. | Yield [g] | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|---|
| Example B1 | 430.4 | 0.465 | 231 | 560 | 1020 |
| Example B2 | 429.9 | 0.463 | 232 | 561 | 1150 |
| Example B3 | 431.0 | 0.465 | 231 | 560 | 1160 |
| Example B4 | 432.9 | 0.469 | 231 | 558 | 1110 |
| Example B5 | 433.5 | 0.464 | 232 | 559 | 1250 |
| Example B6 | 434.0 | 0.470 | 232 | 561 | 1410 |
| Example B7 | 433.9 | 0.477 | 231 | 560 | 1830 |
| Comp. Ex. B1 | 434.0 | 0.470 | 232 | 561 | No flow |
| Comp. Ex. B2 | 435.2 | 0.471 | 231 | 560 | No flow |
| Comp. Ex. B3 | 429.6 | 0.459 | 233 | 561 | 990 |

The present invention is characterized in that concerning the molecule ends; the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) greater than 80/20 are considerably inferior in moldability or formability to those having molar ratios of the chemical formula (2a) to the chemical formula (2b) equal to or smaller than 80/20.

Examples B8–B12, Comparative Examples B4,B5

Using the powders obtained in Examples B2–B6 and Comparative Example B3, compression molding was conducted. The powders used in the respective examples and comparative examples are shown next in Table B3.

TABLE B3

| Ex./Comp. Ex. No. | Ex./Comp. Ex. No. of used powder |
|---|---|
| Example B8 | Example B2 |
| Example B9 | Example B3 |
| Example B10 | Example B4 |
| Example B11 | Example B5 |
| Example B12 | Example B6 |
| Comp. Ex. B4, B5 | Comp. Ex. B3 |

Described specifically, in each of these examples and comparative examples, the powder was extruded into pellets at 355° C. by a single-screw extruder of 25 mm in barrel diameter. After the pellets were filled in a compression mold of configurations specified in ASTM-D-638, Compression molding was conducted at 360° C. for 12 hours (Examples B8–B12, Comparative Example B4) or under conditions of 360° C. and 5 minutes (Comparative Example 5). In all the examples and comparative examples, good molded products were obtained. Using those molded products, a tensile test was performed at room temperature (23° C). The results are shown in Table B4. In Table B4, "PA/PCE molar ratio" means the molar ratio of phthalic anhydride to 1-phenyl-2-(3,4-dicarboxyphenyl)-acetylene anhydride.

TABLE B4

| Ex./Comp. Ex. No. | PA/PCE molar ratio | Break strength [Mpa] | Yield strength [Mpa] | Modulus of elasticity [MPa] | Elongation [%] |
|---|---|---|---|---|---|
| Example B8 | 95/5 | 92.90 | 103.00 | 2290 | 76.6 |
| Example B9 | 90/10 | 94.50 | 99.00 | 2330 | 70.9 |
| Example B10 | 80/20 | 94.30 | 100.00 | 2370 | 66.6 |
| Example B11 | 60/40 | 94.80 | 105.00 | 2550 | 69.2 |
| Example B12 | 40/60 | 95.00 | 108.00 | 2760 | 59.3 |
| Comp. Ex. B4 | 100/0 | 90.10 | 96.90 | 2170 | 69.0 |
| Comp. Ex. B5 | 100/0 | 90.50 | 97.00 | 2180 | 72.5 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) not reaching 1/99 are inferior in mechanical properties to those having molar ratios of the chemical formula (2a) to the chemical formula (2b) equal to or greater than 1/99.

Examples B13–B17, Comparative Examples B6–B8

In each of these examples and comparative examples, 3,4'-diaminidiphenyl ether (200.24 g, 1.000 mol), 3,3',4,4'-biphenyltetracarboxylic acid dianhydride (138.28 g, 0.470 mol) and bis(3,4-dicarboxyphenyl)ether dianhydride (145.80 g, 0.470 mol) were charged as monomers together with m-cresol (1,737 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained. During the reaction, the corresponding end blocking agent(s) described in Table B5 and m-cresol (200.0 mL) were charged into another vessel and were then heated beforehand at 100° C. for 1 hour under a nitrogen atmosphere to provide a solution. The solution of the end blocking agent(s) was charged in its entirety into the solution of the end-unblocked polymer, and reaction(s) was (were) then conducted under 200° C. reflux conditions for 2 hours. In Table B5, "PA" stands for phthalic anhydride, and "PCE" stands for 1-phenyl-2-(3,4-dicarboxyphenyl) acetylene anhydride.

TABLE B5

| Ex./Comp. Ex. No. | Charged amount of PA [g] | Charged amount of PA [mmol] | Charged amount of PCE [g] | Charged amount of PCE [mmol] | PA/PCE molar ratio |
| --- | --- | --- | --- | --- | --- |
| Example B13 | 33.77 | 228.0 | 2.979 | 12.0 | 95/5 |
| Example B14 | 31.99 | 216.0 | 5.958 | 24.0 | 90/10 |
| Example B15 | 28.44 | 192.0 | 11.96 | 48.0 | 80/20 |
| Example B16 | 21.33 | 144.0 | 23.83 | 96.0 | 60/40 |
| Example B17 | 14.21 | 96.00 | 35.75 | 144.0 | 40/60 |
| Comp. Ex. B6 | 5.332 | 36.00 | 50.64 | 204.0 | 15/85 |
| Comp. Ex. B7 | 0 | 0 | 59.58 | 240.0 | 0/100 |
| Comp. Ex. B8 | 35.55 | 240.0 | 0 | 0 | 100/0 |

The reaction mixture was thereafter cooled to 100° C. While maintaining the resultant viscous polymer solution at 100° C., toluene (2 liters) which had been heated at 100° C. was charged into the polymer solution and further, toluene (6 liters) was charged dropwise over 4 hours. After toluene (4 liters) was charged, the resulting mixture was allowed to cool down to room temperature. A precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 200° C. under reduced pressure for 12 hours under a gentle nitrogen gas stream. The yield of the thus-obtained powder and the logarithmic viscosity number, glass transition temperature, 5% weight loss temperature and melt viscosity (360° C./5 min.) are shown in Table B6.

TABLE B6

| Ex./Comp. Ex. No. | Yield [g] | Logarithmic viscosity number [dL/g] | Glass transition temp. [° C.] | 5% Weight loss temp. [° C.] | Melt viscosity 360 [° C.] 5 min. [Pa · S] |
| --- | --- | --- | --- | --- | --- |
| Example B13 | 430.8 | 0.466 | 232 | 561 | 1100 |
| Example B14 | 431.7 | 0.468 | 233 | 560 | 1080 |
| Example B15 | 430.2 | 0.467 | 233 | 560 | 1140 |
| Example B16 | 432.8 | 0.466 | 232 | 558 | 1180 |
| Example B17 | 433.7 | 0.470 | 233 | 556 | 1310 |
| Comp. Ex. B6 | 434.3 | 0.474 | 233 | 560 | No flow |
| Comp. Ex. B7 | 435.0 | 0.470 | 233 | 557 | No flow |
| Comp. Ex. B8 | 428.9 | 0.470 | 231 | 560 | 1150 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) greater than 80/20 are considerably inferior in moldability or formability to those having molar ratios of the chemical formula (2a) to the chemical formula (2b) equal to or smaller than 80/20.

Examples B18–B22, Comparative Examples B9, B10

Using the powders obtained in Examples B13–B17 and Comparative Example B8, compression molding was conducted. The powders used in the respective examples and comparative examples are shown next in Table B7.

TABLE B7

| Ex./Comp. Ex. No. | Ex./Comp. Ex. No. of used powder |
| --- | --- |
| Example B18 | Example B13 |
| Example B19 | Example B14 |
| Example B20 | Example B15 |
| Example B21 | Example B16 |
| Example B22 | Example B17 |
| Comp. Ex. B9, B10 | Comp. Ex. B8 |

Described specifically, in each of these examples and comparative examples, the powder was extruded into pellets at 355° C. by a single-screw extruder of 25 mm in barrel diameter. After the pellets were filled in a compression mold having a size of 10.0 mm in width and 80.0 mm in length, compression molding was conducted at 360° C. for 12 hours (Examples B18–B22, Comparative Example B9) or under conditions of 360° C. and 5 minutes (Comparative Example 10). In all the examples and comparative examples, good molded products were obtained. Those specimens were all of 10.0 mm±0.010 mm in width, 80.0 mm±0.010 mm in length and 1.500 mm±0.010 mm in thickness. Using those molded products, a chemical resistance test was performed. Described specifically, each specimen was held in place at portions 5.00 mm apart from opposite ends thereof, and was then adjusted and fixed such that a displacement of 3.50 mm in the direction of the thickness would be given when the specimen was bent by a jig maintained in contact with the specimen at a center thereof (a portion 40.0 mm apart from the respective ends). Under those conditions, the specimen was immersed in toluene or methyl ethyl ketone. One hour, 24 hours and 168 hours later, the specimen was taken out of the solvent and visually observed for cracks.

The results of the chemical resistance test are shown in Table B8. In Table B8, "A", "B" and "C" indicate "completely free of cracks", "cracks observed in a very small number" and "cracks observed in a large number", respectively, in this order. Further, "PA/PCE molar ratio" means the molar ratio of phthalic anhydride to 1-phenyl-2-(3,4-dicarboxy-phenyl)acetylene anhydride, and "MEK" stands for methyl ethyl ketone.

TABLE B8

| Ex./Comp. Ex. No. | Toluene immersion time 1 hr. | Toluene immersion time 24 hr. | Toluene immersion time 168 hr. | MEK immersion time 1 hr. | MEK immersion time 24 hr. | MEK immersion time 168 hr. | PA/PCE molar ratio |
| --- | --- | --- | --- | --- | --- | --- | --- |
| Example B18 | A | A | A | A | B | B | 95/5 |
| Example B19 | A | A | A | A | A | B | 90/10 |
| Example B20 | A | A | A | A | A | A | 80/20 |

TABLE B8-continued

| Ex./Comp. Ex. | Toluene immersion time | | | MEK immersion time | | | PA/PCE molar ratio |
|---|---|---|---|---|---|---|---|
| No. | 1 hr. | 24 hr. | 168 hr. | 1 hr. | 24 hr. | 168 hr. | |
| Example B21 | A | A | A | A | A | A | 60/40 |
| Example B22 | A | A | A | A | A | A | 40/60 |
| Comp. Ex. B9 | A | A | B | B | C | C | 0/100 |
| Comp. Ex. B10 | A | A | B | B | C | C | 0/100 |

The present invention is characterized in that concerning the molecule ends, the molar ratio of the chemical formula (2a) to the chemical formula (2b) ranges from 1/99 to 80/20 as recited in certain claims. From the above-described results, it is evident that those having molar ratios of the chemical formula (2a) to the chemical formula (2b) not reaching 1/99 are inferior in chemical resistance to those having molar ratios of the chemical formula (2a) to the chemical formula (2b) equal to or greater than 1/99.

Examples B23–B32, Comparative Examples B11–B16

In each of these examples and comparative examples, the following two reactions (A),(B) were conducted.
(A) 3,4-Diaminodiphenyl ether (200.24 g, 1.000 mol), 3,3',4,4'-biphenyltetracarboxylic acid dianhydride (138.28 g, 0.470 mol) and 3,3',4,4'-benzophenonetetracarboxylic acid dianhydride (151.45 g, 0.470 mol) were charged as monomers together with phthalic anhydride (10.66 g, 72.00 mmol) and 1-phenyl-2-(3,4-dicarboxyphenyl)acetylene anhydride (11.92 g, 48.00 mmol) as end blocking agents, m-cresol (1,960 g) as a solvent, and γ-picoline (13.970 g, 0.1500 mol) as a catalyst into a vessel equipped with a stirrer, a reflux condenser, a water trap and a nitrogen gas inlet tube. The contents were heated with stirring to 150° C. over 2 hours under a nitrogen atmosphere, and reactions were conducted at 150° C. for 2 hours.

As end blocking agents, phthalic anhydride (5.33.g, 36.00 mmol) and 1-phenyl-2-(3,4-dicarboxyphenyl)acetylene anhydride (5.96 g, 24.00 mmol) were then charged, followed by the reactions at 150° C. for further 8 hours.

The reaction mixture was thereafter cooled to 60° C., the resulting viscous polymer solution was discharged into methyl ethyl ketone (10 liters) which was under vigorous agitation, and a precipitate was then collected by filtration. The precipitate was again suspended and allowed to reprecipitate in methyl ethyl ketone (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.
(B) In each of these examples and comparative examples, polyimide powder was obtained in exactly the same manner as in the reaction (A) except that upon preparation of the make-up, the amount(s) of the end blocking agent (s) of the kind(s) was (were) changed to only phthalic anhydride (17.77 g, 120.00 mmol) and that during the reactions, the amount(s) of the end blocking agent(s) of the kind(s) was(were) changed to only phthalic anhydride (8.89 g, 60.00 mmol).

The yields of the powders obtained in the two reactions (A), (B) and their logarithmic viscosity numbers, glass transition temperatures, 5% weight loss temperatures and melt viscosities (360° C./5 min.) are shown in Table B9.

Further, each powder was extruded into pellets at 355° C. by a single-screw extruder of 25 mm in barrel diameter. After the pellets were filled in a compression mold of the shape specified in ASTM-D-638, compression molding was conducted under the conditions described in Table B10.

TABLE B9

| | Yield [g] | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|---|
| (A) | 465.4 | 0.462 | 240 | 554 | 1450 |
| (B) | 462.4 | 0.461 | 239 | 553 | 1430 |

TABLE B10

| Ex. Comp. Ex. No. | Used Powder | Compression molding conditions |
|---|---|---|
| Examples B23, B28 | (A) | 350° C., 2 hr. |
| Examples B24, B29 | (A) | 350° C., 6 hr. |
| Examples B25, B30 | (A) | 350° C., 12 hr. |
| Examples B26, B31 | (A) | 350° C., 24 hr. |
| Examples B27, B32 | (A) | 350° C., 72 hr. |
| Comp. Ex. B11, B14 | (B) | 350° C., 2 hr. |
| Comp. Ex. B12, B15 | (B) | 350° C., 12 hr. |
| Comp. Ex. B13, B16 | (B) | 350° C., 72 hr. |

Using the specimens so obtained, a tensile test at room temperature (23° C.) and a high-temperature tensile test at 177° C. were performed. The results are shown in Table B11.

TABLE B11

| Ex./comp. Ex. No. | PA/PCE molar ratio | Testing temp. [° C.] | Break strength [MPa] | Yield strength [MPa] | Modulus of elasticity [MPa] | Elongation [%] |
|---|---|---|---|---|---|---|
| Example B23 | 60/40 | 23 | 85.90 | 95.00 | 2720 | 45.2 |
| Example B24 | 60/40 | 23 | 83.30 | 97.00 | 2770 | 42.0 |
| Example B25 | 60/40 | 23 | 95.00 | 100.00 | 2890 | 45.5 |
| Example B26 | 60/40 | 23 | 101.00 | 103.00 | 2950 | 46.3 |
| Example B27 | 60/40 | 23 | 104.00 | 105.00 | 3010 | 50.1 |
| Comp. Ex. B11 | 100/0 | 23 | 85.50 | 90.20 | 2490 | 46.1 |
| Comp. Ex. B12 | 100/0 | 23 | 85.40 | 89.90 | 2510 | 40.9 |
| Comp. Ex. B13 | 100/0 | 23 | 80.80 | 91.10 | 2600 | 12.5 |
| Example B28 | 60/40 | 177 | 68.80 | 67.40 | 1950 | 101 |
| Example B29 | 60/40 | 177 | 71.00 | 68.80 | 2010 | 121 |
| Example B30 | 60/40 | 177 | 73.50 | 70.90 | 2020 | 115 |
| Example B31 | 60/40 | 177 | 77.70 | 73.10 | 2200 | 126 |
| Example B32 | 60/40 | 177 | 79.50 | 78.10 | 2410 | 116 |
| Comp. Ex. B14 | 100/0 | 177 | 57.10 | 49.90 | 1780 | 99.2 |
| Comp. Ex. B15 | 100/0 | 177 | 58.80 | 50.40 | 1820 | 76.0 |
| Comp. Ex. B16 | 100/0 | 177 | 60.10 | 55.60 | 1880 | 60.7 |

From the foregoing, it is evident that the crosslinkable-group-containing polyimide according to the present invention can be significantly improved in room-temperature and high-temperature mechanical properties by annealing, and it is also appreciated that this effect cannot be expected from the conventional polyimides of the comparative examples.

Examples B28–B32, Comparative Examples B14–B16

In each of these examples and comparative examples, bis(3,4-dicarboxyphenyl)ether dianhydride and 1,4-bis(3,4-dicarboxyphenoxy)benzene dianhydride were charged in their corresponding amounts shown in Table B12 together with 4,4'-diaminodiphenyl ether (200.24 g, 1.000 mol), all as monomers, into a vessel equipped with a stirrer, a reflux condenser, a water trap and a nitrogen gas inlet tube. As a solvent, m-cresol was also charged in its corresponding amount shown in Table B12. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained. In Table B12, "ODPA" stands for bis(3,4-dicarboxyphenyl)ether dianhydride, and "HQDA" stands for 1,4-bis(3,4-dicarboxyphenoxy)benzene dianhydride.

TABLE B12

| Ex./<br>Comp.Ex. | Charged<br>amount of ODPA | | Charged<br>amount of HQDA | | Charged<br>amount of<br>m-cresol |
|---|---|---|---|---|---|
| No. | [g] | [mol] | [g] | [mol] | [g] |
| Example B28 | 208.47 | 0.6720 | 115.87 | 0.2880 | 1097 |
| Examples B29, 31 | 201.95 | 0.6510 | 112.25 | 0.2790 | 1057 |
| Examples B30, 32 | 195.44 | 0.6300 | 108.63 | 0.2700 | 1016 |
| Comp.Ex. B14 | 208.47 | 0.6720 | 115.87 | 0.2880 | 1097 |
| Comp.Ex. B15 | 201.95 | 0.6510 | 112.25 | 0.2790 | 1057 |
| Comp.Ex. B16 | 195.44 | 0.6300 | 108.63 | 0.2700 | 1016 |

During the reaction, the corresponding end blocking agents described in Table B13 and m-cresol (200.0 mL) were charged into another vessel and were then heated beforehand at 100° C. for 1 hour under a nitrogen atmosphere to provide a solution. The solution of the end blocking agents was charged in its entirety into the solution of the end-unblocked polymer, and reactions were then conducted under 200° C. reflux conditions for 2 hours. In Table B13, "PA" stands for phthalic anhydride, and "PCE" stands for 1-phenyl-2-(3,4-dicarboxyphenyl)-acetylene anhydride.

TABLE B13

| Ex./<br>Comp.Ex. | Charged amount<br>of PA | | Charged amount<br>of PCE | | PA/PCE<br>molar |
|---|---|---|---|---|---|
| No. | [g] | [mmol] | [g] | [mmol] | ratio |
| Example B28 | 16.59 | 112.0 | 11.92 | 48.00 | 70/30 |
| Example B29 | 29.03 | 196.0 | 20.85 | 84.00 | 70/30 |
| Example B30 | 41.47 | 280.0 | 29.79 | 120.0 | 70/30 |
| Example B31 | 20.74 | 140.0 | 34.75 | 140.0 | 50/50 |
| Example B32 | 29.62 | 200.0 | 49.45 | 200.0 | 50/50 |
| Comp.Ex. B14 | 3.555 | 24.00 | 33.76 | 136.0 | 15/85 |
| Comp.Ex. B15 | 6.221 | 42.00 | 59.08 | 238.0 | 15/85 |
| Comp.Ex. B16 | 8.887 | 60.00 | 84.40 | 340.0 | 15/85 |

The reaction mixture was thereafter cooled to 60° C., the resulting viscous polymer solution was discharged into methyl ethyl ketone (10 liters) which was under vigorous agitation, and a precipitate was then collected by filtration. The precipitate was again suspended and allowed to reprecipitate in methyl ethyl ketone (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

The logarithmic viscosity number, glass transition temperature and melt viscosity (360° C./5 min., 15 min., 30 min.) of the thus-obtained polyimide powder are shown in Table B14.

TABLE B14

| Ex./Comp. Ex.<br>No. | Logarithmic<br>viscosity<br>number<br>[dL/g] | Glass<br>transition<br>temp. [° C.] | 360° C. Melt viscosity<br>[Pa · S] | | |
|---|---|---|---|---|---|
| | | | 5 min. | 15 min. | 30 min. |
| Example B28 | 0.718 | 240 | 4400 | 4990 | 6010 |
| Example B29 | 0.419 | 235 | 1020 | 1140 | 1450 |
| Example B30 | 0.322 | 231 | 380 | 400 | 440 |
| Example B31 | 0.425 | 234 | 1080 | 1460 | 6540 |
| Example B32 | 0.321 | 231 | 390 | 600 | 1880 |
| Comp. Ex. B14 | 0.714 | 239 | No flow | ← | ← |
| Comp. Ex. B15 | 0.427 | 236 | No flow | ← | ← |
| Comp. Ex. B16 | 0.328 | 231 | 10200 | No flow | ← |

It is appreciated from the results that the crosslinkable-group-containing polyimide according to the present invention, even at various molecular weights (or logarithmic viscosity numbers correlating with the molecular weights), has good melt fluidity and is better in moldability or formability than the polyimides of the comparative examples.

Examples B33–B37, Comparative Examples B17–B19

In each of these examples and comparative examples, 3,3',4,4'-biphenyltetracarboxylic acid dianhydride and N-methyl-2-pyrrolidone were charged in their corresponding amounts shown in Table B15 together with 3,4'-diaminodiphenyl ether (200.24 g, 1.000 mol) into a vessel equipped with a stirrer and a nitrogen gas inlet tube. While stirring the contents under a nitrogen atmosphere, a reaction was conducted at room temperature for 12 hours, whereby a polyamic acid varnish was obtained. The corresponding end blocking agents, the kind(s) and amount(s) of which are shown in Table B15, were charged into the thus-obtained varnish, followed by reactions at room temperature for 12 hours. In Table B15, "BPDA", "NMP", "PA" and "PCE" stand for pyromellitic dianhydride, N-methyl-2-pyrrolidone, phthalic anhydride, and 1-phenyl-2-(3,4-dicarboxyphenyl) acetylene anhydride, respectively.

TABLE B15

| Ex./<br>Comp.<br>Ex.<br>No. | Charged<br>amount<br>of PMDA | | Amount<br>of<br>NMP | Charged<br>amount of PA | | Charged<br>amount<br>of PCE | |
|---|---|---|---|---|---|---|---|
| | [g] | [mol] | [g] | [g] | [mol] | [g] | [mol] |
| Example B33 | 291.28 | 0.990 | 3604 | 1.481 | 10.00 | 2.482 | 10.00 |
| Example B34 | 282.54 | 0.960 | 2736 | 5.925 | 40.00 | 9.930 | 40.00 |
| Example B35 | 273.62 | 0.930 | 2685 | 10.37 | 70.00 | 17.38 | 70.00 |
| Example B36 | 264.80 | 0.900 | 1860 | 14.81 | 100.0 | 24.82 | 100.00 |
| Example B37 | 235.38 | 0.800 | 1307 | 29.62 | 200.0 | 49.45 | 200.00 |
| Comp. Ex. B17 | 291.28 | 0.990 | 3604 | 2.962 | 20.00 | 0 | 0 |

TABLE B15-continued

| Ex./ Comp. Ex. No. | Charged amount of PMDA [g] | [mol] | A-mount of NMP [g] | Charged amount of PA [g] | [mol] | Charged amount of PCE [g] | [mol] |
|---|---|---|---|---|---|---|---|
| Comp. Ex. B18 | 273.62 | 0.930 | 2685 | 20.74 | 140.0 | 0 | 0 |
| Comp. Ex. B19 | 235.38 | 0.800 | 1307 | 59.25 | 400.0 | 0 | 0 |

The logarithmic viscosity number of the thus-obtained polyamic acid varnish is shown in Table B16.

Using that varnish, a film was prepared.

Described specifically, the varnish was evenly cast on a soft glass plate. Within an oven through which a nitrogen gas stream was flowing, the film was heated from 50° C. to 200° C. at a heating rate of 1° C. per minute, and was then cured at 200° C. for 2 hours. Further, the film was heated from 200° C. to 410° C. at a heating rate of 20° C. per minute, and was then annealed at 410° C. for 30 minutes. After the resulting film was quenched, hot water was poured over the film such that the film was peeled off from the glass plate. Incidentally, the film of Comparative Example 19 was so brittle that upon quenching, it shattered into small pieces, thereby failing to obtain a film. From the films of the remaining examples, good films were obtained.

A tensile test of each film, which had been obtained by the above-described procedures, was performed at room temperature (23° C.). The results are shown in Table B16.

TABLE B16

| Ex./ Comp.Ex. No. | Logarithmic viscosity number [dL/g] | Break strength [MPa] | Yield strength [MPa] | Modulus of elasticity [MPa] | Elongation [%] |
|---|---|---|---|---|---|
| Example B33 | 1.66 | 100.00 | 105.00 | 2880 | 79.0 |
| Example B34 | 0.801 | 96.50 | 105.00 | 2790 | 84.5 |
| Example B35 | 0.447 | 97.70 | 102.00 | 2770 | 76.8 |
| Example B36 | 0.352 | 97.00 | 100.00 | 2780 | 87.3 |
| Example B37 | 0.256 | 97.50 | 102.00 | 2740 | 79.4 |
| Comp.Ex. B17 | 1.70 | 90.10 | 94.50 | 2230 | 70.1 |
| Comp.Ex. B18 | 0.450 | 88.90 | 91.70 | 2250 | 56.2 |
| Comp.Ex. B19 | 0.254 | — | — | — | — |

From the above results, it is evident that the crosslinkable-group-containing polyimide according to the present invention, at various molecular weights (or logarithmic viscosity numbers correlating with the molecular weights), exhibits better physical properties than the polyimides of the comparative examples.

Examples B38–B42, Comparative Examples B20–B22

In each of these examples and comparative examples, 500 mL of the corresponding one of the varnishes—which had been obtained in Examples B33–B37 and Comparative Examples B17–B19, respectively—were discharged into methanol (10 liters) which was under vigorous agitation, and a precipitate was collected by filtration. The precipitate was washed further with methanol (800 mL). After provisional drying under reduced pressure at 50° C. for 24 hours, the precipitate was dehydrated and imidated under reduced pressure at 250° C. for 12 hours under a gentle nitrogen gas stream, whereby polyimide powder was obtained. The used varnish and the glass transition temperature and 5% weight loss temperature of the thus-obtained polyimide powder are shown in Table B17.

Further, the powder was placed on a heat-resistant dish, annealed under nitrogen gas at 420° C. for 1 hour, and then quenched. Thereafter, its glass transition temperature and 5% weight loss temperature were measured. The results are shown in Table B17.

In Table B17, "Tg" indicates a glass transition temperature, and "Td5" designates a 5% weight loss temperature.

TABLE B17

| Ex./Comp. Ex. No. | Used varnish | Before annealing | | After annealing | |
|---|---|---|---|---|---|
| | | Tg [° C.] | Td5 [° C.] | Tg [° C.] | Td5 [° C.] |
| Example B38 | Example B33 | 248 | 560 | 271 | 550 |
| Example B39 | Example B34 | 247 | 560 | 269 | 554 |
| Example B40 | Example B35 | 246 | 561 | 269 | 553 |
| Example B41 | Example B36 | 242 | 554 | 267 | 552 |
| Example B42 | Example B37 | 236 | 544 | 268 | 547 |
| Comp.Ex. B20 | Comp.Ex. B17 | 248 | 559 | 248 | 552 |
| Comp.Ex. B21 | Comp.Ex. B18 | 245 | 560 | 245 | 550 |
| Comp.Ex. B22 | Comp.Ex. B19 | 235 | 543 | 235 | 511 |

From these results, it is appreciated that, when annealed, the crosslinkable-group-containing polyimide according to the present invention is significantly improved in glass transition temperature but the polyimides of the comparative examples are not improved.

Examples B43–B45, Comparative Example B23

In each of these examples and comparative example, 3,4'-diaminodiphenyl ether (200.24 g, 1.000 mol) and 3,3', 4,4'-biphenyltetracarboxylic acid dianhydride (276.57 g, 0.940 mol) were charged as monomers together with m-cresol (1,707 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained. During the reaction, the corresponding end blocking agent(s) described in Table B18 and m-cresol (200.0 mL) were charged into another vessel and were then heated beforehand at 100° C. for 1 hour under a nitrogen atmosphere to provide a solution. The solution of the end blocking agent(s) was charged in its entirety into the solution of the end-unblocked polymer, and reaction(s) was(were) then conducted under 200° C. reflux conditions for 2 hours. In Table B18, "PA" stands for phthalic anhydride, and "PCE" stands for 1-phenyl-2-(3,4-dicarboxyphenyl)acetylene anhydride.

TABLE B18

| Ex./ Comp. Ex. No. | Charged amount of PA | | Charged amount of PCE | | PA/PCE molar ratio |
|---|---|---|---|---|---|
| | [g] | [mmol] | [g] | [mmol] | |
| Example B43 | 33.77 | 228.0 | 2.979 | 12.0 | 95/5 |
| Example B44 | 31.99 | 216.0 | 5.958 | 24.0 | 90/10 |
| Example B45 | 28.44 | 192.0 | 11.92 | 48.0 | 80/20 |
| Comp.Ex. B23 | 17.77 | 120.0 | 0 | 0 | 100/0 |

The reaction mixture was thereafter cooled to 100° C. While maintaining the resultant viscous polymer solution at 100° C., toluene (4 liters) was charged dropwise into the polymer solution over 4 hours. After toluene (3 liters) which had been heated at 80° C. was additionally charged, the resulting mixture was allowed to cool down to room temperature. Toluene (3 liters) was added further, followed by stirring for 1 hour. A precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 200° C. under reduced pressure for 12 hours under a gentle nitrogen gas stream. The logarithmic viscosity number, glass transition temperature, crystal melting temperature, 5% weight loss temperature and melt viscosity (420° C./5 min.) of the thus-obtained polyimide powder are shown in Table B19.

TABLE B19

| Ex./Comp. Ex. No. | Logarithmic viscosity number [dL/g] | Glass transition temp. [° C.] | Crystal melting temp. [° C.] | 5% Weight loss temp. [° C.] | Melt viscosity 420 [° C.] 5 min. [Pa · S] |
|---|---|---|---|---|---|
| Example B43 | 0.473 | 248 | 404 | 564 | 370 |
| Example B44 | 0.471 | 248 | 403 | 562 | 400 |
| Example B45 | 0.468 | 247 | 403 | 563 | 490 |
| Comp.Ex. B23 | 0.468 | 248 | 403 | 564 | 350 |

Using the polyimide powder so obtained, pelletization was conducted at 420° C. by extrusion. Injection molding was then conducted at a resin temperature of from 315 to 425° C., an injection pressure of from 1,400 to 1,600 kg/cm² and a mold temperature of 220° C., whereby a specimen of the shape specified in ASTM-D-638 was obtained.

To the thus-obtained specimen, annealing treatment was applied further under a nitrogen gas stream, whereby the specimen was crystallized and, where the specimen was that of one of the examples, the specimen was subjected to crosslinking. The annealing treatment consisted of the following seven steps: ① heating from room temperature to 240° C. at a heating rate of 5° C./min., ② annealing at 240° C. for 5 hours, ③ heating from 240° C. to 300° C. at a heating rate of 5° C./min., ④ annealing at 300° C. for 5 hours, ⑤ heating from 300° C. to 380° C. at a heating rate of 5° C./min., ⑥ annealing at 380° C. for 5 hours, and ⑦ cooling to room temperature at a cooling rate of 5° C./min.

Using the specimen, a tensile test was performed. The results are shown in Table B20.

TABLE B20

| Ex./ Comp. Ex. No. | Break strength [MPa] | Yield strength [MPa] | Modulus of elasticity [MPa] | Elongation [%] |
|---|---|---|---|---|
| Example B43 | 98.80 | 105.00 | 2560 | 13.5 |
| Example B44 | 102.00 | 106.00 | 2580 | 18.6 |
| Example B45 | 99.80 | 105.00 | 2670 | 24.4 |
| Comp.Ex. B23 | 93.60 | 98.80 | 2490 | 12.0 |

From the above results, it is evident that the crosslinkable-group-containing polyimide according to the present invention, even when crystallized, has good mechanical properties.

Examples B46–B49, Comparative Examples B24–B27

In each of these examples and comparative examples, the following two reactions (A),(B) were conducted.

(A) 3,4'-diaminodiphenyl ether (200.24 g, 1.000 mol), 3,3', 4,4'-biphenyltetracarboxylic acid anhydride (136.81 g, 0.465 mol) and bis(3,4-dicarboxyphenyl)ether dianhydride (144.25 g, 0.465 mol) were charged as monomers together with m-cresol (1,925 g) as a solvent into a vessel equipped with a stirrer, a reflux condenser, a water trap and a nitrogen gas inlet tube. The contents were heated With stirring to 200° C. over 3 hours under a nitrogen atmosphere, and a reaction was conducted under 200° C. reflux conditions for 2 hours, whereby a solution of an end-unblocked polymer was obtained. During the reaction, phthalic anhydride (20.74 g, 140.0 mmol) and 1-phenyl-2-(3,4-dicarboxyphenyl)acetylene anhydride (34.75 g, 140.0 mmol) were charged as end blocking agents together with m-cresol (200.0 mL) into another vessel, and were then heated beforehand at 100° C. for 1 hour under a nitrogen atmosphere to provide a solution. The solution of the end blocking agents was charged in its entirety into the solution of the end-unblocked polymer, and reactions were then conducted under 200° C. reflux conditions for 2 hours. The reaction mixture was thereafter cooled to 60° C., the resulting viscous polymer solution was discharged into:methanol, (10 liters) which was under vigorous agitation, and a precipitate was then collected by filtration. The precipitate was again suspended and allowed to reprecipitate in methanol (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

(B) In each of these examples and comparative examples, polyimide powder was obtained in exactly the same manner as in the reaction (A) except that the amounts of the end blocking agents of the kinds were changed to only phthalic anhydride (41.47 g, 280.00 mmol).

The logarithmic viscosity numbers, glass transition temperatures, 5% weight loss temperatures and melt viscosities (360° C./5 min.) of the powders obtained in the two reactions (A), (B) are shown in Table B21.

Further, each powder was extruded into pellets at 355° C. by a 25-mm single-screw extruder. After the pellets were filled in a compression mold of the shape specified in ASTM-D-638, compression molding was conducted under the conditions described in Table B22. Using the thus-obtained specimen, a chemical resistance test was performed. Described specifically, the specimen was fixed on a jig in a state stretched by 0.5%, and was then immersed in toluene or methyl ethyl ketone at room temperature (23° C.) for 24 hours. Using the immersed specimen, a tensile test was performed at room temperature (23° C.). The results of the tensile test were compared with those of a tensile test of a corresponding non-immersed specimen, and a break strength retention (%) was calculated. Incidentally, the term "break strength retention (%)" as used herein means a value expressed in terms of percentage by comparing the break strength of an immersed specimen with the break strength of a corresponding non-immersed specimen.

The results are shown in Table B22. In Table B22, "MEK" stands for methyl ethyl ketone.

TABLE B21

|     | Logarithmic viscosity number [dL/g] | Glass transition temp. [° C.] | 5% Weight loss temp. [° C.] | Melt viscosity 360 [° C.] 5 min. [Pa · S] |
|-----|-------------------------------------|-------------------------------|------------------------------|-------------------------------------------|
| (A) | 0.440                               | 228                           | 560                          | 950                                       |
| (B) | 0.441                               | 227                           | 560                          | 910                                       |

TABLE B22

| Ex./Comp. Ex. No. | Used powder | Compression molding conditions | Retention of break strength [%] Toluene | MEK |
|-------------------|-------------|--------------------------------|-----------------------------------------|------|
| Example B46       | (A)         | 390° C., 6 hr.                 | 90.6                                    | 77.4 |
| Example B47       | (A)         | 370° C., 6 hr.                 | 90.2                                    | 81.0 |
| Example B48       | (A)         | 350° C., 6 hr.                 | 87.6                                    | 75.1 |
| Example B49       | (A)         | 330° C., 6 hr.                 | 84.1                                    | 66.5 |
| Comp.Ex. B24      | (B)         | 390° C., 6 hr.                 | 80.8                                    | 37.1 |
| Comp.Ex. B25      | (B)         | 370° C., 6 hr.                 | 83.2                                    | 41.2 |
| Comp.Ex. B26      | (B)         | 350° C., 6 hr.                 | 82.6                                    | 42.4 |
| Comp.Ex. B27      | (B)         | 330° C., 6 hr.                 | 83.0                                    | 40.7 |

From the above results, it is evident that the crosslinkable-group-containing polyimide according to the present invention is significantly improved in chemical resistance by annealing under various conditions irrespective of the annealing temperature. It is appreciated that this effect cannot be expected from the conventional polyimides of the comparative examples.

Examples B50–B54, Comparative Examples B28–B32

In each of these examples and comparative examples, polyimide powder was synthesized in exactly the same manner as in Examples B13–B17 except that the corresponding one of various diamines and bis(3,4-dicarboxyphenyl)ether dianhydride (288.50 g, 0.930 mol) were used as monomers and that phthalic anhydride (20.74 g, 140.0 mmol) and 1-phenyl-2-(3,4-dicarboxyphenyl) acetylene anhydride (34.75 g, 140.0 mmol) were used as end blocking agents in each of the examples but only phthalic anhydride (41.47 g, 280.00 mmol) was used as an end blocking agent in each of the comparative examples.

Further, the thus-obtained polyimide powder was extruded into pellets at 325° C. to 365° C. by a single-screw extruder of 25 mm in barrel diameter. After the pellets were filled in a compression mold of the shape specified in ASTM-D-648, compression molding was conducted under the conditions of 360° C. and 6 hours.

Using the specimen so obtained, its heat distortion temperature was measured.

The kinds and amounts of the diamines, which were used in the respective examples and comparative examples, and the heat distortion temperatures are shown in Table B23. In Table B23, the diamines are represented by the following signs:

a) 3,3'-diaminodiphenyl ether,
b) 3,4'-diaminodiphenyl ether,
c) 4,4'-diaminodiphenyl ether,
e) 3,3'-diaminodiphenyl sulfone, and
h) 4,4'-diaminodiphenylmethane.

TABLE B23

| Ex. No. | Comp. Ex. No. | Diamine Kind/ | Charged amount [g]/ | Charged amount [mol] | Heat distortion temp. [° C.] Ex. | Comp.Ex. |
|---------|---------------|---------------|---------------------|----------------------|-----------------------------------|----------|
| B50     | B28           | a)            | 200.24              | 1.000                | 255                               | 220      |
| B51     | B29           | b)            | 200.24              | 1.000                | 280                               | 230      |
| B52     | B30           | c)            | 200.24              | 1.000                | 290                               | 255      |
| B53     | B31           | e)            | 248.30              | 1.000                | 285                               | 255      |
| B54     | B32           | h)            | 198.27              | 1.000                | 305                               | 260      |

Examples B55–B59, Comparative Examples B33–B37

In each of these examples and comparative examples, polyimide powder was synthesized in exactly the same manner as in Examples 23–32 except that the corresponding one of various diamines, 4,4'-diaminodiphenyl ether (180.22 g, 0.900 mol) and 1,4-bis(3,4-dicarboxyphenoxy)benzene dianhydride (374.16 g, 0.930 mol) were used as monomers and that phthalic anhydride (20.74 g, 140.0 mmol) and 1-phenyl-2-(3,4-dicarboxyphenyl)-acetylene anhydride (34.75 g, 140.0 mmol) were used as end blocking agents in each of the examples but only phthalic anhydride (41.47 g, 280.00 mmol) was used as an end blocking agent in each of the comparative examples.

In a similar manner as in Examples B50–B54, specimens were then obtained from the respective polyimide powders, and their heat distortion temperatures were measured. The kinds and amounts of the diamines, which were used in the respective examples, and the heat distortion temperatures are shown in Table B24. In Table B24, the diamines are indicated by the following signs:

a) 3,3'-diaminophenyl ether,
b) 4,4'-diaminodiphenyl ether,
c) 3,3'-diaminodiphenyl sulfide,
d) 3,3'-diaminobenzophenone,
e) 3,3'-diaminodiphenylmethane, and
f) 2,2-di(4-aminophenyl)propane.

TABLE B24

| Ex. No. | Comp. Ex. No. | Diamine Kind/ | Charged amount [g]/ | Charged amount [mol] | Heat distortion temp. [° C.] Ex. | Comp.Ex. |
|---------|---------------|---------------|---------------------|----------------------|-----------------------------------|----------|
| B55     | B33           | a)            | 20.02               | 0.100                | 280                               | 250      |
| B56     | B34           | c)            | 21.63               | 0.100                | 285                               | 250      |
| B57     | B35           | d)            | 21.23               | 0.100                | 280                               | 245      |
| B58     | B36           | e)            | 19.83               | 0.100                | 275                               | 250      |
| B59     | B37           | f)            | 22.63               | 0.100                | 280                               | 245      |

From the above tests, it is evident that crosslinkable-group-containing polyimides according to the present invention, which have various structures, are considerably superior in heat resistance to similar polymers having no crosslinkable groups.

Examples B60–B61, Comparative Example B38

Using the polyimide powders employed above in Examples B30 and B32 and Comparative Example B16, their melt viscosities were measured in a similar manner as in Examples A80–A82.

Further, with respect to those powders, their gel times at various temperatures were measured in a similar manner as in Examples A83–A87.

The results are shown in Table B25. Incidentally, ">120" which appears in Table B25 indicates that no gel point was reached within the measuring time.

TABLE B25

| Ex./ Comp. Ex. No. | Ex/Comp. Ex. No. of used powder | Measuring temp. [° C.] | Melt viscosity [Pa · S] 5 min. | Melt viscosity [Pa · S] 30 min. | Gel time [min] |
|---|---|---|---|---|---|
| Example B60 | Example B30 | 320 | 6620 | 6770 | >120 |
| | | 340 | 1110 | 1180 | >120 |
| | | 360 | 380 | 410 | 62 |
| | | 380 | 150 | 810 | 33 |
| Example B61 | Example B32 | 320 | 6400 | 6720 | >120 |
| | | 340 | 970 | 1160 | 105 |
| | | 360 | 390 | 1880 | 26 |
| | | 380 | 330 | 10810 | 11 |
| Comp. Ex. B38 | Comp. Ex. 16 | 320 | 6950 | 19000 | >120 |
| | | 340 | 1080 | 63800 | 33 |
| | | 360 | 10200 | No flow | 4 |
| | | 380 | No flow | ← | 2 |

From the results, it is evident that over a wide temperature range, the crosslinkable-group-containing polyimide according to the present invention has high stability in melt viscosity and is resistant to gelation and hence, is excellent in moldability or formability.

Experiment C Series

In Example C1 to Example C39, a description will be made about certain examples out of the present invention, in each of which 50 to 100 mole % of recurring structural units in a backbone structure are of a recurring unit structure represented by:

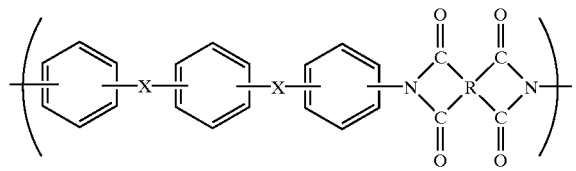

wherein X represents a divalent linking group selected from the group consisting of a direct bond, a carbonyl group, a sulfone group, a sulfide group, an ether group, an isopropylidene group and a hexafluoroisopropylidene group; and R represents a tetravalent aromatic group selected from the group consisting of:

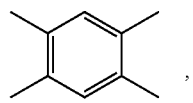

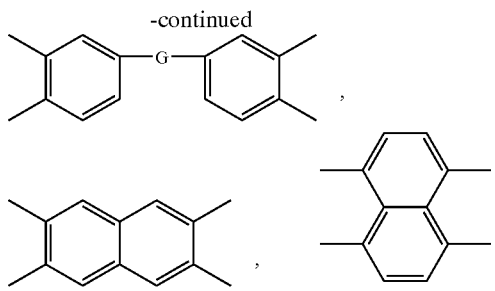

wherein G represents a divalent aromatic group selected from the group consisting of a direct bond, a carbonyl group, a sulfone group, a sulfide group, an ether group, an isopropylidene group, a hexafluoroisopropylidene group, and at least one divalent linking group selected from the group of substituent groups represented by the following formulas:

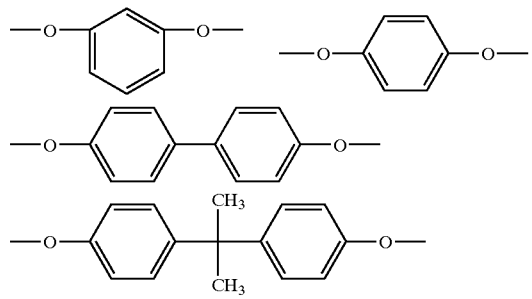

Examples C1–C7, Comparative Examples C1–C3

In each of these examples and comparative examples 1,3-bis(4-aminophenoxy)benzene (292.34 g, 1.000 mol), 3,3',1,4,4'-biphenyltetracarboxylic acid dianhydride (138.28 g, 0.470 mol) and bis(3,4-dicarboxyphenyl)ether dianhydride (145.80 g, 0.470 mol) were charged as monomers together with the corresponding end blocking agent(s), the kind(s) and amount(s) of which are shown in Table C1, and m-cresol (3,266 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and reactions were conducted under 200° C. reflux conditions for 4 hours. In Table C1, "PA" stands for phthalic anhydride, and "PCE" stands for 1-phenyl-2-(3,4-dicarboxyphenyl)-acetylene anhydride.

TABLE C1

| Ex./ Comp. Ex. No. | Charged amount of PA [g] | Charged amount of PA [mmol] | Charged amount of PCE [g] | Charged amount of PCE [mmol] | PA/PCE molar ratio |
|---|---|---|---|---|---|
| Example C1 | 17.60 | 118.8 | 0.2979 | 1.200 | 99/1 |
| Example C2 | 16.89 | 114.0 | 1.489 | 6.000 | 95/5 |
| Example C3 | 16.00 | 108.0 | 2.979 | 12.00 | 90/10 |
| Example C4 | 14.22 | 96.00 | 5.958 | 24.00 | 80/20 |
| Example C5 | 10.66 | 72.00 | 11.92 | 48.00 | 60/40 |
| Example C6 | 7.110 | 48.00 | 17.87 | 72.00 | 40/60 |
| Example C7 | 3.555 | 24.00 | 23.83 | 96.00 | 20/80 |
| Comp.Ex. C1 | 2.666 | 18.00 | 25.32 | 102.0 | 15/85 |
| Comp.Ex. C2 | 0.0 | | 29.79 | 120.0 | 0/100 |
| Comp.Ex. C3 | 17.77 | 120.0 | 0.0 | | 100/0 |

The temperature was then lowered to 190° C., at which the corresponding end blocking agent(s), the kind(s) and amount(s) of which are shown in Table C1, was(were) charged again. The resulting contents were heated again, and the reactions were then conducted under 200° C. reflux conditions for further 4 hours. The reaction mixture was thereafter cooled to 100° C., the resulting viscous polymer solution was discharged into toluene (20 liters) which was under vigorous agitation, and a precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 210° C. for 12 hours under a nitrogen gas stream. The yield of the thus-obtained powder and the logarithmic viscosity number, glass transition temperature, 5% weight loss temperature and melt viscosity (360° C./5 min.) are shown in Table C2.

TABLE C2

| Ex./Comp. Ex. No. | Yield [g] | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|---|
| Example C1 | 509.4 | 0.455 | 204 | 558 | 1020 |
| Example C2 | 510.2 | 0.449 | 203 | 556 | 1150 |
| Example C3 | 510.0 | 0.450 | 203 | 558 | 1160 |
| Example C4 | 512.5 | 0.454 | 205 | 555 | 1110 |
| Example C5 | 513.1 | 0.458 | 203 | 557 | 1250 |
| Example C6 | 515.9 | 0.460 | 204 | 556 | 1410 |
| Example C7 | 517.6 | 0.452 | 204 | 559 | 1830 |
| Comp. Ex. C1 | 520.8 | 0.464 | 203 | 557 | No flow |
| Comp. Ex. C2 | 519.7 | 0.457 | 204 | 555 | No flow |
| Comp. Ex. C3 | 508.4 | 0.458 | 204 | 554 | 990 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) greater than 80/20 are considerably inferior in moldability or formability to those having molar ratios of the chemical formula (2a) to the chemical formula (2b) equal to or smaller than 80/20.

Examples C8–C12, Comparative Examples C4,C5

Using the powders obtained in Examples C2–C6 and Comparative Example C3, compression molding was conducted. The powders used in the respective examples and comparative examples are shown next in Table C3.

TABLE C3

| Ex./Comp. Ex. No. | Ex./Comp. Ex. No. of used powder |
|---|---|
| Example C8 | Example C2 |
| Example C9 | Example C3 |
| Example C10 | Example C4 |
| Example C11 | Example C5 |
| Example C12 | Example C6 |
| Comp. Ex. C4, C5 | Comp. Ex. C3 |

Described specifically, in each of these examples and comparative examples, the powder was extruded into pellets at 355° C. by a single-screw extruder of 25 mm in barrel diameter. After the pellets were filled in a compression mold of configurations specified in ASTM-D-638, compression molding was conducted at 360° C. for 12 hours (Examples C8–C12, Comparative Example C4) or under conditions of 360° C. and 5 minutes (Comparative Example C5). In all the examples and comparative examples, good molded products were obtained. Using those molded products, a tensile test was performed at room temperature (23° C.). The results are shown in Table C4. In Table C4, "PA/PCE molar ratio" means the molar ratio of phthalic anhydride to 1-phenyl-2-(3,4-dicarboxyphenyl)acetylene anhydride.

TABLE C4

| Ex./Comp. Ex. No. | PA/PCE molar ratio | Break strength [MPa] | Yield strength [MPa] | Modulus of elasticity [MPa] | Elongation [%] |
|---|---|---|---|---|---|
| Example C8 | 95/5 | 93.50 | 101.00 | 2180 | 82.6 |
| Example C9 | 90/10 | 93.30 | 100.00 | 2220 | 86.4 |
| Example C10 | 80/20 | 94.00 | 101.00 | 2300 | 79.2 |
| Example C11 | 60/40 | 95.20 | 104.00 | 2450 | 70.1 |
| Example C12 | 40/60 | 94.90 | 105.00 | 2610 | 58.3 |
| Comp. Ex. C4 | 100/0 | 90.80 | 98.80 | 2050 | 66.4 |
| Comp. Ex. C5 | 100/0 | 91.00 | 98.70 | 2090 | 64.3 |

The present invention is characterized in that concerning the molecule ends, the molar ratio of the chemical formula (2a) to the chemical formula (2b) ranges from 1/99 to 80/2 as recited in certain claims. From the above-described results, it is also evident that those having molar ratios of the chemical formula (2a) to the chemical formula (2b) not reaching 1/99 are inferior in mechanical properties to those having molar ratios of the chemical formula (2a) to the chemical formula (2b) equal to or greater than 1/99.

Examples C13–C17, Comparative Examples C6–C8

In each of these examples and comparative examples, 1,4-bis(4-aminophenoxy)benzene (292.34 g, 1.000 mol), 3,3',4,4'-biphenyltetracarboxylic acid dianhydride (138.28 g, 0.470 mol) and bis(3,4-dicarboxyphenyl)ether dianhydride (145.80 g, 0.470 mol) were charged as monomers together with m-cresol (2,105 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and a reaction was conducted under 200° C. reflux conditions for 2 hours, whereby a solution of and-unblocked polymer was obtained. During the reaction, the corresponding end blocking agent(s) described in Table C5 and m-cresol (200.0 mL) were charged into another vessel and were then heated beforehand at 100° C. for 1 hour under a nitrogen atmosphere to provide a solution. The solution of the end blocking agent(s) was charged in its entirety into the solution of the end-unblocked polymer, and reaction(s) was (were) then conducted under 200° C. reflux conditions for 2 hours. In Table C5, "PA" stands for phthalic anhydride, and "PCE" stands for 1-phenyl-2-(3,4-dicarboxyphenyl)acetylene anhydride. k

TABLE C5

| Ex./Comp. Ex. No. | Charged amount of PA [g] | Charged amount of PA [mmol] | Charged amount of PCE [g] | Charged amount of PCE [mmol] | PA/PCE molar ratio |
|---|---|---|---|---|---|
| Example C13 | 33.77 | 228.0 | 2.979 | 12.0 | 95/5 |
| Example C14 | 31.99 | 216.0 | 5.958 | 24.0 | 90/10 |
| Example C15 | 28.44 | 192.0 | 11.96 | 48.0 | 80/20 |

TABLE C5-continued

| Ex./Comp. Ex. No. | Charged amount of PA [g] | [mmol] | Charged amount of PCE [g] | [mmol] | PA/PCE molar ratio |
|---|---|---|---|---|---|
| Example C16 | 21.33 | 144.0 | 23.83 | 96.00 | 60/40 |
| Example C17 | 14.21 | 96.00 | 35.75 | 144.0 | 40/60 |
| Comp. Ex. C6 | 5.332 | 36.00 | 50.64 | 204.0 | 15/85 |
| Comp. Ex. C7 | 0 | 0 | 59.58 | 240.0 | 0/100 |
| Comp. Ex. C8 | 35.55 | 240.0 | 0 | 0 | 100/0 |

The reaction mixture was thereafter cooled to 100° C. While maintaining the resultant viscous polymer solution at 100° C., toluene (2 liters) which had been heated at 100° C. was charged into the polymer solution and further, toluene-(6 liters) was charged dropwise over 4 hours. After toluene (4 liters) was charged, the resulting mixture was allowed to cool down to room temperature. A precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 200° C. under reduced pressure for 12 hours under a gentle nitrogen gas stream. The yield of the thus-obtained powder and the logarithmic viscosity number, glass transition temperature, 5% weight loss temperature and melt viscosity (360° C./5 min.) are shown in Table C6.

TABLE C6

| Ex./Comp. Ex. No. | Yield [g] | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|---|
| Example C13 | 508.3 | 0.456 | 230 | 556 | 2260 |
| Example C14 | 510.0 | 0.455 | 229 | 554 | 2180 |
| Example C15 | 511.7 | 0.448 | 231 | 557 | 2440 |
| Example C16 | 514.3 | 0.460 | 230 | 555 | 2730 |
| Example C17 | 517.2 | 0.457 | 230 | 556 | 4880 |
| Comp. Ex. C6 | 520.6 | 0.454 | 230 | 551 | No flow |
| Comp. Ex. C7 | 522.9 | 0.444 | 231 | 554 | No flow |
| Comp. Ex. C8 | 506.8 | 0.462 | 231 | 556 | 2190 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) greater than 80/20 are considerably inferior in moldability or formability to those having molar ratios of the chemical formula (2a) to the chemical formula (2b) equal to or smaller than 80/20.

Examples C18–C22, Comparative Examples C9, C10.

Using the powders obtained in Examples C13–C17 and Comparative Example C8, compression molding was conducted. The powders used in the respective examples and comparative examples are shown next in Table C7.

TABLE C7

| Ex./Comp. Ex. No. | Ex./Comp. Ex. No. of used powder |
|---|---|
| Example C18 | Example C13 |
| Example C19 | Example C14 |
| Example C20 | Example C15 |
| Example C21 | Example C16 |
| Example C22 | Example C17 |
| Comp. Ex. C9, C10 | Comp. Ex. C8 |

Described specifically, in each of these examples and comparative examples, the powder was extruded into pellets at 355° C. by a single-screw extruder of 25 mm in barrel diameter. After the pellets were filled in a compression mold having a size of 10.0 mm in width and 80.0 mm in length, compression molding was conducted at 360° C. for 12 hours (Examples 18–22, Comparative Example 9) or under conditions of 360° C. and 5 minutes (Comparative Example 10). In all the examples and comparative examples, good molded products were obtained. Those specimens were all of 10.0 mm±0.010 mm in width, 80.0 mm±0.010 mm in length and 1.500 mm±0.010 mm in thickness. Using those molded products, a chemical resistance test was performed. Described specifically, each specimen was held in place at portions 5.00 mm apart from opposite ends thereof, and was then adjusted and fixed such that a displacement of 3.50 mm in the direction of the thickness would be given when the specimen was bent by a jig maintained in contact with the specimen at a center thereof (a portion 40.0 mm apart from the respective ends). Under those conditions, the specimen was immersed in toluene or methyl ethyl ketone. One hour, 24 hours and 168 hours later, the specimen was taken out of the solvent and visually observed for cracks.

The results of the chemical resistance test are shown in Table C8. In Table C8, "A", "B" and " C" indicate "completely free of cracks", "cracks observed in a very small number" and "cracks observed in a large number", respectively, in this order. Further, "PA/PCE molar ratio" means the molar ratio of phthalic anhydride to 1-phenyl-2-(3,4-dicarboxy-phenyl)acetylene an-hydride, and "MEK" stands for methyl ethyl ketone.

TABLE C8

| Ex./Comp. Ex. No. | Toluene immersion time | | | MEK immersion time | | | PA/PCE molar ratio |
|---|---|---|---|---|---|---|---|
| | 1 hr. | 24 hr. | 168 hr. | 1 hr. | 24 hr. | 168 hr. | |
| Example C18 | A | A | A | B | B | B | 95/5 |
| Example C19 | A | A | A | A | A | B | 90/10 |
| Example C20 | A | A | A | A | A | B | 80/20 |
| Example C21 | A | A | A | A | A | A | 60/40 |
| Example C22 | A | A | A | A | A | A | 40/60 |
| Comp. Ex. C9 | A | B | B | B | C | C | 0/100 |
| Comp. Ex. C10 | A | B | B | B | C | C | 0/100 |

The present invention is characterized in that concerning the molecule ends, the molar ratio of the chemical formula (2a) to the chemical formula (2b) ranges from 1/99 to 80/20 as recited in certain claims. From the above-described results, it is in evident that those having molar ratios of the chemical formula (2a) to the chemical formula (2b) not reaching 1/99 are inferior in chemical resistance to those having molar ratios of the chemical formula (2a) to the chemical formula (2b) equal to or greater than 1/99.

Examples C23–C27, Comparative Examples C11–C13

In each of these examples and comparative examples, the following two reactions (A),(B) were conducted.

(A) 1,3-Bis(3-aminophenoxy)benzene (292.34 g, 1.000 mol), pyromellitic dianhydride (102.52 g, 0.470 mol), and 3,3',4,4'-benzophenonetetracarboxylic acid dianhydride (151.45 g, 0.470 mol) were charged as monomers together with phthalic anhydride (10.66 g, 72.00 mmol) and 1-phenyl-2-(3,4-dicarboxyphenyl)acetylene anhydride (11.92 g, 48.00 mmol) as end blocking agents, m-cresol (2,185 g) as a solvent, and γ-picoline (13.970 g, 0.1500 mol) as a catalyst into a vessel equipped with a stirrer, a reflux condenser, a water trap and a nitrogen gas inlet tube. The contents were heated with stirring to 150° C. over 2 hours under a nitrogen atmosphere, and reactions were conducted at 150° C. for 2 hours.

As end blocking agents, phthalic anhydride (5.33 g, 36.00 mmol) and 1-phenyl-2-(3,4-dicarboxyphenyl)acetylene anhydride (5.96 g, 24.00 mmol) were then charged, followed by the reactions at 150° C. for further 8 hours.

The reaction mixture was thereafter cooled to 60° C., the resulting viscous polymer solution was discharged into methyl ethyl ketone (10 liters) which was under vigorous agitation, and a precipitate was then collected by filtration. The precipitate was again suspended and allowed to reprecipitate in methyl ethyl ketone (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

(B) In each of these examples and comparative examples, polyimide powder was obtained in exactly the same manner as in the reaction (A) except that upon preparation of the make-up, the amount(s) of the end blocking agent (s) of the kind(s) was(were) changed to only phthalic anhydride (17.77 g, 120.00 mmol) and that during the reactions, the amount(s) of the end blocking agent(s) of the kind(s) was(were) changed to only phthalic anhydride (8.89 g, 60.00 mmol).

The yields of the powders obtained in the two reactions (A),(B) and their logarithmic viscosity numbers, glass transition temperatures, 5% weight loss temperatures and melt viscosities (360° C./5 min.) are shown in Table C9.

Further, each powder was extruded into pellets at 355° C. by a single-screw extruder of 25 mm in barrel diameter. After the pellets were filled in a compression mold of the shape specified in ASTM-D-638, compression molding was conducted under the conditions described in Table C10.

TABLE C9

|  | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|
| (A) | 0.450 | 202 | 550 | 2650 |
| (B) | 0.452 | 204 | 548 | 2470 |

TABLE C10

| Ex./Comp. Ex. No. | Used powder | Compression molding conditions |
|---|---|---|
| Examples C23 | (A) | 345° C., 2 hr. |
| Examples C24 | (A) | 345° C., 6 hr. |
| Examples C25 | (A) | 345° C., 12 hr. |
| Examples C26 | (A) | 345° C., 24 hr. |
| Examples C27 | (A) | 345° C., 72 hr. |
| Comp. Ex. C11 | (B) | 345° C., 2 hr. |
| Comp. Ex. C12 | (B) | 345° C., 12 hr. |
| Comp. Ex. C13 | (B) | 345° C., 72 hr. |

Using the specimens so obtained, a high-temperature tensile test at room temperature (23° C.) was performed. The results are shown in Table C11.

TABLE C11

| Ex./Comp. Ex. No. | Break strength [Mpa] | Yield strength [MPa] | Modulus of elasticity [MPa] | Elongation [%] |
|---|---|---|---|---|
| Example C23 | 86.60 | 94.10 | 2420 | 55.5 |
| Example C24 | 88.10 | 98.60 | 2510 | 58.9 |
| Example C25 | 90.30 | 99.20 | 2660 | 52.6 |
| Example C26 | 97.70 | 103.00 | 2740 | 55.4 |
| Example C27 | 101.00 | 102.00 | 2800 | 54.8 |
| Comp. Ex. C11 | 85.50 | 90.20 | 2310 | 50.7 |
| Comp. Ex. C12 | 85.40 | 89.90 | 2320 | 38.1 |
| Comp. Ex. C13 | 80.80 | 91.10 | 2280 | 16.6 |

From the foregoing, it is evident that the crosslinkable-group-containing polyimide according to the present invention can be significantly improved in mechanical properties by annealing, and it is also appreciated that this effect cannot be expected from the conventional polyimides of the comparative examples.

Examples C28–C32, Comparative Examples C14–C16

In each of these examples and comparative examples, bis(3,4-dicarboxyphenyl)ether dianhydride and 1,4-bis(3,4-dicarboxyphenoxy)benzene dianhydride were charged in their corresponding amounts shown in Table C12 together with 1,3-bis(4-aminophenoxy)benzene (292.34 g, 1.000 mol), all as monomers, into a vessel equipped with a stirrer, a reflux condenser, a water trap and a nitrogen gas inlet tube. As a solvent, m-cresol was also charged in its corresponding amount shown in Table C12. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained. In Table C12, "ODPA" stands for bis(3,4-dicarboxyphenyl)ether dianhydride, and "HQDA" stands for 1,4-bis(3,4-dicarboxyphenoxy)benzene dianhydride.

TABLE C12

| Ex./Comp. Ex. No. | Charged amount of ODPA | | Charged amount of HQDA | | Charged amount of m-cresol [g] |
|---|---|---|---|---|---|
|  | [g] | [mol] | [g] | [mol] |  |
| Example C28 | 208.47 | 0.6720 | 115.87 | 0.2880 | 2267 |
| Examples C29, 31 | 201.95 | 0.6510 | 112.25 | 0.2790 | 2226 |
| Examples C30, 32 | 195.44 | 0.6300 | 108.63 | 0.2700 | 2186 |

TABLE C12-continued

| Ex./Comp. Ex. No. | Charged amount of ODPA [g] | [mol] | Charged amount of HQDA [g] | [mol] | Charged amount of m-cresol [g] |
|---|---|---|---|---|---|
| Comp. Ex. C14 | 208.47 | 0.6720 | 115.87 | 0.2880 | 2267 |
| Comp. Ex. C15 | 201.95 | 0.6510 | 112.25 | 0.2790 | 2226 |
| Comp. Ex. C16 | 195.44 | 0.6300 | 108.63 | 0.2700 | 2186 |

During the reaction, the corresponding end blocking agents described in Table C13 and m-cresol (200.0 mL) were charged into another vessel and were then heated beforehand at 100° C. for 1 hour under a nitrogen atmosphere to provide a solution. The solution of the end blocking agents was charged in its entirety into the solution of the end-unblocked polymer, and reactions were then conducted under 200° C. reflux conditions for 2 hours. In Table C13, "PA" stands for phthalic anhydride, and "PCE" stands for 1-phenyl-2-(3,4-dicarboxyphenyl)-acetylene anhydride.

TABLE C13

| Ex./Comp. Ex. No. | Charged amount of PA [g] | [mmol] | Charged amount of PCE [g] | [mmol] | PA/PCE molar ratio |
|---|---|---|---|---|---|
| Example C28 | 16.59 | 112.0 | 11.92 | 48.00 | 70/30 |
| Example C29 | 29.03 | 196.0 | 20.85 | 84.00 | 70/30 |
| Example C30 | 41.47 | 280.0 | 29.79 | 120.0 | 70/30 |
| Example C31 | 20.74 | 140.0 | 34.75 | 140.0 | 50/50 |
| Example C32 | 29.62 | 200.0 | 49.45 | 200.0 | 50/50 |
| Comp. Ex. C14 | 3.555 | 24.00 | 33.76 | 136.0 | 15/85 |
| Comp. Ex. C15 | 6.221 | 42.00 | 59.08 | 238.0 | 15/85 |
| Comp. Ex. C16 | 8.887 | 60.00 | 84.40 | 340.0 | 15/85 |

The reaction mixture was thereafter cooled to 60° C., the resulting viscous polymer solution was discharged into methyl ethyl ketone (10 liters) which was under vigorous agitation, and a precipitate was then collected by filtration. The precipitate was again suspended and allowed to reprecipitate in methyl ethyl ketone (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

The logarithmic viscosity number, glass transition temperature and melt viscosity (360° C./5 min., 15 min., 30 min.) of the thus-obtained polyimide powder are shown in Table C14.

TABLE C14

| Ex./Comp. Ex. No. | Logarithmic viscosity number [dL/g] | Glass transition temp. [° C.] | 360° C. Melt viscosity [Pa · S] 5 min. | 15 min. | 30 min. |
|---|---|---|---|---|---|
| Example C28 | 0.804 | 185 | 3530 | 3540 | 4140 |
| Example C29 | 0.441 | 185 | 880 | 890 | 970 |
| Example C30 | 0.318 | 183 | 280 | 280 | 290 |
| Example C31 | 0.439 | 185 | 980 | 1520 | 5830 |
| Example C32 | 0.311 | 183 | 310 | 550 | 2460 |
| Comp. EX. C14 | 0.786 | 185 | No flow | ← | ← |
| Comp. EX. C15 | 0.428 | 185 | No flow | ← | ← |
| Comp. EX. C16 | 0.306 | 183 | 18430 | No flow | ← |

It is appreciated from the results that the crosslinkable-group-containing polyimide according to the present invention, even at various molecular weights (or logarithmic viscosity numbers correlating with the molecular weights), has good melt fluidity and is better in moldability or formability than the polyimides of the comparative examples.

Examples C33–C37, Comparative Examples C17–C19

The powders which were obtained in Examples C28–C32 and Comparative Examples C14–C16 were separately placed on heat-resistant dishes, annealed under nitrogen gas at 420° C. for 1 hour, and then quenched. Thereafter, their glass transition temperatures and 5% weight loss temperatures were measured. The results are shown in Table C15.

In Table C15, "Tg" indicates a glass transition temperature, and "Td5" designates a 5% weight loss temperature.

TABLE C15

| Ex./Comp. Ex. No. | Used powder | Before annealing Tg [° C.] | Td5 [° C.] | After annealing Tg [° C.] | Td5 [° C.] |
|---|---|---|---|---|---|
| Example C33 | Example C28 | 185 | 558 | 202 | 554 |
| Example C34 | Example C29 | 185 | 560 | 205 | 552 |
| Example C35 | Example C30 | 183 | 552 | 204 | 550 |
| Example C36 | Example C31 | 185 | 555 | 207 | 551 |
| Example C37 | Example C32 | 183 | 551 | 206 | 549 |
| Comp. Ex. C17 | Comp. Ex. C14 | 185 | 556 | 185 | 548 |
| Comp. Ex. C18 | Comp. Ex. C15 | 185 | 555 | 187 | 550 |
| Comp. Ex. C19 | Comp. Ex. C16 | 183 | 549 | 187 | 523 |

From these results, it is appreciated that, when annealed, the crosslinkable-group-containing polyimide according to the present invention is significantly improved in glass transition temperature but the polyimides of the comparative examples are not improved.

Examples C38–C39, Comparative Example C20

Using the polyimide powders employed above in Examples C29, C31 and Comparative Example C15, their melt viscosities were measured in a similar manner as in Examples A80–A82.

Further, with respect to those powders, their gel times at various temperatures were measured in a similar manner as in Examples A83–A87.

The results are shown in Table C16. Incidentally, ">120" which appears in Table C16 indicates that no gel point was reached within the measuring time.

TABLE C16

| Ex./Comp. Ex. No. | Ex./Comp. Ex. No. of used powder | Measuring temp. [° C.] | Melt viscosity [Pa · S] 5 min. | 30 min. | Gel time [min] |
|---|---|---|---|---|---|
| Example C38 | Example C29 | 320 | 13200 | 12800 | >120 |
| | | 340 | 2540 | 2660 | >120 |
| | | 360 | 880 | 970 | 68 |
| | | 380 | 310 | 1910 | 30 |
| Example C39 | Example C31 | 320 | 12600 | 12300 | >120 |
| | | 340 | 2660 | 3010 | 118 |
| | | 360 | 980 | 5830 | 30 |
| | | 380 | 360 | 9550 | 14 |
| Comp. Ex. C20 | Comp. Ex. C15 | 320 | 12800 | 18600 | >120 |
| | | 340 | 3550 | No flow | 36 |
| | | 360 | No flow | ← | 4 |
| | | 380 | No flow | ← | 2 |

From the results, it is evident that over a wide temperature range, the crosslinkable-group-containing polyimide according to the present invention has high stability in melt viscosity and is resistant to gelation and hence, is excellent in moldability or formability.

Experiment D Series

In Example D1 to Example D25, a description will be made about certain examples out of the present invention, in each of which 50 to 100 mole % of recurring structural units in a backbone structure are of a recurring unit structure represented by:

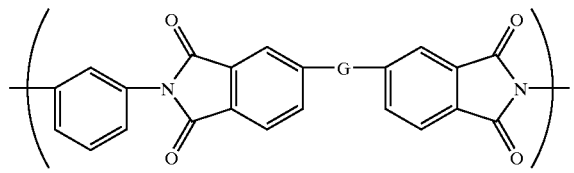

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl] phenoxy group.

Examples D1–D7, Comparative Examples D1–D3

In each of these examples and comparative examples, m-phenylenediamine (108.14 g, 1.000 mol) and 1,4-bis(3, 4-dicarboxyphenoxy)benzene dianhydride (378.18 g, 0.940 mol) were charged as monomers together with the corresponding end blocking agent(s), the kind(s) and amount(s) of which are shown in Table D1, and m-cresol (1,750 g) and N,N-dimethylacetamide (195 g) as solvents into a vessel equipped with a stirrer, a reflux condenser, a water trap and a nitrogen gas inlet tube. The contents were heated with stirring to 200° C. over 2 hours and 30 minutes under a nitrogen atmosphere, and reactions were conducted under 200° C. reflux conditions for 4 hours. In Table D1, "PA" stands for phthalic anhydride, and "PCE" stands for 1-phenyl-2-(3,4-dicarboxyphenyl)-acetylene anhydride.

TABLE D1

| Ex./Comp. Ex. No. | Charged amount of PA [g] | [mmol] | Charged amount of PCE [g] | [mmol] | PA/PCE molar ratio |
|---|---|---|---|---|---|
| Example D1 | 17.60 | 118.8 | 0.2979 | 1.200 | 99/1 |
| Example D2 | 16.89 | 114.0 | 1.489 | 6.000 | 95/5 |
| Example D3 | 16.00 | 108.8 | 2.979 | 12.00 | 90/10 |
| Example D4 | 14.22 | 96.00 | 5.958 | 24.00 | 80/20 |
| Example D5 | 10.66 | 72.00 | 11.92 | 48.00 | 60/40 |
| Example D6 | 7.110 | 48.00 | 17.87 | 72.00 | 40/60 |
| Example D7 | 3.555 | 24.00 | 23.83 | 96.00 | 20/80 |
| Comp. Ex. D1 | 2.666 | 18.00 | 25.32 | 102.0 | 15/85 |
| Comp. Ex. D2 | 0 | 0 | 29.79 | 120.0 | 0/100 |
| Comp. Ex. D3 | 17.77 | 120.0 | 0 | 0 | 100/0 |

The temperature was then lowered to 190° C., at which the corresponding end blocking agent(s), the kind(s) and amount(s) of which are shown in Table D1, was (were) charged again. The resulting contents were heated again, and the reactions were then conducted under 200° C. reflux conditions for further 4 hours.

Thereafter, the reaction mixture was cooled to 100° C. and then discharged into toluene (10 liters) which was under vigorous agitation, and a precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 220° C. for 12 hours under a nitrogen gas stream. The logarithmic viscosity number, glass transition temperature, 5% weight loss temperature and melt viscosity (360° C./5 min.) of the thus-obtained powder are shown in Table D2.

TABLE D2

| Ex. /Comp. Ex. No. | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|
| Example D1 | 0.431 | 232 | 565 | 820 |
| Example D2 | 0.439 | 231 | 564 | 810 |
| Example D3 | 0.499 | 231 | 565 | 900 |
| Example D4 | 0.440 | 231 | 558 | 880 |
| Example D5 | 0.444 | 231 | 566 | 940 |
| Example D6 | 0.437 | 232 | 564 | 1240 |
| Example D7 | 0.429 | 231 | 563 | 2430 |
| Comp. Ex. D1 | 0.455 | 231 | 564 | No flow |
| Comp. Ex. D2 | 0.452 | 232 | 556 | No flow |
| Comp. Ex. D3 | 0.448 | 231 | 564 | 800 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) greater than 80/20 are considerably inferior in moldability or formability to those having molar ratios of the chemical formula (2a) to the chemical formula (2b) equal to or smaller than 80/20.

Examples D8–D12, Comparative Examples D4,D5.

Using the powders obtained in Examples D2–D6 and Comparative Example D3, compression molding was conducted. The powders used in the respective examples and comparative examples are shown next in Table D3.

TABLE D3

| Ex./Comp.Ex. No. | Ex./Comp.Ex. No. of used powder |
|---|---|
| Example D8 | Example D2 |
| Example D9 | Example D3 |
| Example D10 | Example D4 |
| Example D11 | Example D5 |
| Example D12 | Example D6 |
| Comp.Ex. D4, D5 | Comp.Ex. D3 |

Described specifically, in each of these examples and comparative examples, the powder was extruded into pellets at 355° C. by a 25-mm, single-screw extruder. After the pellets were filled in a compression mold of configurations specified in ASTM-D-638, compression molding was conducted at 360° C. for 12 hours (Examples D8–D12, Comparative Example D4) or under conditions of 360° C. and 5 minutes (Comparative Example 5). In all the examples and comparative examples, good molded products were obtained. Using those molded products, a tensile test was performed at room temperature (23° C.). The results are shown in Table D4. In Table D4, "PA/PCE molar ratio" means the molar ratio of phthalic anhydride to 1-phenyl-2-(3,4-dicarboxyphenyl)-acetylene anhydride.

TABLE D4

| Ex./Comp.Ex. No. | PA/PCE molar ratio | Break strength [MPa] | Yield strength [MPa] | Modulus of elasticity [MPa] | Elongation [%] |
|---|---|---|---|---|---|
| Example D8 | 95/5 | 85.50 | 90.20 | 2360 | 24.3 |
| Example D9 | 90/10 | 84.90 | 92.00 | 2380 | 29.1 |
| Example D10 | 80/20 | 89.40 | 96.00 | 2440 | 23.5 |
| Example D11 | 60/40 | 88.80 | 94.00 | 2600 | 20.8 |
| Example D12 | 40/60 | 90.10 | 98.00 | 2780 | 21.9 |
| Comp.Ex. D4 | 100/0 | 84.80 | 89.80 | 2060 | 23.3 |
| Comp.Ex. D5 | 100/0 | 84.40 | 89.40 | 2100 | 22.2 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) not reaching 1/99 are inferior in mechanical properties to those having molar ratios of the chemical formula (2a) to the chemical formula (2b) equal to or greater than 1/99.

Examples D13–D22, Comparative Examples D6–D10

In each of these examples and comparative examples, the following two reactions (A),(B) were conducted.

(A) m-Phenylenediamine (108.14 g, 1.000 mol), 3,4'-diaminodiphenyl ether (80.10 g, 0.400 mol) and bis(3,4-dicarboxyphenyl)sulfone dianhydride (336.78 g, 0.940 mol) were charged as monomers together with phthalic anhydride (10.66 g, 72.00 mmol) and 1-phenyl-2-(3,4-dicarboxy-phenyl)acetylene anhydride (11.92 g, 48.00 mmol) as end blocking agents, m-cresol (2,730 g) as a solvent, and γ-picoline (13.970 g, 0.1500 mol) as a catalyst into a vessel equipped with a stirrer, a reflux condenser, a water trap and a nitrogen gas inlet tube. The contents were heated with stirring to 150° C. over 2 hours under a nitrogen atmosphere, and reactions were conducted at 150° C. for 2 hours.

As end blocking agents, phthalic anhydride (5.33 g, 36.00 mmol) and 1-phenyl-2-(3,4-dicarboxyphenyl)acetylene anhydride (5.96 g, 24.00 mmol) were then charged, followed by the reactions at 150° C. for further 8 hours. The reaction mixture was thereafter cooled to 60° C. and then discharged into methyl ethyl ketone (10 liters) which was under vigorous agitation, and a precipitate was then collected by filtration. The precipitate was again suspended and allowed to reprecipitate in methyl ethyl ketone (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

(B) In each of these examples and comparative examples, polyimide powder was obtained in exactly the same manner as in the reaction (A) except that upon preparation of the make-up, the amount(s) of the end blocking agent(s) of the kind(s) was(were) changed to only phthalic anhydride (17.77 g, 120.00 mmol) and that during the reactions, the amount(s) of the end blocking agent(s) of the kind(s) was(were) changed to only phthalic anhydride (8.89 g, 60.00 mmol).

The yields of the powders obtained in the two reactions (A),(B) and the logarithmic viscosity numbers, glass transition temperatures, 5% weight loss temperatures and melt viscosities (360° C./5 min.) of the polyimide powders are shown in Table D5.

Further, each powder was extruded into pellets at 355° C. by a 25-mm, single-screw extruder. After the pellets were filled in a compression mold of the shape specified in ASTM-D-638, compression molding was conducted under the conditions described in Table D6.

TABLE D5

| | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|
| (A) | 0.421 | 236 | 560 | 1050 |
| (B) | 0.425 | 236 | 561 | 1000 |

TABLE D6

| Ex./Comp.Ex. No. | Used powder | Compression molding conditions |
|---|---|---|
| Examples D13, D18 | (A) | 360° C., 72 hr. |
| Examples D14, D19 | (A) | 360° C., 24 hr. |
| Examples D15, D20 | (A) | 360° C., 12 hr. |
| Examples D16, D21 | (A) | 360° C., 6 hr. |
| Examples D17, D22 | (A) | 360° C., 2 hr. |
| Comp.Ex. D6, D9 | (B) | 360° C., 72 hr. |
| Comp.Ex. D7, D10 | (B) | 360° C., 12 hr. |
| Comp.Ex. D8, D11 | (B) | 360° C., 2 hr. |

Using the specimens so obtained, a tensile test at room temperature (23° C.) and a high-temperature tensile test at 177° C. were performed. The results are shown in Table D7.

TABLE D7

| Ex./Comp. Ex. No. | PA/PCE molar ratio | Testing temp. [° C.] | Break strength [Mpa] | Yield strength [MPa] | Modulus of elasticity [MPa] | Elongation [%] |
|---|---|---|---|---|---|---|
| Example D13 | 60/40 | 23 | 99.20 | 108.00 | 2770 | 41.3 |
| Example D14 | 60/40 | 23 | 98.40 | 106.00 | 2590 | 44.4 |
| Example D15 | 60/40 | 23 | 97.90 | 104.00 | 2550 | 42.7 |
| Example D16 | 60/40 | 23 | 98.00 | 105.00 | 2500 | 44.6 |
| Example D17 | 60/40 | 23 | 96.70 | 103.00 | 2430 | 50.1 |
| Comp.Ex. D6 | 100/0 | 23 | 95.90 | 104.00 | 2290 | 49.4 |
| Comp.Ex. D7 | 100/0 | 23 | 95.50 | 103.00 | 2270 | 46.6 |
| Comp.Ex. D8 | 100/0 | 23 | 95.69 | 104.00 | 2250 | 47.0 |
| Example D18 | 60/40 | 177 | 84.80 | 90.20 | 2410 | 101 |
| Example D19 | 60/40 | 177 | 84.40 | 88.20 | 2130 | 98 |

TABLE D7-continued

| Ex./Comp. Ex. No. | PA/PCE molar ratio | Testing temp. [° C.] | Break strength [Mpa] | Yield strength [MPa] | Modulus of elasticity [MPa] | Elongation [%] |
|---|---|---|---|---|---|---|
| Example D20 | 60/40 | 177 | 81.10 | 84.50 | 1960 | 113 |
| Example D21 | 60/40 | 177 | 79.50 | 80.60 | 1700 | 117 |
| Example D22 | 60/40 | 177 | 75.60 | 79.90 | 1580 | 122 |
| Comp.Ex. D9 | 100/0 | 177 | 72.20 | 75.10 | 1520 | 131 |
| Comp.Ex. D10 | 100/0 | 177 | 72.80 | 77.10 | 1550 | 124 |
| Comp.Ex. D11 | 100/0 | 177 | 73.10 | 77.00 | 1530 | 130 |

From the above results, it is evident that, when annealed, the crosslinkable-group-containing polyimide according to the present invention is significantly improved in room-temperature and high-temperature mechanical properties. It is also appreciated that this effect cannot be expected from the conventional polyimides of the comparative examples.

Examples D2.3–25, Comparative Examples D12–13

Using the polyimide powders employed above in Examples D4–D6 and Comparative Example D1,D3, their melt viscosities were measured in a similar manner as in Examples A80–A82.

Further, with respect to those powders, their gel times at various temperatures were measured in a similar manner as in Examples A83–A87.

Further, those powders were separately extruded into pellets under conditions of 320° C. to 360° C., and compression molding and an MEK resistance test were performed in a similar manner as in Examples A18–A22.

The results are shown in Table D8. Incidentally, ">120" which appears in Table D8 indicates that no gel point was reached within the measuring time.

TABLE D8

| Ex./Comp. Ex. No. | Ex/Comp. Ex. No. of used powder | Measuring temp. [° C.] | Melt viscosity [Pa · S] 5 min. | 30 min. | Gel time [min.] | MEK resistance test results MEK immersion time 1 Hr. | 24 Hr. | 168 Hr. |
|---|---|---|---|---|---|---|---|---|
| Ex. D23 | Ex. D24 | 360 | 880 | 1010 | >120 | A | A | B |
|  |  | 380 | 330 | 550 | 65 |  |  |  |
| Ex. D24 | Ex. D25 | 360 | 940 | 1760 | 51 | A | A | A |
|  |  | 380 | 370 | 1690 | 28 |  |  |  |
| Ex. D25 | Ex. D26 | 360 | 1240 | 7720 | 26 | A | A | A |
|  |  | 380 | 480 | 8330 | 10 |  |  |  |
| Comp. Ex. D12 | Comp. Ex. D1 | 360 | No flow | ← | 4 | Unable to mold |  |  |
|  |  | 380 | No flow | ← | 2 |  |  |  |
| Comp. Ex. D13 | Comp. Ex. D3 | 360 | 800 | 810 | >120 | B | C | C |
|  |  | 380 | 290 | 330 | >120 |  |  |  |

Note:
"A", "B" and "C" indicate "completely free of cracks", "cracks observed in a very small number" and "cracks observed in a large number", respectively, in this order.

From the results, it is evident that over a wide temperature range, the crosslinkable-group-containing polyimide according to the present invention has is also excellent in chemical resistance despite their high stability in melt viscosity, good resistance to gelation and excellent moldability or formability over a wide temperature range.

Experiment E Series

In Example E1 to Example E22, a description will be made about certain examples out of the present invention, in each of which 50 to 100 mole % of recurring structural units in a backbone structure are of a recurring unit structure represented by:

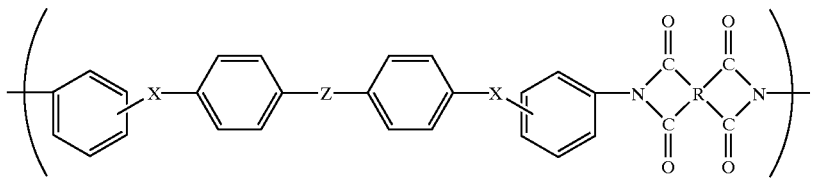

wherein X, Z and R are groups to be indicated next, respectively, that is,

X represents a divalent linking group selected from the group consisting of an ether group and an isopropylidene group;

Z represents a divalent linking group selected from the group consisting of:

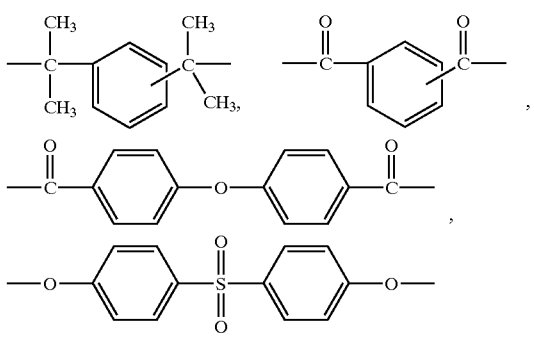

and

R represents a tetravalent aromatic group selected from the group consisting of:

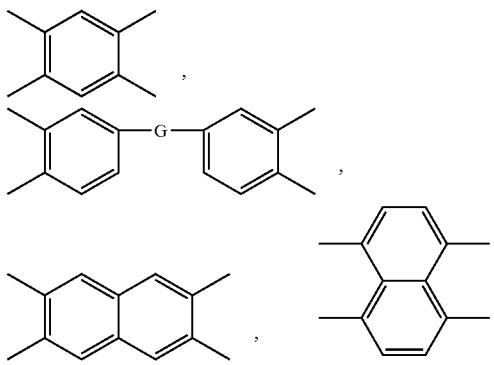

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

Examples E1–E7, Comparative Examples E1–E3

In each of these examples and comparative examples 1,3-bis[4-(4-aminophenoxy)-α, α-dimethylbenzyl]benzene (528.69 g, 1.000 mol) and 3,3',4,4'-biphenyltetracarboxylic acid dianhydride (276.57 g, 0.940 mol) were charged as monomers together with the corresponding end blocking agent(s), the kind(s) and amount(s) of which are shown in Table E1, and m-cresol (3,220 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and reactions were conducted under 200° C. reflux conditions for 4 hours. In Table E1, "PA" stands for phthalic anhydride, and "PCE" stands for 1-phenyl-2-(3,4-dicarboxyphenyl)-acetylene anhydride.

TABLE E1

| Ex./Comp.Ex. No. | Charged amount of PA | | Charged amount of PCE | | PA/PCE molar ratio |
|---|---|---|---|---|---|
| | [g] | [mmol] | [g] | [mmol] | |
| Example E1 | 17.60 | 118.8 | 0.2979 | 1.200 | 99/1 |
| Example E2 | 16.89 | 114.0 | 1.489 | 6.000 | 95/5 |
| Example E3 | 16.00 | 108.0 | 2.979 | 12.00 | 90/10 |
| Example E4 | 14.22 | 96.00 | 5.958 | 24.00 | 80/20 |
| Example E5 | 10.66 | 72.00 | 11.92 | 48.00 | 60/40 |
| Example E6 | 7.110 | 48.00 | 17.87 | 72.00 | 40/60 |
| Example E7 | 3.555 | 24.00 | 23.83 | 96.00 | 20/80 |
| Comp.Ex. E1 | 2.666 | 18.00 | 25.32 | 102.0 | 15/85 |
| Comp.Ex. E2 | 0 | 0 | 29.79 | 120.0 | 0/100 |
| Comp.Ex. E3 | 17.77 | 120.0 | 0 | 0 | 100/0 |

The temperature was then lowered to 190° C., at which the corresponding end blocking agent(s), the kind(s) and amount(s) of which are shown in Table E1, was (were) charged again. The resulting contents were heated again, and the reactions were then conducted under 200° C. reflux conditions for further 4 hours.

Thereafter, the reaction mixture was cooled to 100° C. and then discharged into toluene (10 liters) which was under vigorous agitation, and a precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 220° C. for 12 hours under a nitrogen gas stream. The logarithmic viscosity number, glass transition temperature, 5% weight loss temperature and melt viscosity (360° C./5 min.) of the thus-obtained powder are shown in Table E2.

TABLE E2

| Ex./Comp.Ex. No. | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|
| Example E1 | 0.454 | 175 | 558 | 690 |
| Example E2 | 0.450 | 174 | 557 | 680 |
| Example E3 | 0.459 | 175 | 560 | 710 |
| Example E4 | 0.448 | 175 | 556 | 650 |
| Example E5 | 0.452 | 175 | 560 | 790 |

TABLE E2-continued

| Ex./Comp.Ex. No. | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|
| Example E6 | 0.455 | 177 | 561 | 1010 |
| Example E7 | 0.460 | 177 | 559 | 1890 |
| Comp.Ex. E1 | 0.458 | 178 | 560 | No flow |
| Comp.Ex. E2 | 0.458 | 178 | 559 | No flow |
| Comp.Ex. E3 | 0.454 | 175 | 555 | 690 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) greater than 80/20 are considerably.inferior in moldability or formability to those having molar ratios of the chemical formula (2a) to the chemical formula (2b) equal to or smaller than 80/20.

Examples E8–E12, Comparative Examples E4,E5.

Using the powders obtained in Examples E2–E6 and Comparative Example E3, compression molding was conducted. The powders used in the respective examples and comparative examples are shown next in Table E3.

TABLE E3

| Ex./Comp.Ex. No. | Ex./Comp.Ex. No. of used powder |
|---|---|
| Example E8 | Example E2 |
| Example E9 | Example E3 |
| Example E10 | Example E4 |
| Example E11 | Example E5 |
| Example E12 | Example E6 |
| Comp.Ex. E4, E5 | Comp.Ex. E3 |

Described specifically, in each of these examples and comparative examples, the powder was extruded into pellets at 355° C. by a 25-mm, single-screw extruder. After the pellets were filled in a compression mold of configurations specified in ASTM-D-638, compression molding was conducted at 360° C. for 12 hours (Examples E8–E12, Comparative Example E4) or under conditions of 360° C. and 5 minutes (Comparative Example E5). In all the examples and comparative examples, good molded products were obtained. Using those molded products, a tensile test was performed at room temperature (23° C.). The results are shown in Table E4. In Table E4, "PA/PCE molar ratio" means the molar ratio of phthalic anhydride to 1-phenyl-2-(3,4-dicarboxyphenyl)acetylene anhydride.

TABLE E4

| Ex./Comp.Ex. No. | PA/PCE molar ratio | Break strength [MPa] | Yield strength [MPa] | Modulus of elasticity [MPa] | Elongation [%] |
|---|---|---|---|---|---|
| Example E8 | 95/5 | 92.00 | 98.70 | 2060 | 50.8 |
| Example E9 | 90/10 | 91.60 | 97.90 | 2050 | 40.1 |
| Example E10 | 80/20 | 92.30 | 97.10 | 2090 | 45.2 |
| Example E11 | 60/40 | 94.10 | 98.50 | 2150 | 44.7 |
| Example E12 | 40/60 | 93.80 | 98.50 | 2350 | 50.1 |

TABLE E4-continued

| Ex./Comp.Ex. No. | PA/PCE molar ratio | Break strength [MPa] | Yield strength [MPa] | Modulus of elasticity [MPa] | Elongation [%] |
|---|---|---|---|---|---|
| Comp.Ex. E4 | 100/0 | 90.00 | 94.90 | 2040 | 40.6 |
| Comp.Ex. E5 | 100/0 | 90.40 | 97.40 | 2050 | 45.3 |

The present invention is characterized in that concerning the molecule ends, the molar ratio of the chemical formula (2a) to the chemical formula (2b) ranges from 1/99 to 80/20 as recited in certain claims. From the above-described results, it is also evident that those having molar ratios of the chemical formula (2a) to the chemical formula (2b) not reaching 1/99 are inferior in mechanical properties to those having molar ratios of the chemical formula (2a) to the chemical formula (2b) equal to or greater than 1/99.

Examples E13–E22, Comparative Examples E6–E11

In each of these examples and comparative examples, the following two reactions (A),(B) were conducted.

(A) 4,4'-Bis[4-(4-amino-α, α-dimethylbenzyl)phenoxy]-diphenyl sulfone (668.85 g, 1,000 mol) and pyromellitic dianhydride (205.03 g, 0.940 mol) were charged as monomers together with phthalic anhydride (10.66 g, 72.00 mmol) and 1-phenyl-2-(3,4-dicarboxy-phenyl)acetylene anhydride (11.92 g, 48.00 mmol) as end blocking agents, m-cresol (2,730 g) as a solvent, and γ-picoline (13.970 g, 0.1500 mol) as a catalyst into a vessel equipped with a stirrer, a reflux condenser, a water trap and a nitrogen gas inlet tube. The contents were heated with stirring to 150° C. over 2 hours under a nitrogen atmosphere, and reactions were conducted at 150° C. for 2 hours.

As end blocking agents, phthalic anhydride (5.33 g, 36.00 mmol) and 1-phenyl-2-(3,4-dicarboxyphenyl)acetylene anhydride (5.96 g, 24.00 mmol) were then charged, followed by the reactions at 150° C. for further 8 hours.

The reaction mixture was thereafter cooled to 60° C. and then discharged into methyl ethyl ketone (10 liters) which was under vigorous agitation, and a precipitate was then collected by filtration. The precipitate was again suspended and allowed to reprecipitate in methyl ethyl ketone (4 liters). After the reprecipitate was collected by filtration and then provisionally dried at 50° C. for 24 hours, the reprecipitate was dried at 220° C. for 12 hours under a nitrogen gas stream, whereby polyimide powder was obtained.

(B) In each of these examples and comparative examples, polyimide powder was obtained in exactly the same manner as in the reaction (A) except that upon preparation of the make-up, the amount(s) of the end blocking agent (s) of the kind(s) was (were) changed to only phthalic anhydride (17.77 g, 120.00 mmol) and that during the reactions, the amount(s) of the end blocking agent(s) of the kind(s) was(were) changed to only phthalic anhydride (8.89 g, 60.00 mmol).

The yields of the powders obtained in the two reactions (A),(B) and the logarithmic viscosity numbers, glass transition temperatures, 5% weight loss temperatures and melt viscosities (360° C./5 min.) of the polyimide powders are shown in Table E5.

Further, each powder was extruded into pellets at 355° C. by a 25-mm, single-screw extruder. After the pellets were filled in a compression mold of the shape specified in ASTM-D-638, compression molding was conducted under the conditions described in Table E6.

TABLE E5

|  | Logarithmic viscosity number [dL/g] | Glass transition temp. [° C.] | 5% Weight loss temp. [° C.] | Melt viscosity 360 [° C.] 5 min. [Pa · S] |
|---|---|---|---|---|
| (A) | 0.440 | 265 | 551 | 1820 |
| (B) | 0.440 | 265 | 553 | 1790 |

TABLE E6

| Ex./Comp.Ex. No. | Used powder | Compression molding conditions |
|---|---|---|
| Examples E13, E18 | (A) | 360° C., 72 hr. |
| Examples E14, E19 | (A) | 360° C., 24 hr. |
| Examples E15, E20 | (A) | 360° C., 12 hr. |
| Examples E16, E21 | (A) | 360° C., 6 hr. |
| Examples E17, E22 | (A) | 360° C., 2 hr. |
| Comp.Ex. E6, E9 | (B) | 360° C., 72 hr. |
| Comp.Ex. E7, E10 | (B) | 360° C., 12 hr. |
| Comp.Ex. E8, E11 | (B) | 360° C., 2 hr. |

Using the specimens so obtained, a tensile test at room temperature (23° C.) and a high-temperature tensile test at 177° C. were performed. The results are shown in Table E7.

TABLE E7

| Ex./Comp. Ex. No. | PA/PCE molar ratio | Testing temp. [° C.] | Break strength [MPa] | Yield strength [MPa] | Modulus of elasticity [MPa] | Elongation [%] |
|---|---|---|---|---|---|---|
| Example E13 | 60/40 | 23 | 94.10 | 97.50 | 2340 | 70.3 |
| Example E14 | 60/40 | 23 | 91.60 | 95.00 | 2290 | 81.9 |
| Example E15 | 60/40 | 23 | 91.10 | 96.20 | 2150 | 74.7 |
| Example E16 | 60/40 | 23 | 93.80 | 97.20 | 2130 | 69.9 |
| Example E17 | 60/40 | 23 | 92.60 | 96.70 | 2060 | 72.6 |
| Comp.Ex. E6 | 100/0 | 23 | 93.00 | 95.50 | 2010 | 68.1 |
| Comp.Ex. E7 | 100/0 | 23 | 92.50 | 96.40 | 2060 | 76.4 |
| Comp.Ex. E8 | 100/0 | 23 | 92.60 | 95.70 | 2040 | 77.3 |
| Example E18 | 60/40 | 177 | 89.20 | 89.90 | 2210 | 124 |
| Example E19 | 60/40 | 177 | 82.40 | 86.50 | 2010 | 136 |
| Example E20 | 60/40 | 177 | 76.40 | 79.30 | 1980 | 147 |
| Example E21 | 60/40 | 177 | 77.10 | 70.50 | 1740 | 149 |
| Example E22 | 60/40 | 177 | 70.80 | 66.60 | 1530 | 171 |
| Comp.Ex. E9 | 100/0 | 177 | 64.70 | 55.10 | 1350 | 169 |
| Comp.Ex. E10 | 100/0 | 177 | 64.20 | 59.20 | 1380 | 166 |
| Comp.Ex. E11 | 100/0 | 177 | 66.60 | 56.70 | 1440 | 159 |

From the above results, it is evident that, when annealed, the crosslinkable-group-containing polyimide according to the present invention is significantly improved in room-temperature and high-temperature mechanical properties. It is also appreciated that this effect cannot be expected from the conventional polyimides of the comparative examples.

Experiment F Series

In Example F1 to Example F16, a description will be made about certain examples out of the present invention, in each of which as crosslinkable-group-containing end blocking agent(s), one or more end blocking agents other than those represented by the chemical formula (2a) are used or one or more end blocking agents other than those represented by the chemical formula (2a) are used in combination.

In each of these examples and comparative example, a 15% (W/W) polyamic acid varnish was obtained in a similar manner as in Examples A33–A37 by using dimethylacetamide as a solvent and 4,4'-bis(3-aminophenoxy)biphenyl (368.43 g, 1.000 mol), pyromellitic dianhydride (142.00 g, 0.651 mol) and 3,3',4,4'-benzophenonetetracarboxylic acid dianhydride (89.90 g, 0.279 mol) as monomers together with the corresponding end blocking agent(s) the amount(s) and kind(s) of which are shown in Table A29.

Using the thus-obtained varnishes, films were prepared under similar conditions as in Examples 33–37. Employing those films, a chemical resistance test was performed in toluene in a similar manner as in Examples A70–A75. The results are shown together with the logarithmic viscosity numbers of the varnishes in Table F1.

Incidentally, "A", "B" and "C" in Table F1 indicate "completely free of cracks", "cracks observed in a very small number" and "cracks observed in a large number", respectively, in this order.

TABLE F1

| Ex./Comp. Ex. No. | End blocking agent (one to three kinds) Kind/ Charged amount [g]/ Charged amount [mol] | | Logarithmic viscosity number [dL/g] | Toluene immersion time | | |
|---|---|---|---|---|---|---|
| | | | | 1 hr. | 24 hr. | 168 hr. |
| Example F1 | A) 14.52 | 0.0980 | 0.422 | A | A | A |
| | F) 7.230 | 0.0420 | | | | |
| Example F2 | A) 14.52 | 0.0980 | 0.412 | A | A | A |
| | G) 10.43 | 0.0420 | | | | |
| Example F3 | A) 11.41 | 0.0770 | 0.413 | A | A | A |
| | H) 10.41 | 0.0630 | | | | |
| Example F4 | A) 11.41 | 0.0770 | 0.413 | A | A | A |
| | I) 6.178 | 0.0630 | | | | |
| Example F5 | A) 11.41 | 0.0770 | 0.411 | A | A | A |
| | J) 7.067 | 0.0630 | | | | |
| Example F6 | A) 14.52 | 0.0980 | 0.409 | A | A | A |
| | B) 8.238 | 0.0280 | | | | |
| | K) 8.800 | 0.0280 | | | | |
| Comp.Ex. F1 | A) 17.94 | 0.140 | 0.418 | B | C | C |

[Note] In Table F1, the end blocking agents are indicated by the following signs:
A) phthalic anhydride, B) 1-phenyl-2-(3,4-dicarboxyphenyl) acetylene anhydride, F) 4-ethynylphthalic anhydride, G) 3-(phenylethynyl)phthalic anhydride, H) 5-norbornene-2,3-dicarboxylic acid anhydride, I) maleic anhydride, J) 2-methylmaleic anhydride, and K) 2-(3,4-dicarboxyphenoxy) biphenylene anhydride.

From the above results, it is evident that crosslinkable-group-containing polyimides according to the present invention, which have various structures, are far. superior in chemical resistance to similar polymers having no crosslinkable groups.

Examples F7–F10, Comparative Example F2

In each of these examples and comparative example, 1,3-bis(4-aminophenoxy)benzene (292.34 g, 1.000 mol), 3,3',4,4'-biphenyltetracarboxylic acid dianhydride (158.87 g, 0.540 mol), bis(3,4-dicarboxyphenyl)ether dianhydride (167.51 g, 0.540 mol) were charged as monomers together with N-methyl-2-pyrrolidone (3,506 g) as a solvent into a vessel equipped with a stirrer, a reflux condenser, a water trap and a nitrogen inlet tube. The contents were stirred for 12 hours under a nitrogen atmosphere. The end blocking agent(s), the kind(s) and amount(s) of which are shown in Table F2, was (were) charged, followed by stirring for 12 hours under a nitrogen atmosphere.

To the polymer solution so obtained, acetic anhydride (408 g) and γ-picoline (23.5 g) were added, followed by stirring at 60° C. for 3 hours under a nitrogen atmosphere.

The resultant viscous polymer solution was discharged into toluene (20 liters) which was under vigorous agitation, and a precipitate was then collected by filtration. The precipitate was again suspended and allowed to reprecipitate in toluene (4 liters). After the reprecipitate was collected by filtration and then provisionally dried at 50° C. for 24 hours, the reprecipitate was dried at 150° C. under reduced pressure for 12 hours under a gentle nitrogen gas stream.

Using the polyimide powders so obtained, their gel times at 150° C. were measured in exactly the same manner as in Examples A83–A87.

The results are shown together with the logarithmic viscosity numbers of the thus-obtained polyimide powders in Table F2. Incidentally, ">120" which appears in Table F2 indicates that no gel point was reached within the measuring time.

ing end blocking agent(s) described in Table F3 and m-cresol (200.0 mL) were charged into another vessel and were then heated beforehand at 100° C. for 1 hour under a nitrogen atmosphere to provide a solution. The solution of the end blocking agent(s) was charged in its entirety into the solution of the end-unblocked polymer, and reaction(s) was(were) then conducted under 200° C. reflux conditions for 2 hours.

The reaction mixture was thereafter cooled to 100° C. While maintaining the resultant viscous polymer solution at 100° C. toluene (4 liters) was charged dropwise into the polymer solution over 4 hours. After toluene (3 liters) which had been heated at 80° C. was charged, the resulting mixture was allowed to cool down to room temperature. Toluene (3 liters) was added further, followed by stirring for 1 hour. A precipitate was then collected by filtration. The precipitate was again suspended and allowed to reprecipitate in toluene (4 liters) After the reprecipitate was collected by filtration and then provisionally dried at 50° C. for 24 hours, the reprecipitate was dried at 200° C. under reduced pressure for 12 hours under a gentle nitrogen gas stream.

Using the polyimide powders so obtained, their gel times at 360° C. were measured in exactly the same manner as in Examples A83–A87.

The results are shown together with the logarithmic viscosity numbers of the thus-obtained polyimide powders in Table F3.

TABLE F2

| Ex./Comp.Ex. No. | End blocking agent (one to three kinds) kind/ charged amount [g]/ charged amount [mol] | | | Logarithmic viscosity number [dL/g] | 360° C. Gel time [min.] |
|---|---|---|---|---|---|
| Example F7 | L) | 22.35 | 0.240 | 0.444 | 108 |
|  | M) | 15.46 | 0.0800 |  |  |
| Example F8 | L) | 18.63 | 0.200 | 0.440 | 21 |
|  | N) | 20.11 | 0.1200 |  |  |
| Example F9 | L) | 26.08 | 0.280 | 0.446 | >120 |
|  | O) | 4.764 | 0.0400 |  |  |
| Example F10 | L) | 22.35 | 0.240 | 0.451 | 38 |
|  | M) | 7.730 | 0.0400 |  |  |
|  | P) | 6.688 | 0.0400 |  |  |
| Comp.Ex. F2 | O) | 38.13 | 0.320 | 0.440 | 2 |

[Note] In Table F2, the end blocking agents are shown by the following signs:
L) aniline,
M) 3- (phenylethynyl) aniline,
N) 3-ethynylaniline,
O) 3-aminostyrene, and
P) 2-aminobiphenylene.

From the results, it is evident that the crosslinkable-group-containing polyimide according to the present invention is resistant to gelation and hence, is excellent in moldability or formability.

Examples F11–F16, Comparative Example F3

In each of these examples and comparative examples, 4,4'-bis(3-aminophenoxy)biphenyl (368.43 g, 1.000 mol), pyromellitic dianhydride (102.52 g, 0.470 mol) and 3,3',4,4'-biphenyltetracarboxylic acid dianhydride (138.28 g, 0.470 mol) were charged as monomers together with m-cresol (1,630 g) as a solvent into a vessel equipped with a stirrer, a reflux condenser, a water trap and a nitrogen gas inlet tube. The contents were heated with stirring to 200° C. over 2 hours and 30 minutes under a nitrogen atmosphere, and a reaction was conducted under 200° C. reflux conditions for 2 hours, whereby a solution of an end-unblocked polymer was obtained. During the reaction, the correspond-

TABLE F3

| Ex./Comp.Ex. No. | End blocking agent (one to three kinds) Kind/ Charged amount [g]/ Charged amount [mol] | | | Logarithmic viscosity number [dL/g] | 360° C. Gel time [min.] |
|---|---|---|---|---|---|
| Example F11 | A) | 28.44 | 0.192 | 0.470 | 50 |
|  | F) | 8.263 | 0.0480 |  |  |
| Example F12 | A) | 28.44 | 0.192 | 0.462 | 109 |
|  | G) | 11.92 | 0.0480 |  |  |
| Example F13 | A) | 28.44 | 0.192 | 0.466 | 24 |
|  | H) | 7.931 | 0.0480 |  |  |
| Example F14 | A) | 28.44 | 0.192 | 0.475 | 16 |
|  | I) | 4.707 | 0.0480 |  |  |
| Example F15 | A) | 28.44 | 0.192 | 0.449 | 15 |
|  | J) | 5.384 | 0.0480 |  |  |
| Example F16 | A) | 28.44 | 0.192 | 0.455 | 61 |
|  | K) | 15.09 | 0.0480 |  |  |
| Comp.Ex. F3 | B) | 35.55 | 0.240 | 0.456 | 2 |

[Note] In Table F1, the end blocking agents are indicated by the following signs:
A) phthalic anhydride, B) 1-phenyl-2-(3,4-dicarboxyphenyl) acetylene anhydride, F) 4-ethynylphthalic anhydride, G) 3-(phenylethynyl)phthalic anhydride, H) 5-norbornene-2,3-dicarboxylic acid anhydride, I) maleic anhydride, J) 2-methylmaleic anhydride, and K) 2-(3,4-dicarboxyphenoxy) biphenylene anhydride From the foregoing, it is evident that the crosslinkable-group-containing polyimide according to the present invention is excellent in moldability or formability although its gel time is observed to vary somewhat depending on the crosslinkable groups. It is also appreciated that the polyimide of the comparative example undergoes quick gelation and its melt moldability or formability is hence extremely poor.

The present invention has made it possible to provide crosslinked thermoplastic polyimides having various excellent properties inherent to polyimides, namely, high heat resistance, excellent mechanical properties, superb sliding property, low water absorption property, outstanding electrical properties, high thermal oxidation resistance, high chemical resistance and high radiation resistance, especially

What is claimed is:

1. A crosslinkable-group-containing polyimide comprising crosslinkable groups at 1 to 80 mole % of molecule ends thereof.

2. A crosslinkable-group-containing polyimide according to claim 1, wherein a backbone structure which forms said polyimide is substantially provided with thermoplasticity.

3. A crosslinkable-group-containing polyimide according to claim 1, said polyimide permitting melt molding or forming, wherein 1 to 80 mole % of said molecule ends are crosslinkable-group-containing molecule ends represented by the chemical formula (2a) and 99 to 20 mole % of said molecule ends are crosslinking-group-free molecule ends represented by the chemical formula (2b):

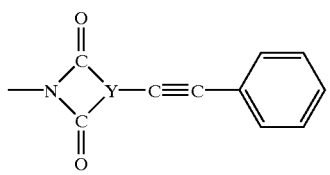
(2a)

wherein Y represents a trivalent aromatic group selected from the group consisting:

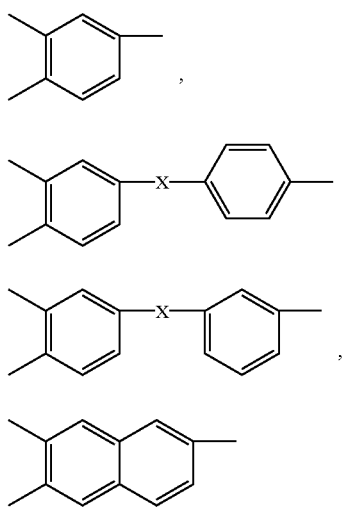

wherein X represents a divalent linking group selected from the group consisting of a direct bond, a carbonyl group, a sulfone group, a sulfide group, an ether group, an isopropylidene group and a hexafluoroisopropylidene group; and

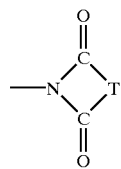
(2b)

wherein T represents a divalent aromatic group consisting of:

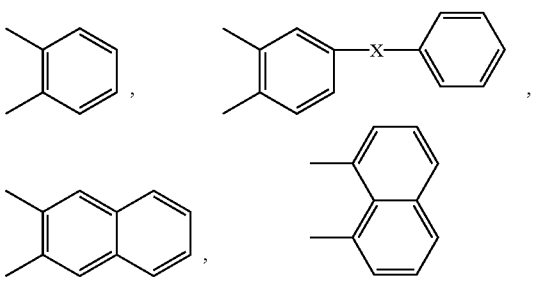

wherein X represents a divalent linking group selected from the group consisting of a direct bond, a carbonyl group, a sulfone group, a sulfide group, an ether group, an isopropylidene group and a hexafluoroisopropylidene group.

4. A crosslinkable-group-containing polyimide according to claim 1, wherein said polyimide comprises polyimide molecules of a structure represented by the chemical formula (2c):

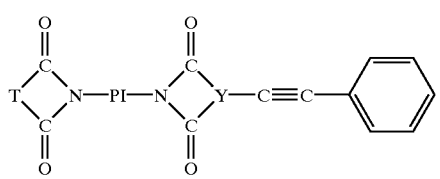
(2c)

wherein T, PI and Y are groups to be indicated next, respectively, that is,

T represents a divalent aromatic group selected from the group consisting of:

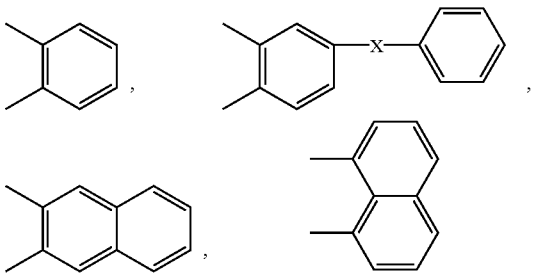

wherein X represents a divalent linking group selected from the group consisting of a direct bond, a carbonyl group, a sulfone group, a sulfide group, an ether group, an isopropylidene group and a hexafluoroisopropylidene group;

PI represents a polyimide backbone; and

Y represents a trivalent aromatic group selected from the group consisting of:

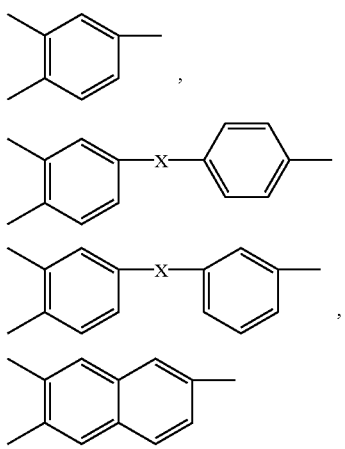

wherein X represents a divalent linking group selected from the group consisting of a direct bond, a carbonyl group, a sulfone group, a sulfide group, an ether group, an isopropylidene group and a hexafluoroisopropylidene group.

5. A crosslinkable-group-containing polyimide according to claim 3, wherein in the chemical formula (2b) or (2c), T is the following chemical formula (2d):

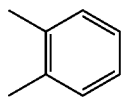
(2d)

6. A crosslinkable-group-containing polyimide according to claim 3, wherein in the chemical formula (2a) or (2c), Y is the following chemical formula (2e):

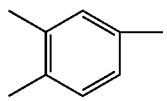
(2e)

7. A crosslinkable-group-containing polyimide according to claim 1, wherein a backbone of said polyimide has recurring structural units represented by the chemical formula (1):

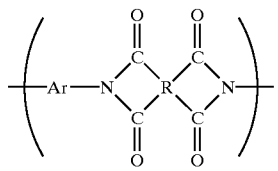
(1)

wherein Ar and R are groups to be described next, that is, Ar represents a divalent aromatic group selected from the group consisting of:

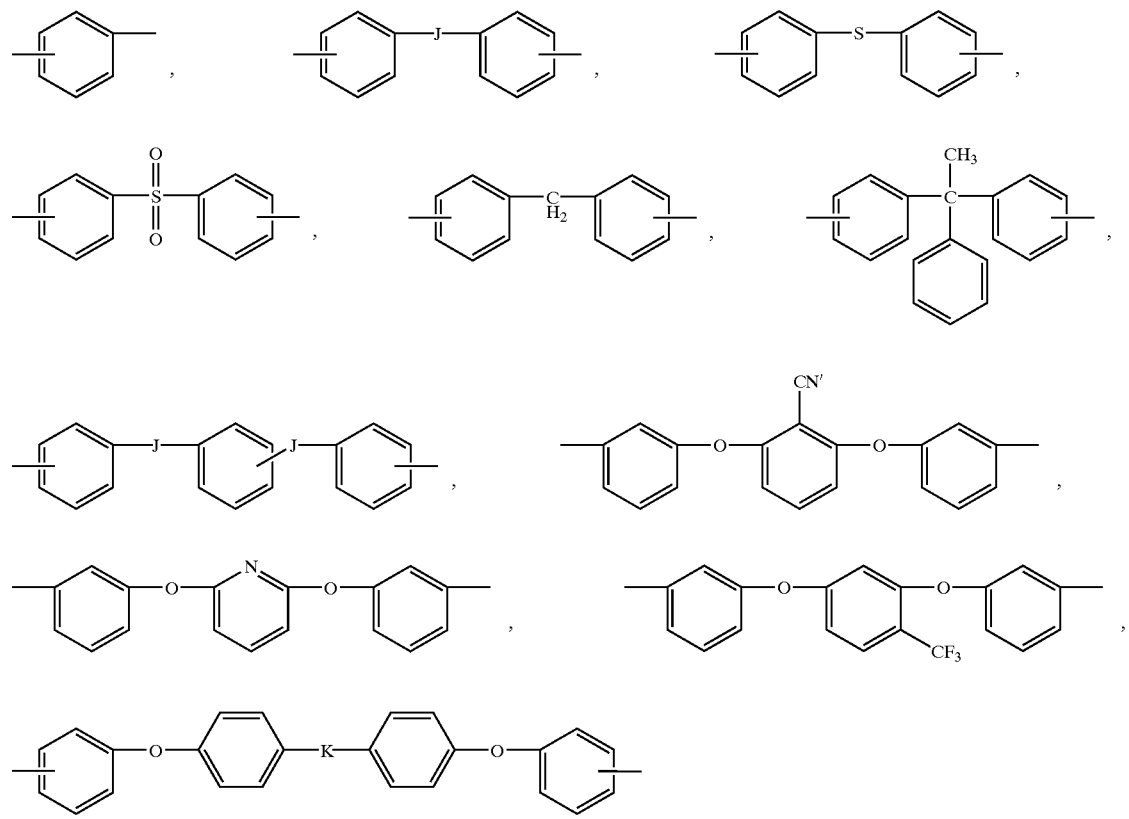

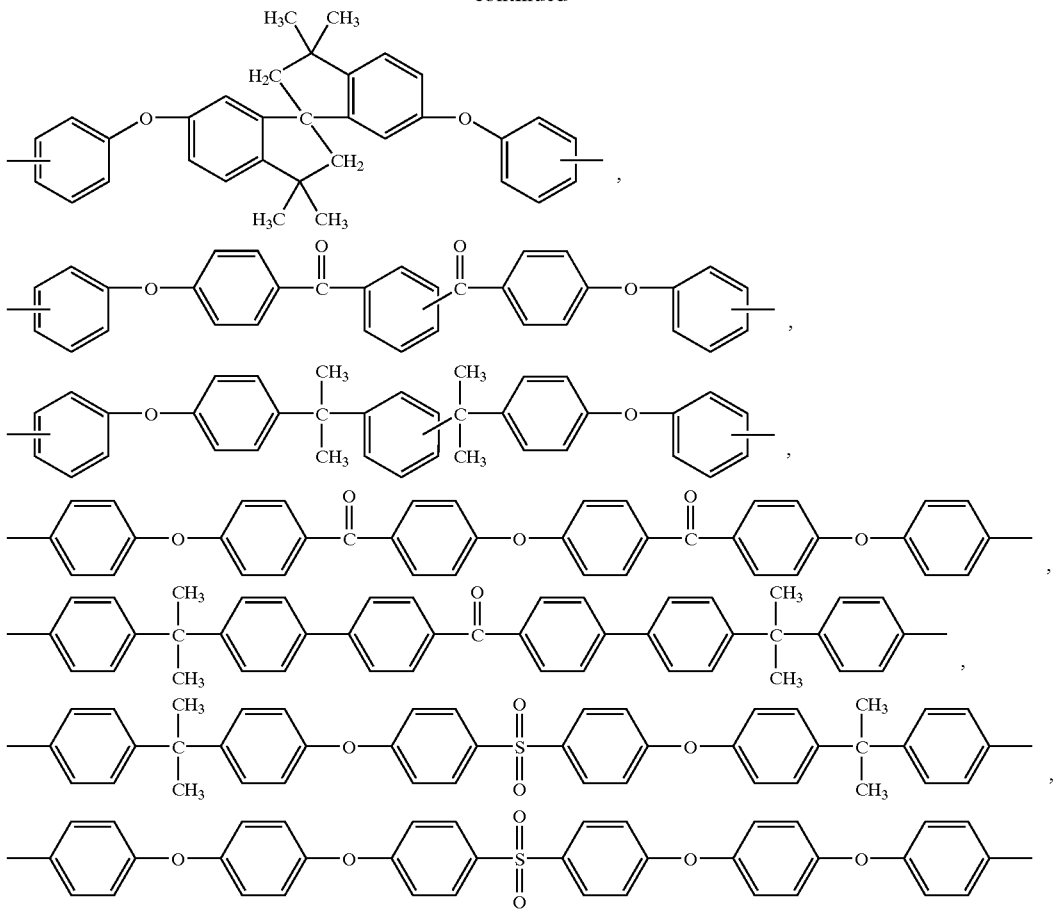

wherein J represents a divalent linking group selected from the group consisting of a carbonyl group, an ether group, an isopropylidene group and a hexafluoroisopropylidene group, K represents a divalent linking group selected from the group consisting of a direct bond, a carbonyl group, a sulfone group, a sulfide group, an ether group, an isopropylidene group and a hexafluoroisopropylidene group, p and q each independently stand for 0 or 1, and a position of each bond, said position being unspecified, is a para-position or meta-position; and R represents a tetravalent aromatic group selected from the group consisting of:

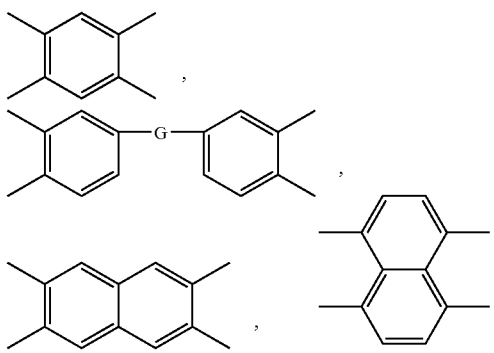

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group.

8. A crosslinkable-group-containing polyimide according to claim 7, wherein 50 to 100 mole % of said recurring structural units represented by the chemical formula (1) are of a recurring unit structure represented by the chemical formula (1a):

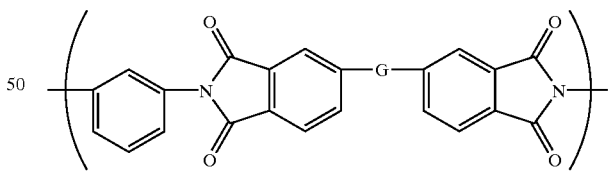

wherein G is a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group.

9. A crosslinkable-group-containing polyimide according to claim 8, wherein in the chemical formula (1a), G is a 4'-oxy-4-biphenoxy group.

10. A crosslinkable-group-containing polyimide according to claim 8, wherein in the chemical formula (1a), G is a 4-[1-(4-oxyphenyl)-1-methylethyl]phenoxy group.

11. A crosslinkable-group-containing polyimide according to claim 7, wherein 50 to 100 mole % of said recurring structural units represented by the chemical formula (1) are of a recurring unit structure represented by the chemical formula (1b):

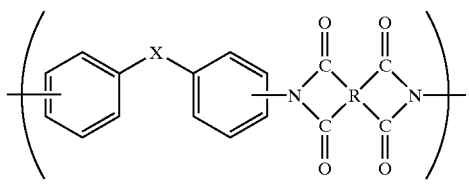
(1b)

wherein X and R are groups to be indicated next, respectively, that is,

X represents a divalent linking group selected from the group consisting of a direct bond, a carbonyl group, a sulfone group, a sulfide group, an ether group, an isopropylidene group and a hexafluoroisopropylidene group; and R represents a tetravalent linking group selected from the group consisting of:

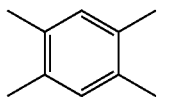,

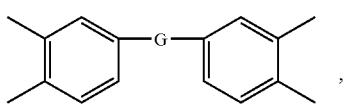,

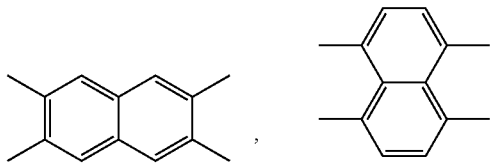, wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

12. A crosslinkable-group-containing polyimide according to claim 11, wherein in the chemical formula (1b), X is an oxygen atom;

imido-bonded positions of two benzenes to which X is directly bonded are a m-position and a p-position, respectively; and R is a 3,4,3',4'-substituted biphenyl.

13. A crosslinkable-group-containing polyimide according to claim 7, wherein among said recurring structural units represented by the chemical formula (1), 50 to 100 mole % are of a recurring unit structure represented by the chemical formula (1c):

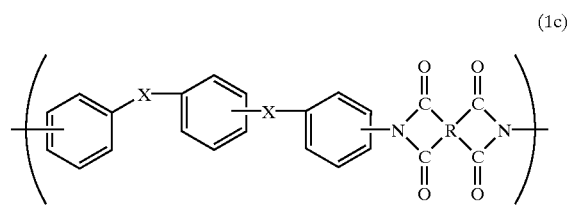
(1c)

wherein X and R are groups to be indicated next, respectively, that is,

X represents a divalent linking group selected from the group consisting of a direct bond, a carbonyl group, a sulfone group, a sulfide group, an ether group, an isopropylidene group and a hexafluoroisopropylidene group; and R represents a tetravalent linking group selected from the group consisting of:

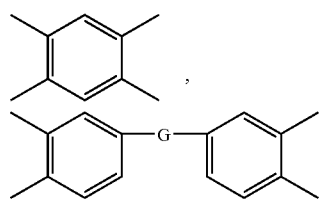,

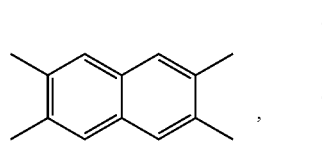, 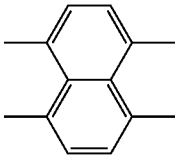, wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

14. A crosslinkable-group-containing polyimide according to claim 13, wherein in the chemical formula (1c), X is an oxygen atom.

15. A crosslinkable-group-containing polyimide according to claim 13, wherein in the chemical formula (1c), X is an oxygen atom;

positions of a benzene ring, at which two Xs are directly bonded, respectively, are m-positions relative to each other;

bonded positions of each of two benzenes to each of which X and an imido group are directly bonded are p-positions relative to each other; and R is a 3,4,3',4'-substituted biphenyl.

16. A crosslinkable-group-containing polyimide according to claim 7, wherein among said recurring structural units represented by the chemical formula (1), 50 to 100 mole % are of a recurring unit structure represented by the chemical formula (1e):

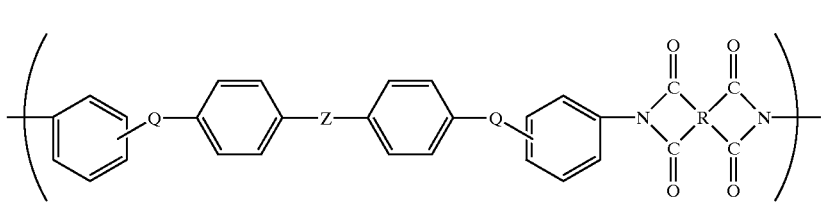
(1e)

wherein Q, Z and R are groups to be indicated next, respectively, that is,

Q represents a divalent aromatic group selected from the group consisting of an ether group and an isopropylidene group;

Z represents a divalent aromatic group selected from the group consisting of a direct bond, a carbonyl group, a sulfone group, a sulfide group, an ether group, an isopropylidene group, a hexafluoroisopropylidene group, and

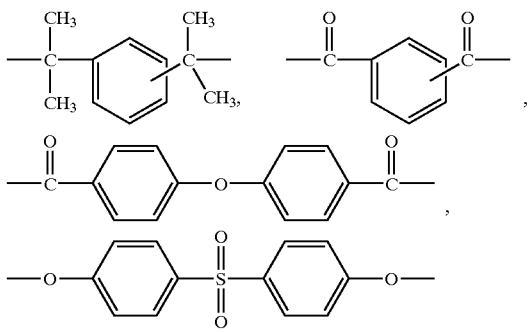

R represents a tetravalent aromatic group selected from the group consisting of:

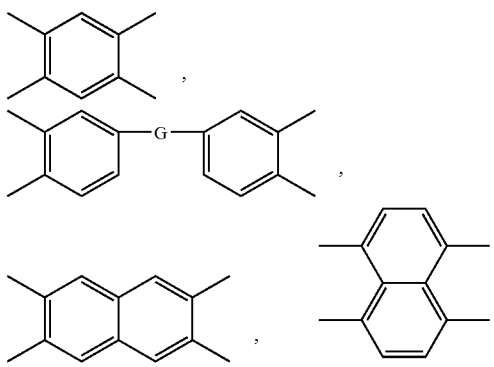

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group, and a position of each bond, said position being unspecified, is a para-position or meta-position.

17. A crosslinkable-group-containing polyimide according to claim 16, wherein in the chemical formula (1e), Q is an oxygen atom; and Z is at least one divalent group selected from the group consisting of a direct bond, a carbonyl group, a sulfone group, a sulfide group, an ether group, an isopropylidene group and a hexafluoroisopropylidene group.

18. A crosslinkable-group-containing polyimide according to claim 16, wherein in the chemical formula (1e), Q is an oxygen atom;

Z is a direct bond; and

R is a 1,2,4,5-substituted benzene.

19. A process for the production of a melt-moldable or formable, crosslinkable-group-containing polyimide, 1 to 80 mole % of molecule ends of said polyimide being crosslinkable-group-containing molecule ends represented by a chemical formula (2a) and 99 to 20 mole % of said molecule ends being crosslinkable-group-free molecule ends represented by a chemical formula (2b), which comprises end-blocking ends of polyimide backbones by using dicarboxylic acid anhydrides represented by the chemical formula (3a) and the chemical formula (3b):

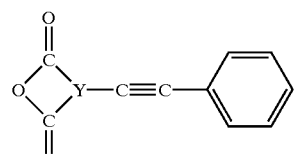
(3a)

wherein Y represents a trivalent aromatic group selected from the group consisting:

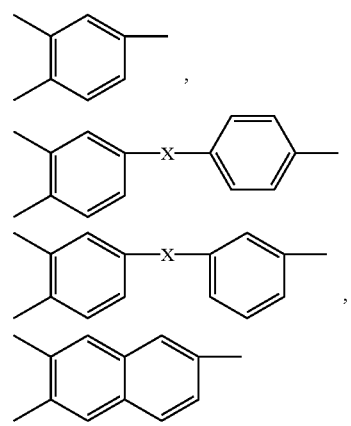

wherein X represents a divalent linking group selected from the group consisting of a direct bond, a carbonyl group, a sulfone group, a sulfide group, an ether group, an isopropylidene group and a hexafluoroisopropylidene group;

(3b)

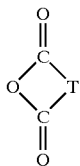

wherein T represents a divalent aromatic group consisting of:

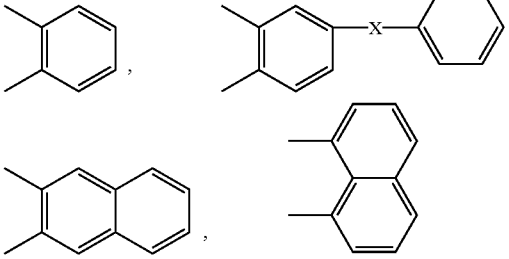

wherein X represents a divalent linking group selected from the group consisting of a direct bond, a carbonyl group, a sulfone group, a sulfide group, an ether group, an isopropylidene group and a hexafluoroisopropylidene group;

(2a)

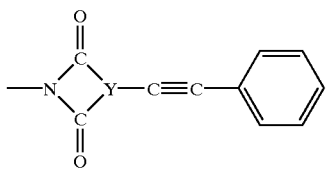

wherein Y represents a trivalent aromatic group selected from the group consisting:

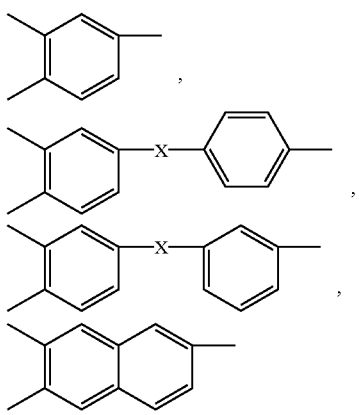

wherein X represents a divalent linking group selected from the group consisting of a direct bond, a carbonyl group, a sulfone group, a sulfide group, an ether group, an isopropylidene group and a hexafluoroisopropylidene group; and (2b)

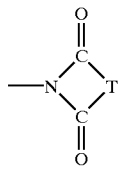

wherein T represents a divalent aromatic group consisting of:

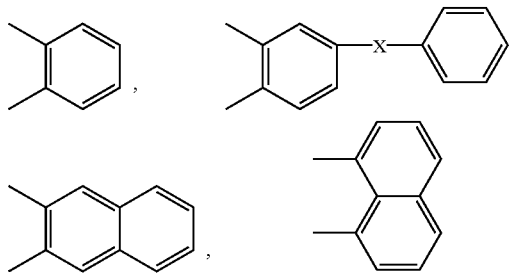

wherein X represents a divalent linking group selected from the group consisting of a direct bond, a carbonyl group, a sulfone group, a sulfide group, an ether group, an isopropylidene group and a hexafluoroisopropylidene group.

20. A process according to claim 19, wherein said dicarboxylic acid anhydrides represented by the chemical formula (3a) and the chemical formula (3b) are used in amounts represented, on a molar ratio basis, by the numerical formula [1]:

1/99≦the dicarboxylic acid anhydride represented by the chemical formula (3a)/the dicarboxylic acid anhydride represented by the chemical formula (3b)≦80/20    [1]

(3a)

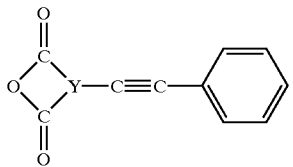

Y represents a trivalent aromatic group selected from the group consisting of:

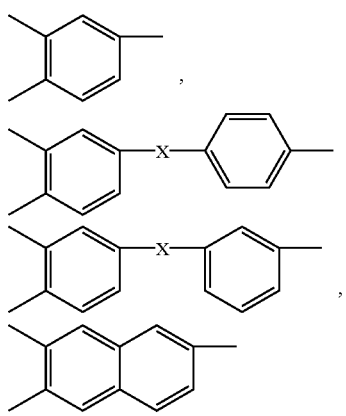

wherein X represents a divalent linking group selected from the group consisting of a direct bond, a carbonyl group, a sulfone group, a sulfide group, an ether group, an isopropylidene group and a hexafluoroisopropylidene group.

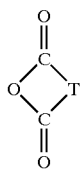
(3b)

T represents a divalent aromatic group selected from the group consisting of:

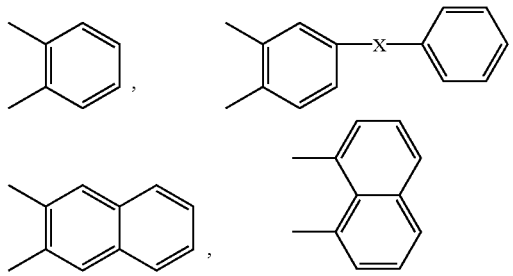

wherein X represents a divalent linking group selected from the group consisting of a direct bond, a carbonyl group, a sulfone group, a sulfide group, an ether group, an isopropylidene group and a hexafluoroisopropylidene group.

21. A process according to claim 19, wherein in the chemical formula (3a) and/or the chemical formula (3b), T is the chemical formula (2a) and/or Y is the chemical formula (2e):

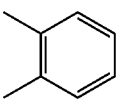
(2d)

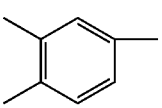
(2e)

22. A process according to claim 19, wherein said polyimide backbones have been obtained by thermally and/or chemically imidating a polyamic acid obtained as a polyimide precursor by polymerizing a diamine component and a tetracarboxylic acid anhydride component.

23. A process according to claim 22, wherein said diamine component is, at least one diamine component selected from the group consisting of diamine components represented by the chemical formula (4):

$H_2N—Ar—NH_2$ (4)

wherein Ar represents a divalent aromatic group selected from the group consisting of:

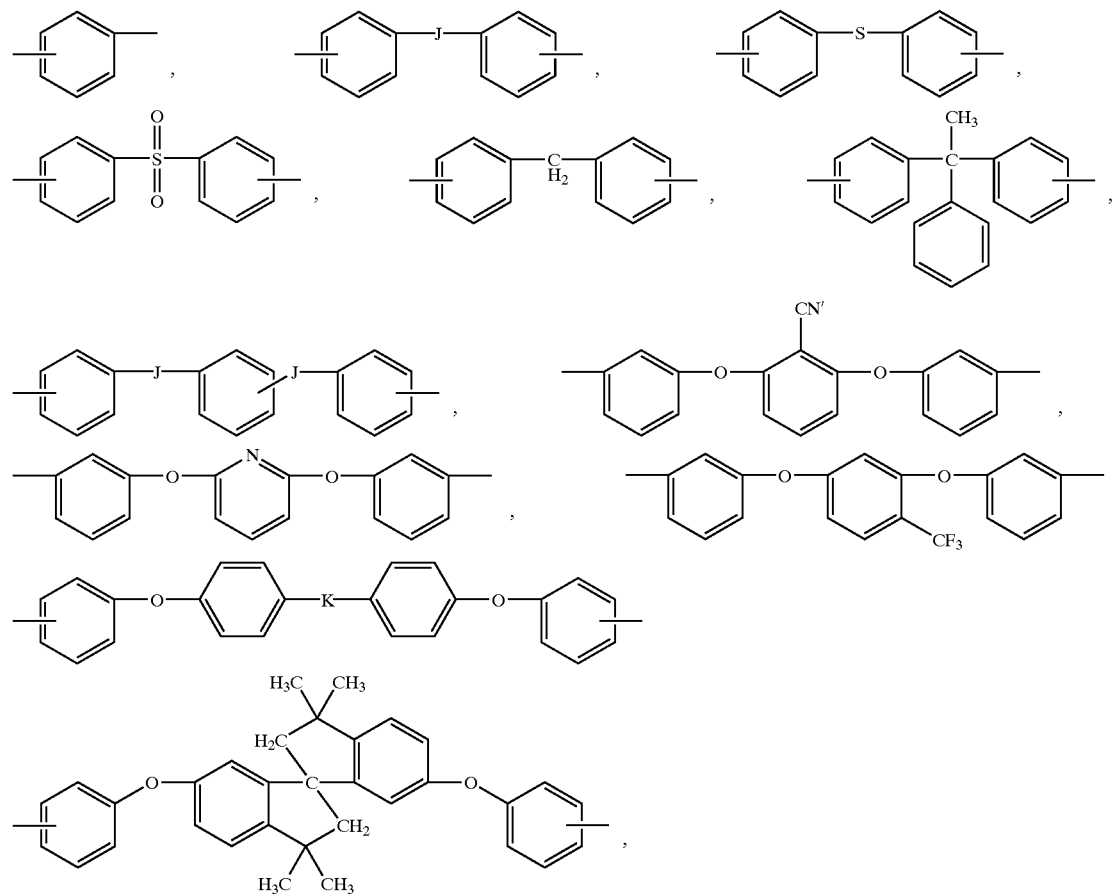

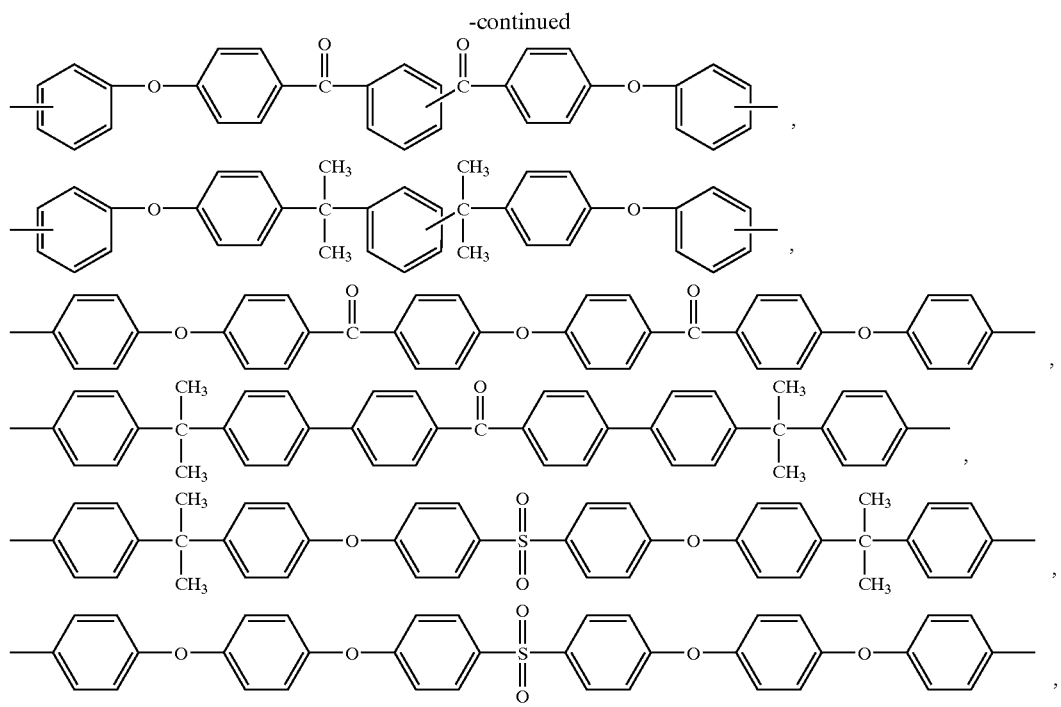

wherein J represents a divalent linking group selected from the group consisting of a carbonyl group, an ether group, an isopropylidene group and a hexafluoroisopropylidene group, K represents a divalent linking group selected from the group consisting of a direct bond, a carbonyl group, a sulfone group, a sulfide group, an ether group, an isopropylidene group and a hexafluoroisopropylidene group, p and q each independently stand for 0 or 1, and a position of each bond, said position being unspecified, is a para-position or meta-position.

24. A process according to claim 23, wherein of said diamine component represented by the chemical formula (4), 50 to 100 mole % are represented by the chemical formula (4c):

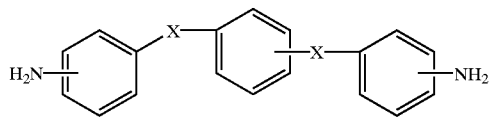

(4c)

wherein X represents a divalent linking group selected from the group consisting of a direct bond, a carbonyl group, a sulfone group, a sulfide group, an ether group, an isopropylidene group and a hexafluoroisopropylidene group, and a position of each bond, said position being unspecified, is a para-position or meta-position.

25. A process according to claim 24, wherein in the chemical formula (4c), X is an oxygen atom.

26. A process according to claim 24, wherein in the chemical formula (4c),
X is an oxygen;
positions of a benzene ring, at which two Xs are directly bonded, respectively, are m-positions relative to each other; and
bonded positions of each of two benzenes to each of which X and an amino group are directly bonded are p-positions relative to each other.

27. A process according to claim 24, wherein of the diamine component represented by the chemical formula (4), 50 to 100 mole % are represented by the chemical formula (4d):

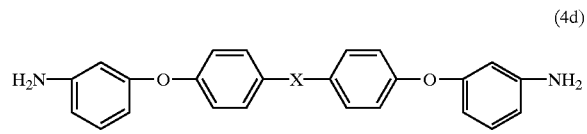

(4d)

wherein X represents a divalent linking group selected from the group consisting of a direct bond, a carbonyl group, a sulfone group, a sulfide group, an ether group, an isopropylidene group and a hexafluoroisopropylidene group.

28. A process according to claim 27, wherein in the chemical formula (4d), X is a direct bond.

29. A process according to claim 22, wherein said tetracarboxylic acid dihydride component is represented by the chemical formula (5):

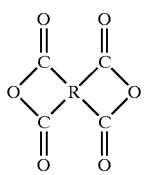

(5)

wherein R represents a tetravalent linking group selected from the group consisting of:

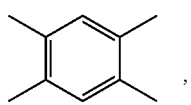

-continued

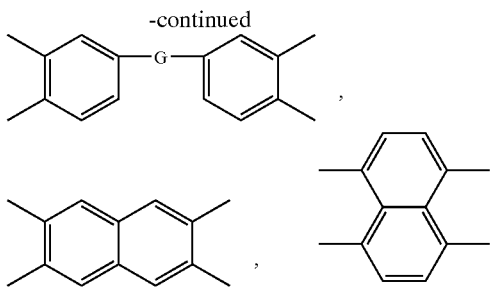

wherein G represents a divalent aromatic group selected from the group consisting of a direct bond, a carbonyl group, a sulfone group, a sulfide group, an ether group, an isopropylidene group, a hexafluoroisopropylidene group, a 3-oxyphenoxy group, a 4-oxyphenoxy group, a 4'-oxy-4-biphenoxy group and a 4-[1-(4-oxyphenyl)-1-methylethyl]phenoxy group.

30. A crosslinkable-group-containing polyimide according to claim 1, wherein there is a temperature T [° C.] which simultaneously satisfy the following numerical formulas [2] and [3]:

$$1 \leq MV30(T)/MV5(T) \leq 10 \qquad [2]$$

$$10 \leq MV5(T) \leq 10{,}000 \qquad [3]$$

where

MV5(T): melt viscosity [Pa·sec] of said polyimide as measured under a desired constant shearing stress in a range of from 0.1 to 1 [MPa] after causing said polyimide to melt by holding said polyimide at a temperature T [° C.] for 5 minutes; and MV30(T): melt viscosity [Pa·sec] of said polyimide as measured under said desired constant shearing stress in the range of from 0.1 to 1 [MPa] after causing said polyimide to melt by holding said polyimide at the temperature T [° C.] for 30 minutes.

31. A crosslinkable-group-containing polyimide according to claim 1, wherein there is a temperature T [° C.] which simultaneously satisfy the following numerical formulas [2], [3] and [4]:

$$1 \leq MV30(T)/MV5(T) \leq 10 \qquad [2]$$

$$10 \leq MV5(T) \leq 10{,}000 \qquad [3]$$

$$MV30(T+20)/MV5(T+20) \leq 20 \qquad [4]$$

where

MV5(T): melt viscosity [Pa·sec] of said polyimide as measured under a desired constant shearing stress in a range of from 0.1 to 1 [MPa] after causing said polyimide to melt by holding said polyimide at a temperature T [° C.] for 5 minutes;

MV5(T+20): melt viscosity [Pa·sec] of said polyimide as measured under said desired constant shearing stress in the range of from 0.1 to 1 [MPa] after causing said polyimide to melt by holding said polyimide at a temperature T+20 [° C.] for 5 minutes;

MV30(T): melt viscosity [Pa·sec] of said polyimide as measured under said desired constant shearing stress in the range of from 0.1 to 1 [MPa] after causing said polyimide to melt by holding said polyimide at the temperature T [° C.] for 30 minutes; and MV30(T+20): melt viscosity [Pa·sec] of said polyimide as measured under said desired constant shearing stress in the range of from 0.1 to 1 [MPa] after causing said polyimide to melt by holding said polyimide at a temperature T+20 [° C.] for 30 minutes.

32. A crosslinkable-group-containing polyimide according to claim 1, which simultaneously satisfies the following numerical formulas [5] and [6]:

$$1 \leq MV30(360)/MV5(360) \leq 10 \qquad [5]$$

$$10 \leq MV5(360) \leq 10{,}000 \qquad [6]$$

where

MV5(360) melt viscosity [Pa·sec] of said polyimide as measured under a desired constant shearing stress in a range of from 0.1 to 1 [MPa] after causing said polyimide to melt by holding said polyimide at 360 [° C.] for 5 minutes; and MV30(360): melt viscosity [Pa·sec] of said polyimide as measured under said desired constant shearing stress in the range of from 0.1 to 1 [MPa] after causing said polyimide to melt by holding said polyimide at 360 [° C.] for 30 minutes.

33. A crosslinkable-group-containing polyimide according to claim 1, wherein a time t (min) which satisfies the numerical formula [7] lasts 10 minutes or longer:

$$G'(t)=G''(t) \qquad [7]$$

where

G' (t) storage modulus of said polyimide as measured at 360° C. and 1 Hz after an elapse of said time t (min); and G" (t): loss modulus of said polyimide as measured at 360° C. and 1 Hz after an elapse of said time t (min).

34. A crosslinked polyimide obtained by heat-treating a crosslinkable-group-containing polyimide according to claim 1.

35. A solution or suspension comprising a crosslinkable-group-containing polyimide according to claim 1.

* * * * *

UNITED STATES PATENT AND TRADEMARK OFFICE
CERTIFICATE OF CORRECTION

PATENT NO. : 6,531,568 B1
DATED : March 11, 2003
INVENTOR(S) : Atsushi Shibuya et al.

It is certified that error appears in the above-identified patent and that said Letters Patent is hereby corrected as shown below:

Title page,
Item [54], change title to -- CROSSLINKABLE GROUP-CONTAINING POLYIMIDES AND PRODUCTION PROCESS THEREOF --.

Column 118,
Line 50, change "CN'" to -- CN --

Column 120,
Line 35, at the end of formula add the following formula:

Column 128,
Line 45, change "CN'" to -- CN --

Column 130,
Line 25, at the end of formula add the following formula:

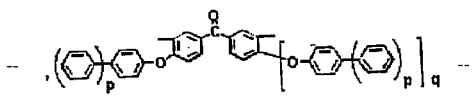

Signed and Sealed this

Fourth Day of November, 2003

JAMES E. ROGAN
*Director of the United States Patent and Trademark Office*